United States Patent
Ma et al.

(10) Patent No.: US 12,503,517 B2
(45) Date of Patent: Dec. 23, 2025

(54) ANTIBODIES BINDING CD40 AND USES THEREOF

(71) Applicant: BIOSION INC., Nanjing (CN)

(72) Inventors: Mark Zhiqing Ma, Nanjing (CN); Jinyu Liu, Nanjing (CN); Zhengping Zhang, Lianyungang (CN); Hongjiang Xu, Jiangsu (CN)

(73) Assignee: BIOSION INC., Nanjing (CN)

( * ) Notice: Subject to any disclaimer, the term of this patent is extended or adjusted under 35 U.S.C. 154(b) by 715 days.

(21) Appl. No.: 17/906,898

(22) PCT Filed: Mar. 30, 2021

(86) PCT No.: PCT/CN2021/084013
§ 371 (c)(1),
(2) Date: Sep. 21, 2022

(87) PCT Pub. No.: WO2021/197335
PCT Pub. Date: Oct. 7, 2021

(65) Prior Publication Data
US 2023/0365700 A1   Nov. 16, 2023

Related U.S. Application Data

(60) Provisional application No. 63/001,612, filed on Mar. 30, 2020.

(51) Int. Cl.
| | | |
|---|---|---|
| *C07K 16/28* | (2006.01) | |
| *A61K 39/00* | (2006.01) | |
| *A61K 39/39* | (2006.01) | |
| *A61K 39/395* | (2006.01) | |
| *A61K 45/06* | (2006.01) | |
| *A61P 35/00* | (2006.01) | |

(52) U.S. Cl.
CPC .. *C07K 16/2878* (2013.01); *A61K 39/001129* (2018.08); *A61K 39/3955* (2013.01); *A61K 45/06* (2013.01); *A61P 35/00* (2018.01); *A61K 2039/505* (2013.01); *C07K 2317/24* (2013.01); *C07K 2317/76* (2013.01); *C07K 2317/92* (2013.01)

(58) Field of Classification Search
CPC ............ C07K 16/2878; C07K 2317/76; C07K 2317/75; A61K 39/001129
See application file for complete search history.

(56) References Cited

U.S. PATENT DOCUMENTS

| | | | |
|---|---|---|---|
| 2018/0066053 A1* | 3/2018 | Keler | ..................... A61P 35/02 |
| 2020/0148778 A1 | 5/2020 | Yan et al. | |
| 2020/0291123 A1 | 9/2020 | Park et al. | |

FOREIGN PATENT DOCUMENTS

| | | |
|---|---|---|
| WO | 2006128103 A2 | 11/2006 |
| WO | 2018088850 A2 | 5/2018 |
| WO | 2018219327 A1 | 12/2018 |
| WO | 2018220100 A1 | 12/2018 |
| WO | 2018222019 A1 | 12/2018 |

OTHER PUBLICATIONS

Vonderheide RH. CD40 Agonist Antibodies in Cancer Immunotherapy. Annu Rev Med. Jan. 27, 2020;71:47-58.
Supplementary European Search Report and Written Opinion issued in co-pending EP Application No. 21782396 dated Mar. 26, 2024.
Non-final Office Action issued in co-pending Japanese Patent Application No. 2022-547785 dated Feb. 12, 2025.
A. A. Kosak.A, et al., Combination of an agonistic anti-CD40 monoclonal antibody and the COX-2 inhibitor celecoxib induces anti-glioma effects by promotion of type-1 immunity in myeloid cells and T-cells, Cancer Immunol. Immunother. (Aug. 31, 2014) vol. 63, No. 8, p. 847-857.
S. Visvanathan, et al., Effects of BI 655064, an antagonistic anti-CD40 antibody, on clinical and biomarker variables in patients with active rheumatoid arthritis: a randomised. double-blind, placebo-controlled, Ann, Rheum. Dis. (Mar. 22, 2019) vol. 78, p. 754-760.
ISR and Written Opinion issued Jul. 2, 2021, in International Application No. PCT/CN2021/084013.

* cited by examiner

*Primary Examiner* — Daniel E Kolker
*Assistant Examiner* — Katherine Ann Holtzman
(74) *Attorney, Agent, or Firm* — Duane Morris LLP; Thomas J. Kowalski

(57) ABSTRACT

Provided is an isolated monoclonal antibody or an antigen-binding portion thereof that specifically binds human CD40. A nucleic acid molecule encoding the antibody or antigen-binding portion thereof, an expression vector, a host cell and a method for expressing the antibody or the antigen-binding portion thereof are also provided. An immunoconjugate, a bispecific molecule, a chimeric antigen receptor, an oncolytic virus and a pharmaceutical composition comprising the antibody or antigen-binding portion thereof, as well as a treatment method using the same are further provided.

19 Claims, 9 Drawing Sheets
Specification includes a Sequence Listing.

ANTIBODIES BINDING CD40 AND USES THEREOF

RELATED APPLICATIONS AND INCORPORATION BY REFERENCE

This application claims priority to U.S. provisional patent application Ser. No. 63/001,612 filed on Mar. 30, 2020.

The foregoing applications, and all documents cited therein or during their prosecution ("appln cited documents") and all documents cited or referenced herein (including without limitation all literature documents, patents, published patent applications cited herein) ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference. Any Genbank sequences mentioned in this disclosure are incorporated by reference with the Genbank sequence to be that of the earliest effective filing date of this disclosure.

SEQUENCE STATEMENT

The instant application contains a Sequence Listing which has been submitted electronically and is hereby incorporated by reference in its entirety. Said ASCII copy was created Aug. 22, 2022, and amended Sep. 29, 2022, is named Replacement55532_00077SL.txt and is 41.633 bytes in size.

FIELD OF THE INVENTION

The present disclosure relates generally to an isolated monoclonal antibody, particularly a mouse, chimeric or humanized monoclonal antibody, or an antigen-binding portion thereof, that specifically binds to human CD40 with high affinity and functionality. A nucleic acid molecule encoding the antibody or antigen-binding portion thereof, an expression vector, a host cell and a method for expressing the antibody or antigen-binding portion thereof are also provided. The present disclosure further provides an immunoconjugate, a bispecific molecule, a chimeric antigen receptor, an oncolytic virus, and a pharmaceutical composition comprising the antibody or antigen-binding portion thereof, as well as a treatment method using the anti-CD40 antibody or antigen-binding portion thereof of the disclosure.

BACKGROUND OF THE INVENTION

B lymphocyte activation requires antigen receptor-mediated stimulation and co-stimulation, and CD40 is one of the costimulatory molecules participating in the activation process (Jodi L. Karnell et al., (2019) *Advanced Drug Delivery Review* 141:92-103).

CD40, a type I transmembrane protein, is a member of the TNF receptor superfamily. It was initially characterized on B lymphocytes where it is constitutively expressed and signals to promote B cell activation and proliferation. Later it was found on dendritic cells (DCs), monocytes, macrophages as well as non-hematopoietic cells. The major ligand of CD40 is CD40L, which is primarily expressed by activated T cells and activated B cells and platelets, and is also found on monocytic cells, natural killer cells, and basophils under inflammatory conditions (Jodi L. Karnell et al., (2019) supra). The wide distribution of this costimulatory pair indicates the pivotal roles they play in immune processes. For example, the engagement of CD40 with CD40L on DCs promotes cytokine production and costimulatory molecule induction, resulting in T cell activation and differentiation (Quezada S A et al., (2004) *Annu Rev Immunol.* 22:307-328).

CD40 is also expressed on tumors, including B-cell malignancies, lung, bladder, gastric, breast and ovarian cancers, and has been reported to be involved in pathologies of several inflammatory diseases, including autoimmune diseases, atherothrombosis, cancers, and respiratory diseases (Costello et al., (1999) *Immunol Today* 20(11): 488-493; Tong et al., (2003) *Cancer Gene Ther* 10(1): 1-13; Lee et al., (2014) *Curr Cancer Drug Targets* 14(7): 610-620; Ara A et al., (2018) supra; Lee et al., (1999) *Proc Natl Acad Sci USA* 96:9136-9141; Stamenkovic et al., (1989) *EMBO J.* 8:1403-1410). CD40-mediated signaling, on one hand, caused tumor cell growth inhibition and cell death in some B cell-derived tumor lines (Grafton et al., (1997) *Cell. Immunol.* 182:45-56), while, on the other hand, induced increased expression of many factors that protected tumor cells from apoptosis in certain other B-cell malignancies (Lee et al., (1999) *Proc Natl Acad Sci USA* 96:9136-9141).

Agonistic anti-CD40 antibodies that activate or induce CD40 signaling upon binding CD40, and antagonistic anti-CD40 antibodies that block or inhibit CD40 signaling that may be induced by CD40L engagement, have been developed for disease treatment. Selicrelumab (Pfizer and VLST), an agonistic anti-CD40 antibody, has shown clinical efficacy in a number of settings of patients with advanced cancers (Vonderheide et al., (2013) *Clin Cancer Res.* 19(5): 1035-1043). Dacetuzumab (Settte Geneticscs), a weaker CD40 agonist than Selicrelumab, shows anti-tumor activity in diffuse large B cell lymphoma, multiple myeloma and CLL, and has been tested in combination with Rituximab and Gemcitabine in treatment of relapsed or refractory DLBCL (Advani R et al., (2009) *J Clin Oncol.* 27:4371-4377; Furman R R et al., (2010) *Leuk Lymphoma.* 51:228-235; Forero-Torres A et al., (2012) *Leuk Lymphoma* 54(2):277-283). Lucatumumab (Novartis), an antagonistic anti-CD40 antibody, has been tested in clinical trials for treating multiple myeloma and chronic lymphocytic leukemia (Hassan S B et al., (2014) *Immunopharmacol immunotoxicol* 36(2):96-104). Biologics that agonize CD40 signaling also showed efficacy in treating infectious and autoimmune diseases, including HIV-1/AIDS, tuberculosis and malaria (Elizabeth A Thompson, et al., (2015) *J Immunol.* 195(3): 1015-1024).

There remains a need for more anti-CD40 antibodies with improved pharmaceutical characteristics.

Citation or identification of any document in this application is not an admission that such document is available as prior art to the present invention.

SUMMARY OF THE INVENTION

The present disclosure provides an isolated monoclonal antibody, for example, a mouse, human, chimeric or humanized monoclonal antibody, or an antigen-binding portion thereof, that binds to CD40 (e.g., the human CD40, and monkey CD40) and has comparable, if not higher, binding affinity to CD40, and comparable, if not higher, activity of activating CD40 signaling as compared to prior art anti-CD40 antibodies such as Dacetuzumab and Selicrelumab.

The antibody or antigen-binding portion thereof of the disclosure can be used for a variety of applications, including detection of the CD40 protein, and treatment and prevention of CD40 associated diseases, such as cancers, infectious diseases and autoimmune diseases.

Accordingly, in one aspect, the disclosure pertains to an isolated monoclonal antibody (e.g., a mouse, chimeric or humanized antibody), or an antigen-binding portion thereof, that binds CD40, having i) a heavy chain variable region that may comprise a VH CDR1 region, a VH CDR2 region and a VH CDR3 region, wherein the VH CDR1 region, the VH CDR2 region and the VH CDR3 region may comprise amino acid sequences having at least 85%, 86%, 87%, 88%, 89%, 90%, 91%, 92%, 93%, 94%, 95%, 96%, 97%, 98%, 99% or 100% identity to (1) SEQ ID NOs: 1, 4 and 7, respectively; (2) SEQ ID NOs: 2, 5 and 8, respectively; or (3) SEQ ID NOs: 3, 6 and 9, respectively; and/or ii) a light chain variable region that may comprise a VL CDR1 region, a VL CDR2 region and a VL CDR3 region, wherein the VL CDR1 region, the VL CDR2 region, and the VL CDR3 region may comprise amino acid sequences having at least 85%, 86%, 87%, 88%, 89%, 90%, 91%, 92%, 93%, 94%, 95%, 96%, 97%, 98%, 99% or 100% identity to (1) SEQ ID NOs: 10, 13 and 16, respectively; (2) SEQ ID NOs: 11, 14 and 17, respectively; or (3) SEQ ID NOs: 12, 15 and 18, respectively.

The antibody or antigen-binding portion thereof of the disclosure may comprise a heavy chain variable region that may comprise a VH CDR1 region, a VH CDR2 region and a VH CDR3 region, and a light chain variable region that may comprise a VL CDR1 region, a VL CDR2 region and a VL CDR3 region, wherein the VH CDR1 region, the VH CDR2 region, the VH CDR3 region, the VL CDR1 region, the VL CDR2 region, and the VL CDR3 region may comprise amino acid sequences having at least 85%, 86%, 87%, 88%, 89%, 90%, 91%, 92%, 93%, 94%, 95%, 96%, 97%, 98%, 99% or 100% identity to (1) SEQ ID NOs: 1, 4, 7, 10, 13 and 16, respectively; (2) SEQ ID NOs: 2, 5, 8, 11, 14 and 17, respectively; or (3) SEQ ID NOs: 3, 6, 9, 12, 15 and 18, respectively, wherein the antibody or antigen-binding fragment thereof binds to CD40.

The heavy chain variable region of the antibody or antigen-binding portion thereof of the disclosure may comprise an amino acid sequence having at least 85%, 86%, 87%, 88%, 89%, 90%, 91%, 92%, 93%, 94%, 95%, 96%, 97%, 98%, 99% or 100% identity to SEQ ID NOs: 19, 20 (X1=A or S), 21 or 22, wherein the antibody or antigen-binding fragment thereof binds to CD40. The amino acid sequence of SEQ ID NO: 19 may be encoded by nucleotide sequences of SEQ ID NOs: 31 or 32, and the amino acid sequence of SEQ ID NO: 20 (X1=S) may be encoded by the nucleotide sequence of SEQ ID NO: 33.

The light chain variable region of the antibody or antigen-binding portion thereof of the disclosure may comprise an amino acid sequence having at least 85%, 86%, 87%, 88%, 89%, 90%, 91%, 92%, 93%, 94%, 95%, 96%, 97%, 98%, 99% or 100% identity to SEQ ID NOs: 23, 24 (X1=K, X2=F; or X1=Y, X2=Y), 25 or 26, wherein the antibody or antigen-binding fragment thereof binds to CD40. The amino acid sequence of SEQ ID NO: 23 may be encoded by nucleotide sequences of SEQ ID NOs: 34 or 35. The amino acid sequences of SEQ ID NO: 24 (X1=K, X2=F) may be encoded by the nucleotide sequence of SEQ ID NO: 36.

The antibody or antigen-binding portion thereof of the disclosure may comprise a heavy chain variable region and a light chain variable region having amino acid sequences having at least 85%, 86%, 87%, 88%, 89%, 90%, 91%, 92%, 93%, 94%, 95%, 96%, 97%, 98%, 99% or 100% identity to (1) SEQ ID NOs: 19 and 23, respectively; (2) SEQ ID NOs: 20 (X1=A) and 24 (X1=K, X2=F), respectively; (3) SEQ ID NOs: 20 (X1=S) and 24 (X1=K, X2=F), respectively; (4) SEQ ID NOs: 20 (X1=A) and 24 (X1=Y, X2=Y), respectively; (5) SEQ ID NOs: 20 (X1=S) and 24 (X1=Y, X2=Y), respectively; (6) SEQ ID NOs: 21 and 25, respectively; or (7) SEQ ID NOs: 22 and 26, respectively, wherein the antibody or antigen-binding fragment thereof binds to CD40.

The isolated monoclonal antibody, or the antigen-binding portion thereof, of the present disclosure may comprise a heavy chain and a light chain linked by disulfide bonds, the heavy chain may comprise a heavy chain variable region and a heavy chain constant region, the light chain may comprise a light chain variable region and a light chain constant region, wherein the C terminus of the heavy chain variable region is linked to the N terminus of the heavy chain constant region, and the C terminus of the light chain variable region is linked to the N terminus of the light chain constant region, wherein the heavy chain variable region and the light chain variable region may comprise amino acid sequences described above, and the antibody or antigen-binding portion thereof binds to CD40. The heavy chain constant region may be human IgG2 constant region having the amino acid sequence set forth in e.g., SEQ ID NO.:28, or human IgG1 constant region having the amino acid sequence set forth in e.g., SEQ ID NO: 27, and the light chain constant region may be human kappa constant region having the amino acid sequences set forth in e.g., SEQ ID NO.: 29. The heavy chain constant region, such as the Fc fragment, may be engineered to have reduced or enhanced FcR binding affinity. The amino acid sequences of SEQ ID NOs: 27, 28 and 29 may be encoded by the nucleotide sequences of SEQ ID NOs: 37, 38 and 39, respectively.

The antibody of the present disclosure in certain embodiments may comprise or consist of two heavy chains and two light chains, wherein each heavy chain may comprise the heavy chain constant region, heavy chain variable region or CDR sequences mentioned above, and each light chain may comprise the light chain constant region, light chain variable region or CDR sequences mentioned above, wherein the antibody binds to CD40. The antibody of the disclosure can be a full-length antibody, for example, of an IgG1, IgG2 or IgG4 isotype. The antibody or the antigen-binding portion thereof of the present disclosure in other embodiments may be a single chain variable fragment (scFv) antibody, or antibody fragments, such as Fab or F(ab')$_2$ fragments.

The disclosure also provides a bispecific molecule that may comprise the antibody, or the antigen-binding portion thereof, of the disclosure, linked to a second functional moiety (e.g., a second antibody) having a different binding specificity than said antibody, or antigen-binding portion thereof. The disclosure also provides an immunoconjugate, such as an antibody-drug conjugate, that may comprise an antibody, or antigen-binding portion thereof, of the disclosure, linked to a therapeutic agent, such as a cytotoxin. In another aspect, the antibody or the antigen binding portion thereof of the present disclosure can be made into part of a chimeric antigen receptor (CAR). Also provided is an immune cell that may comprise the antigen chimeric receptor, such as a T cell and a NK cell. The antibody or the antigen binding portion thereof of the present disclosure can also be encoded by or used in conjunction with an oncolytic virus.

Nucleic acid molecules encoding the antibody, or the antigen-binding portion thereof, of the disclosure are also encompassed by the disclosure, as well as expression vectors that may comprise such nucleic acids and host cells that may comprise such expression vectors. A method for preparing the anti-CD40 antibody or the antigen-binding portion thereof of the disclosure using the host cell is also provided, that may comprise steps of (i) expressing the antibody in the host cell and (ii) isolating the antibody from the host cell or its cell culture.

Compositions that may comprise the antibody, or the antigen-binding portion thereof, the immunoconjugate, the bispecific molecule, the oncolytic virus, the CAR, the CAR-T cell, the nucleic acid molecule, the expression vector or the host cells of the disclosure, and a pharmaceutically acceptable carrier, are also provided. In certain embodiments, the pharmaceutical composition may further contain a therapeutic agent such as an anti-cancer agent.

In yet another aspect, the disclosure provides a method of modulating an immune response in a subject comprising administering to the subject the antibody, or antigen-binding portion thereof, of the disclosure such that the immune response in the subject is modulated. Preferably, the antibody or antigen-binding portion thereof of the disclosure enhances, stimulates or increases the immune response in the subject. In some embodiments, the method comprises administering a bispecific molecule, an immunnoconjugate, a CAR-T cell, or an antibody-encoding or antibody-bearing oncolytic virus of the disclosure, or alternatively a nucleic acid molecule capable of expressing the same in the subject.

In a further aspect, the disclosure provides a method of inhibiting tumor growth in a subject in need thereof, comprising administering to a subject a therapeutically effective amount of the composition of the present disclosure. The tumor may be a solid or non-solid tumor, including, but not limited to, B cell lymphoma, chronic lymphocytic leukemia, multiple myeloma, melanoma, colon adenocarcinoma, pancreas cancer, colon cancer, gastric intestine cancer, prostate cancer, bladder cancer, kidney cancer, ovary cancer, cervix cancer, breast cancer, lung cancer, and nasopharynx cancer. In some embodiments, at least one additional anti-cancer antibody can be administered with the antibody, or an antigen-binding portion thereof, of the disclosure, such as an anti-VISTA antibody, an anti-PD-1 antibody, an anti-PD-L1 antibody, an anti-LAG-3 antibody, an anti-CTLA-4 antibody, an anti-TIM-3 antibody, an anti-STAT3 antibody, and/or an anti-ROR1 antibody. In yet another embodiment, an antibody, or an antigen-binding portion thereof, of the disclosure is administered with a cytokine (e.g., IL-2, IL-21, GM-CSF and/or IL-4), or a costimulatory antibody (e.g., an anti-CD137 and/or anti-GITR antibody). In another embodiment, an antibody, or an antigen-binding portion thereof, of the disclosure is administered with a chemotherapeutic agent, which may be a cytotoxic agent, such as epirubicin, oxaliplatin, and/or 5-fluorouracil (5-FU). The antibody or antigen-binding portion thereof of the present disclosure may be, for example, mouse, human, chimeric or humanized.

In another aspect, the disclosure provides a method of treating or alleviating an infectious disease in a subject in need thereof, comprising administering to a subject a therapeutically effective amount of the composition of the present disclosure. The infectious disease may be a disease caused by viral, bacterial, fungal or mycoplasma infection. In certain embodiments, the infectious disease is AIDS, tuberculosis or malaria. In certain embodiments, the subject may be further administered with at least one an anti-infective agent, such as an anti-viral agent, an anti-bacterial agent, an anti-fungal agent, or an anti-mycoplasma agent.

In another aspect, the disclosure provides a method of treating or alleviating an autoimmune disease in a subject in need thereof, comprising administering to the subject a therapeutically effective amount of the composition of the disclosure. In certain embodiments, the subject may be further administered with at least one anti-inflammatory agent.

Other features and advantages of the instant disclosure will be apparent from the following detailed description and examples, which should not be construed as limiting. The contents of all references, Genbank entries, patents and published patent applications cited throughout this application are expressly incorporated herein by reference.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

DETAILED DESCRIPTION OF THE INVENTION

Figure 1A:
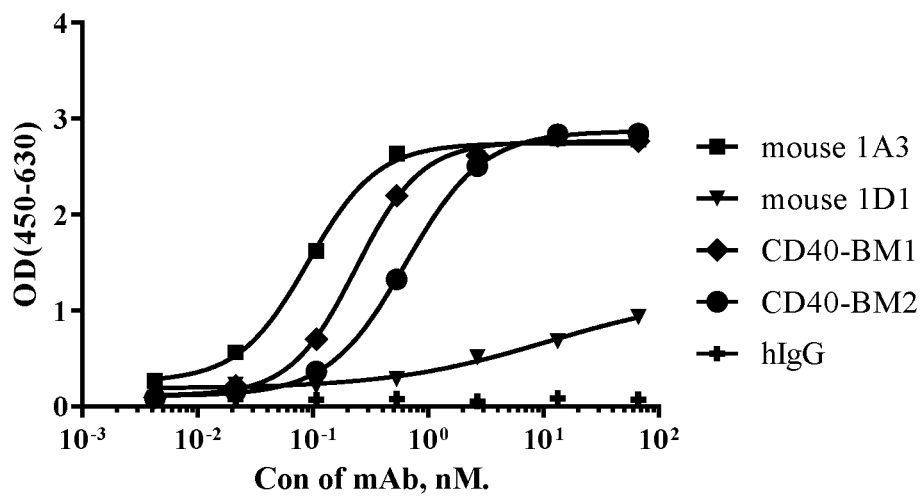
FIGS. 1A and 1B show the binding capacities of mouse antibodies 1A3 and 1D1 (A), and C1H1 (B) to human CD40 in a capture ELISA.
Figure 1B:
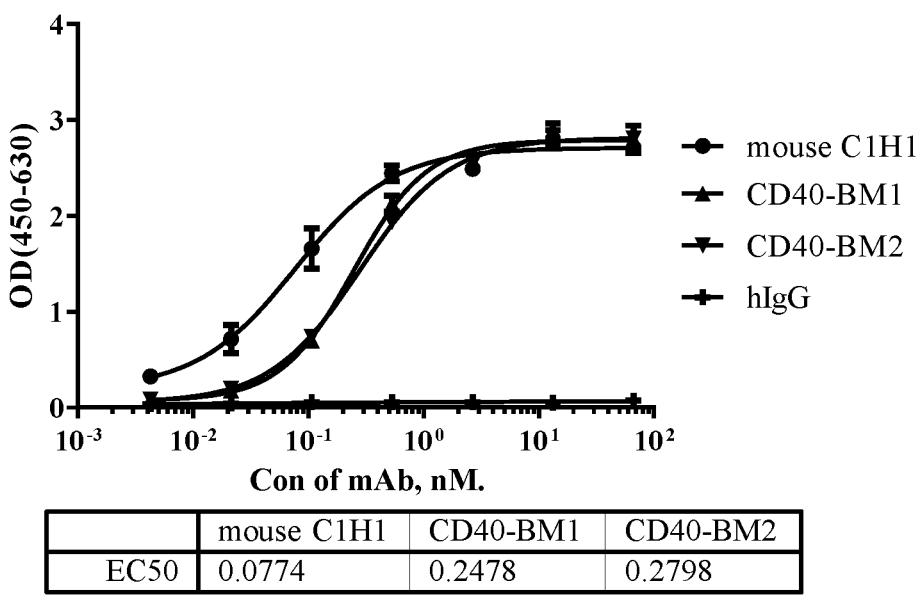
Figure 2A:
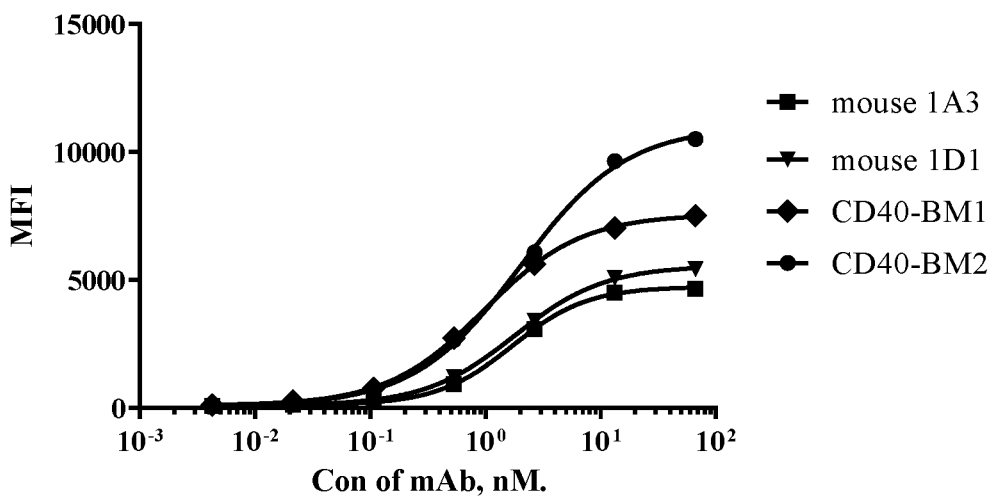
FIGS. 2A and 2B show the binding capacities of mouse antibodies 1A3 and 1D1 (A), and C1H1 (B) to 293T cells expressing human CD40 in a cell based binding FACS.
Figure 2B:
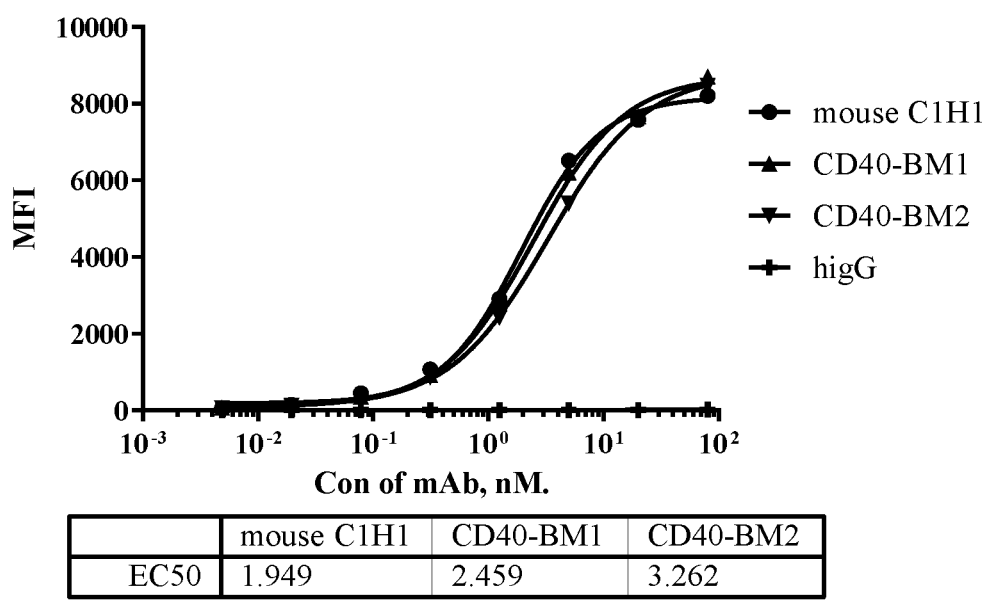

To ensure that the present disclosure may be more readily understood, certain terms are first defined. Additional definitions are set forth throughout the detailed description.

The term "CD40" refers to tumor necrosis factor receptor superfamily member 5 (TNFR5). The term "CD40" comprises variants, isoforms, homologs, orthologs and paralogs. For example, an antibody specific for a human CD40 protein may, in certain cases, cross-react with a CD40 protein from a species other than human, such as monkey. In other embodiments, an antibody specific for a human CD40 protein may be completely specific for the human CD40 protein and exhibit no cross-reactivity to other species or of other types, or may cross-react with CD40 from certain other species but not all other species.

The term "human CD40" refers to a CD40 protein having an amino acid sequence from a human, such as the amino acid sequence of human CD40 having a Genbank accession number of NP_001241.1 (Amini M et al., (2020) *Life Sci* 254: 117774). The terms "monkey or rhesus CD40" and "mouse CD40" refer to monkey and mouse CD40 sequences, respectively, e.g. those with the amino acid sequences having Genbank Accession Nos. NP_001252791.1 and NP_035741.2, respectively.

The term "immune response" refers to the action of, for example, lymphocytes, antigen presenting cells, phagocytic cells, granulocytes, and soluble macromolecules produced by the above cells or the liver (including antibodies, cytokines, and complement) that results in selective damage to, destruction of, or elimination from the human body of invading pathogens, cells or tissues infected with pathogens, cancerous cells, or, in cases of autoimmunity or pathological inflammation, normal human cells or tissues.

The term "antibody" as used herein refers to an immunoglobulin molecule that recognizes and specifically binds a target, such as CD40, through at least one antigen-binding site wherein the antigen-binding site is usually within the variable region of the immunoglobulin molecule. As used herein, the term encompasses intact polyclonal antibodies, intact monoclonal antibodies, single-chain Fv (scFv) antibodies, heavy chain antibodies (HCAbs), light chain antibodies (LCAbs), multispecific antibodies, bispecific antibodies, monospecific antibodies, monovalent antibodies, fusion proteins comprising an antigen-binding site of an antibody, and any other modified immunoglobulin molecule comprising an antigen-binding site (e.g., dual variable domain immunoglobulin molecules) as long as the antibodies exhibit the desired biological activity. Antibodies also include, but are not limited to, mouse antibodies, chimeric antibodies, humanized antibodies, and human antibodies. An antibody can be any of the five major classes of immunoglobulins: IgA, IgD, IgE, IgG, and IgM, or subclasses (isotypes) thereof (e.g., IgG1, IgG2, IgG3, IgG4, IgA1 and IgA2), based on the identity of their heavy-chain constant domains referred to as alpha, delta, epsilon, gamma, and mu, respectively. The different classes of immunoglobulins have different and well-known subunit structures and three-dimensional configurations. Antibodies can be naked or conjugated to other molecules, including but not limited to, toxins and radioisotopes. Unless expressly indicated otherwise, the term "antibody" as used herein include "antigen-binding portion" of the intact antibodies. An IgG is a glycoprotein which may comprise two heavy (H) chains and two light (L) chains inter-connected by disulfide bonds. Each heavy chain may be comprised of a heavy chain variable region (abbreviated herein as $V_H$) and a heavy chain constant region. The heavy chain constant region may be comprised of three domains, $C_{H1}$, $C_{H2}$ and $C_{H3}$. Each light chain may be comprised of a light chain variable region (abbreviated herein as $V_L$) and a light chain constant region. The light chain constant region may be comprised of one domain, $C_L$. The $V_H$ and $V_L$ regions can be further subdivided into regions of hypervariability, termed complementarity determining regions (CDR), interspersed with regions that are more conserved, termed framework regions (FR). Each $V_H$ and $V_L$ is composed of three CDRs and four FRs, arranged from amino-terminus to carboxy-terminus in the following order: FR1, CDR1, FR2, CDR2, FR3, CDR3, FR4. The variable regions of the heavy and light chains contain a binding domain that interacts with an antigen. The constant regions of the antibodies can mediate the binding of the immunoglobulin to host tissues or factors, including various cells of the immune system (e.g., effector cells) and the first component (C1q) of the classical complement system.

The term "antigen-binding portion" of an antibody (or simply "antibody portion"), as used herein, refers to one or more fragments of an antibody that retain the ability to specifically bind to an antigen (e.g., a CD40 protein). It has been shown that the antigen-binding function of an antibody can be performed by fragments of a full-length antibody. Examples of binding fragments encompassed within the term "antigen-binding portion" of an antibody include (i) a Fab fragment, a monovalent fragment consisting of the $V_L$, $V_H$, $C_L$ and $C_{H1}$ domains; (ii) a F(ab')$_2$ fragment, a bivalent fragment which may comprise two Fab fragments linked by a disulfide bridge at the hinge region; (iii) a Fd fragment consisting of the $V_H$ and $C_{H1}$ domains; (iv) a Fv fragment consisting of the $V_L$ and $V_H$ domains of a single arm of an antibody, (v) a dAb fragment (Ward et al., (1989) *Nature* 341:544-546), which consists of a $V_H$ domain; (vi) an isolated complementarity determining region (CDR); and (viii) a nanobody, a heavy chain variable region containing a single variable domain and two constant domains. Furthermore, although the two domains of the Fv fragment, $V_L$ and $V_H$, are coded by separate genes, they can be joined, using recombinant methods, by a synthetic linker that enables them to be made as a single protein chain in which the $V_L$ and $V_H$ regions pair to form monovalent molecules (known as single chain Fv (scFv); see e.g., Bird et al., (1988) *Science* 242:423-426; and Huston et al., (1988) *Proc. Natl. Acad. Sci. USA* 85:5879-5883). Such single chain antibodies are also intended to be encompassed within the term "antigen-binding portion" of an antibody. These antibody fragments are obtained using conventional techniques known to those with skill in the art, and the fragments are screened for utility in the same manner as are intact antibodies.

An "isolated antibody", as used herein, is intended to refer to an antibody that is substantially free of other antibodies having different antigenic specificities (e.g., an isolated antibody that specifically binds a CD40 protein is substantially free of antibodies that specifically bind antigens other than CD40 proteins). An isolated antibody that specifically binds a human CD40 protein may, however, have cross-reactivity to other antigens, such as CD40 proteins from other species. Moreover, an isolated antibody can be substantially free of other cellular material and/or chemicals.

The terms "monoclonal antibody" or "monoclonal antibody composition" as used herein refer to a preparation of antibody molecules of single molecular composition. A monoclonal antibody composition displays a single binding specificity and affinity for a particular epitope.

The term "mouse antibody", as used herein, is intended to include antibodies having variable regions in which both the framework and CDR regions are derived from mouse germline immunoglobulin sequences. Furthermore, if the antibody contains a constant region, the constant region also is derived from mouse germline immunoglobulin sequences. The mouse antibodies of the disclosure can include amino acid residues not encoded by mouse germline immunoglobulin sequences (e.g., mutations introduced by random or site-specific mutagenesis in vitro or by somatic mutation in vivo). However, the term "mouse antibody", as used herein, is not intended to include antibodies in which CDR sequences derived from the germline of another mammalian species have been grafted onto mouse framework sequences.

The term "chimeric antibody" refers to an antibody made by combining genetic material from a nonhuman source with genetic material from a human being. Or more generally, a chimeric antibody is an antibody having genetic material from a certain species with genetic material from another species.

The term "humanized antibody", as used herein, refers to an antibody from non-human species whose protein sequences have been modified to increase similarity to antibody variants produced naturally in humans.

The phrases "an antibody recognizing an antigen" and "an antibody specific for an antigen" are used interchangeably herein with the term "an antibody which binds specifically to an antigen."

As used herein, an antibody or antigen-binding portion thereof that "specifically binds to human CD40" is intended to refer to an antibody that binds to human CD40 protein (and possibly a CD40 protein from one or more non-human species) but does not substantially bind to non-CD40 proteins. Preferably, the antibody binds to human CD40 protein with "high affinity", namely with a $K_D$ of $5.0 \times 10^{-8}$ M or less, and more preferably $1.0 \times 10^{-8}$ M or less.

The term "does not substantially bind" to a protein or cells, as used herein, means does not bind or does not bind with a high affinity to the protein or cells, i.e. binds to the protein or cells with a $K_D$ of $1.0 \times 10^{-6}$ M or more, more preferably $1.0 \times 10^{-5}$ M or more, more preferably $1.0 \times 10^{-4}$ M or more, more preferably $1.0 \times 10^{-3}$ M or more, even more preferably $1.0 \times 10^{-2}$ M or more.

The term "high affinity" for an IgG antibody refers to an antibody having a $K_D$ of $1.0 \times 10^{-6}$ M or less, more preferably $9.0 \times 10^{-9}$ M or less, more preferably $5.0 \times 10^{-9}$ M or less, even more preferably $1.0 \times 10^{-9}$ M or less, and even more preferably $5.0 \times 10^{-10}$ M or less for a target antigen. However, "high affinity" binding can vary for other antibody isotypes. For example, "high affinity" binding for an IgM isotype refers to an antibody having a $K_D$ of $10^{-6}$ M or less, more preferably $10^{-7}$ M or less, even more preferably $10^{-8}$ M or less.

The term "$K_{assoc}$" or "$K_a$", as used herein, is intended to refer to the association rate of a particular antibody-antigen interaction, whereas the term "$K_{dis}$" or "$K_d$", as used herein, is intended to refer to the dissociation rate of a particular antibody-antigen interaction. The term "$K_D$", as used herein, is intended to refer to the dissociation constant, which is obtained from the ratio of $K_d$ to $K_a$ (i.e., $K_d/K_a$) and is expressed as a molar concentration (M). $K_D$ values for antibodies can be determined using methods well established in the art. A preferred method for determining the $K_D$ of an antibody is by using surface plasmon resonance, preferably using a biosensor system such as a Biacore™ system.

The term "$EC_{50}$", also known as half maximal effective concentration, refers to the concentration of an antibody which induces a response halfway between the baseline and maximum after a specified exposure time.

The term "$IC_{50}$", also known as half maximal inhibitory concentration, refers to the concentration of an antibody which inhibits a specific biological or biochemical function by 50% relative to the absence of the antibody.

The term "subject" includes any human or nonhuman animal. The term "nonhuman animal" includes all vertebrates, e.g., mammals and non-mammals, such as non-human primates, sheep, dogs, cats, cows, horses, chickens, amphibians, and reptiles, although mammals are preferred, such as non-human primates, sheep, dogs, cats, cows and horses.

The term "therapeutically effective amount" means an amount of the antibody or antigen-binding portion thereof of the present disclosure sufficient to prevent or ameliorate the symptoms associated with a disease or condition (such as a cancer) and/or lessen the severity of the disease or condition. A therapeutically effective amount is understood to be in context to the condition being treated, where the actual effective amount is readily discerned by those of skill in the art.

The term "agonistic CD40 antibody" or "agonistic anti-CD40 antibody" refers to an anti-CD40 antibody that binds to CD40 and activates or induces CD40 signaling to e.g., promote immune cell activation and proliferation as well as cytokine and chemokine production. While the term "antagonistic CD40 antibody" refers to an anti-CD40 antibody that blocks or inhibits CD40 signaling that may be induced by CD40L engagement. The agonistic CD40 antibody may promote a tumor-bearing subject's innate and adaptive immune response to tumors, via elevated antigen presenting ability of APCs, activation of tumor specific CD4+ and CD8+ T cells, secretion of cytokines and chemokines by lymphocytes and monocytes, enhanced tumor cell killings by cytotoxic lymphocytes and NK cells, etc.

The percent "identity" as used herein in the context of two or more nucleic acids or polypeptides, refers to two or more sequences or subsequences that are the same or have a specified percentage of nucleotides or amino acid residues that are the same, when compared and aligned (introducing gaps, if necessary) for maximum correspondence, considering or not considering conservative amino acid substitutions as part of the sequence identity. The percent identity can be measured using sequence comparison software or algorithms or by visual inspection. Various algorithms and software that can be used to obtain alignments of amino acid or nucleotide sequences are well-known in the art. These include, but are not limited to, BLAST, ALIGN, Megalign, BestFit, GCG Wisconsin Package, and variants thereof. In some embodiments, two nucleic acids or polypeptides of the invention are substantially identical, meaning they have at least 70%, at least 75%, at least 80%, at least 85%, at least 90%, and in some embodiments at least 95%, 96%, 97%, 98%, 99% nucleotide or amino acid residue identity, when compared and aligned for maximum correspondence, as measured using a sequence comparison algorithm or by visual inspection.

Various aspects of the disclosure are described in further detail in the following subsections.

The antibody, or the antigen-binding portion thereof, of the disclosure specifically binds to human CD40 with comparable, if not better, binding affinity as compared to previously described anti-CD40 antibodies, such as Dacetuzumab and Selicrelumab.

Additional functional properties include the capacity to block CD40-CD40L binding, and to activate CD40 signaling.

Preferred antibodies of the disclosure are humanized monoclonal antibodies. Additionally or alternatively, the antibodies can be, for example, chimeric monoclonal antibodies.

within such chains) are mixed and matched, a $V_H$ sequence from a particular $V_H/V_L$ pairing is replaced with a structurally similar $V_H$ sequence. Likewise, preferably a $V_L$ sequence from a particular $V_H/V_L$ pairing is replaced with a structurally similar $V_L$ sequence.

Accordingly, in one embodiment, an antibody of the disclosure, or an antigen binding portion thereof, comprises:
(a) a heavy chain variable region comprising an amino acid sequence listed above in Table 1; and
(b) a light chain variable region comprising an amino acid sequence listed above in Table 1, or the $V_L$ of another anti-CD40 antibody, wherein the antibody specifically binds human CD40.

In another embodiment, an antibody of the disclosure, or an antigen binding portion thereof, comprises:
(a) the CDR1, CDR2, and CDR3 regions of the heavy chain variable region listed above in Table 1; and
(b) the CDR1, CDR2, and CDR3 regions of the light chain variable region listed above in Table 1 or the CDRs of another anti-CD40 antibody, wherein the antibody specifically binds human CD40.

In yet another embodiment, the antibody, or antigen binding portion thereof, includes the heavy chain variable CDR2 region of anti-CD40 antibody combined with CDRs of other antibodies which bind human CD40, e.g., CDR1

TABLE 1

Amino acid sequence ID numbers of heavy/light chain variable regions

| Antibody | $V_H$ CDR1 | $V_H$ CDR2 | $V_H$ CDR3 | $V_H$ | $V_L$ CDR1 | $V_L$ CDR2 | $V_L$ CDR3 | $V_L$ |
|---|---|---|---|---|---|---|---|---|
| C1H1 | 1 | 4 | 7 | 19 | 10 | 13 | 16 | 23 |
| huC1H1-V1 | 1 | 4 | 7 | 20, X1 = A | 10 | 13 | 16 | 24, X1 = K, X2 = F |
| huC1H1-V2 | 1 | 4 | 7 | 20, X1 = S | 10 | 13 | 16 | 24, X1 = K, X2 = F |
| hu-C1H1-V3 | 1 | 4 | 7 | 20, X1 = A | 10 | 13 | 16 | 24, X1 = Y, X2 = Y |
| huC1H1-V4 | 1 | 4 | 7 | 20, X1 = S | 10 | 13 | 16 | 24, X1 = Y, X2 = Y |
| 1A3 | 2 | 5 | 8 | 21 | 11 | 14 | 17 | 25 |
| 1D1 | 3 | 6 | 9 | 22 | 12 | 15 | 18 | 26 |

The exemplary antibody or antigen-binding portion thereof of the disclosure is structurally and chemically characterized as described below and in the following Examples. The amino acid sequence ID numbers of the heavy/light chain variable regions of the antibodies are summarized in Table 1 below, some antibodies sharing the same $V_H$ or $V_L$. The heavy chain constant region for the antibodies may be human IgG1 or IgG2 heavy chain constant region having an amino acid sequence set forth in, e.g., SEQ ID NOs: 27 and 28, respectively, and the light chain constant region for the antibodies may be human kappa constant region having an amino acid sequence set forth in, e.g., SEQ ID NO: 29. These antibodies may also contain mouse IgG1 or IgG2 heavy chain constant region, and/or mouse kappa constant region.

The heavy chain variable region CDRs and the light chain variable region CDRs in Table 1 have been defined by the Kabat numbering system. However, as is well known in the art, CDR regions can also be determined by other systems such as Chothia, and IMGT, AbM, or Contact numbering system/method, based on heavy chain/light chain variable region sequences.

The $V_H$ and $V_L$ sequences (or CDR sequences) of other anti-CD40 antibodies which bind to human CD40 can be "mixed and matched" with the $V_H$ and $V_L$ sequences (or CDR sequences) of the anti-CD40 antibody of the present disclosure. Preferably, when $V_H$ and $V_L$ chains (or the CDRs and/or CDR3 from the heavy chain variable region, and/or CDR1, CDR2, and/or CDR3 from the light chain variable region of a different anti-CD40 antibody.

In addition, it is well known in the art that the CDR3 domain, independently from the CDR1 and/or CDR2 domain(s), alone can determine the binding specificity of an antibody for a cognate antigen and that multiple antibodies can predictably be generated having the same binding specificity based on a common CDR3 sequence. See, e.g., Klimka et al., *British J. of Cancer* 83(2):252-260 (2000); Beiboer et al., *J. Mol. Biol.* 296:833-849 (2000); Rader et al., *Proc. Natl. Acad. Sci. U.S.A.* 95:8910-8915 (1998); Barbas et al., *J. Am. Chem. Soc.* 116:2161-2162 (1994); Barbas et al., *Proc. Natl. Acad. Sci. U.S.A.* 92:2529-2533 (1995); Ditzel et al., *J. Immunol.* 157:739-749 (1996); Berezov et al., *BIAjournal 8: Scientific Review* 8 (2001); Igarashi et al., *J. Biochem* (Tokyo) 117:452-7 (1995); Bourgeois et al., *J. Virol* 72:807-10 (1998); Levi et al., *Proc. Natl. Acad. Sci. U.S.A.* 90:4374-8 (1993); Polymenis and Stoller, *J. Immunol.* 152: 5218-5329 (1994) and Xu and Davis, Immunity 13:37-45 (2000). See also, U.S. Pat. Nos. 6,951,646; 6,914,128; 6,090,382; 6,818,216; 6,156,313; 6,827,925; 5,833,943; 5,762,905 and 5,760,185. Each of these references is hereby incorporated by reference in its entirety.

Accordingly, in another embodiment, antibodies of the disclosure comprise the CDR2 of the heavy chain variable region of the anti-CD40 antibody and at least the CDR3 of the heavy and/or light chain variable region of the anti-CD40 antibody, or the CDR3 of the heavy and/or light chain variable region of another anti-CD40 antibody, wherein the antibody is capable of specifically binding to human CD40. These antibodies preferably (a) compete for binding with CD40; (b) retain the functional characteristics; (c) bind to the same epitope; and/or (d) have a similar binding affinity as the anti-CD40 antibody of the present disclosure. In yet another embodiment, the antibodies further may comprise the CDR2 of the light chain variable region of the anti-CD40 antibody, or the CDR2 of the light chain variable region of another anti-CD40 antibody, wherein the antibody is capable of specifically binding to human CD40. In another embodiment, the antibodies of the disclosure may further include the CDR1 of the heavy and/or light chain variable region of the anti-CD40 antibody, or the CDR1 of the heavy and/or light chain variable region of another anti-CD40 antibody, wherein the antibody is capable of specifically binding to human CD40.

In another embodiment, an antibody of the disclosure comprises a heavy and/or light chain variable region sequences of CDR1, CDR2 and CDR3 sequences which differ from those of the anti-CD40 antibodies of the present disclosure by one or more conservative modifications. It is understood in the art that certain conservative sequence modification can be made which do not remove antigen binding. See, e.g., Brummell et al., (1993) *Biochem* 32:1180-8; de Wildt et al., (1997) *Prot. Eng.* 10:835-41; Komissarov et al., (1997) *J. Biol. Chem.* 272:26864-26870; Hall et al., (1992) *J. Immunol.* 149:1605-12; Kelley and O'Connell (1993) *Biochem.* 32:6862-35; Adib-Conquy et al., (1998) *Int. Immunol.* 10:341-6 and Beers et al., (2000) *Clin. Can. Res.* 6:2835-43.

Accordingly, in one embodiment, the antibody comprises a heavy chain variable region comprising CDR1, CDR2, and CDR3 sequences and/or a light chain variable region comprising CDR1, CDR2, and CDR3 sequences, wherein:
  (a) the heavy chain variable region CDR1 sequence comprises a sequence listed in Table 1 above, and/or conservative modifications thereof; and/or
  (b) the heavy chain variable region CDR2 sequence comprises a sequence listed in Table 1 above, and/or conservative modifications thereof; and/or
  (c) the heavy chain variable region CDR3 sequence comprises a sequence listed in Table 1 above, and/or conservative modifications thereof; and/or
  (d) the light chain variable region CDR1, and/or CDR2, and/or CDR3 sequences comprise the sequence(s) listed in Table 1 above; and/or conservative modifications thereof; and
  (e) the antibody specifically binds human CD40.

The antibody of the present disclosure possesses one or more of the following functional properties described above, such as high affinity binding to human CD40, and the ability to activate CD40 signaling in CD40-expressing cells.

In various embodiments, the antibody can be, for example, a mouse, human, humanized or chimeric antibody.

As used herein, the term "conservative sequence modifications" is intended to refer to amino acid modifications that do not significantly affect or alter the binding characteristics of the antibody containing the amino acid sequence. Such conservative modifications include amino acid substitutions, additions and deletions. Modifications can be introduced into an antibody of the disclosure by standard techniques known in the art, such as site-directed mutagenesis and PCR-mediated mutagenesis. Conservative amino acid substitutions are ones in which the amino acid residue is replaced with an amino acid residue having a similar side chain. Families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine, tryptophan), nonpolar side chains (e.g., alanine, valine, leucine, isoleucine, proline, phenylalanine, methionine), beta-branched side chains (e.g., threonine, valine, isoleucine) and aromatic side chains (e.g., tyrosine, phenylalanine, tryptophan, histidine). Thus, one or more amino acid residues within the CDR regions of an antibody of the disclosure can be replaced with other amino acid residues from the same side chain family and the altered antibody can be tested for retained function (i.e., the functions set forth above) using the functional assays described herein.

Antibodies of the disclosure can be prepared using an antibody having one or more of the $V_H/V_L$ sequences of the anti-CD40 antibody of the present disclosure as starting material to engineer a modified antibody. An antibody can be engineered by modifying one or more residues within one or both variable regions (i.e., $V_H$ and/or $V_L$), for example within one or more CDR regions and/or within one or more framework regions. Additionally or alternatively, an antibody can be engineered by modifying residues within the constant region(s), for example to alter the effector function(s) of the antibody.

In certain embodiments, CDR grafting can be used to engineer variable regions of antibodies. Antibodies interact with target antigens predominantly through amino acid residues that are located in the six heavy and light chain complementarity determining regions (CDRs). For this reason, the amino acid sequences within CDRs are more diverse between individual antibodies than sequences outside of CDRs. Because CDR sequences are responsible for most antibody-antigen interactions, it is possible to express recombinant antibodies that mimic the properties of specific naturally occurring antibodies by constructing expression vectors that include CDR sequences from the specific naturally occurring antibody grafted onto framework sequences from a different antibody with different properties (see, e.g., Riechmann et al., (1998) *Nature* 332:323-327; Jones et al., (1986) *Nature* 321:522-525; Queen et al., (1989) *Proc. Natl. Acad.* See also U.S.A. 86:10029-10033; U.S. Pat. Nos. 5,225,539; 5,530,101; 5,585,089; 5,693,762 and 6,180,370).

Accordingly, another embodiment of the disclosure pertains to an isolated monoclonal antibody, or antigen binding portion thereof, comprising a heavy chain variable region comprising CDR1, CDR2, and CDR3 sequences comprising the sequences of the present disclosure, as described above, and/or a light chain variable region comprising CDR1, CDR2, and CDR3 sequences comprising the sequences of the present disclosure, as described above. While these antibodies contain the $V_H$ and $V_L$ CDR sequences of the monoclonal antibody of the present disclosure, they can contain different framework sequences.

Such framework sequences can be obtained from public DNA databases or published references that include germline antibody gene sequences. For example, germline DNA sequences for human heavy and light chain variable region genes can be found in the "VBase" human germline sequence database (available on the Internet at www.mrc-cpe.cam.ac.uk/vbase), as well as in Kabat et al., (1991), cited supra; Tomlinson et al., (1992) *J. Mol. Biol.* 227:776-798; and Cox et al., (1994) *Eur. J. Immunol.* 24:827-836; the contents of each of which are expressly incorporated herein by reference. As another example, the germline DNA sequences for human heavy and light chain variable region genes can be found in the Genbank database. For example, the following heavy chain germline sequences found in the HCo7 HuMAb mouse are available in the accompanying Genbank Accession Nos.: 1-69 (NG-0010109, NT-024637 & BC070333), 3-33 (NG-0010109 & NT-024637) and 3-7 (NG-0010109 & NT-024637). As another example, the following heavy chain germline sequences found in the HCo12 HuMAb mouse are available in the accompanying Genbank Accession Nos.: 1-69 (NG-0010109, NT-024637 & BC070333), 5-51 (NG-0010109 & NT-024637), 4-34 (NG-0010109 & NT-024637), 3-30.3 (CAJ556644) & 3-23 (AJ406678).

Antibody protein sequences are compared against a compiled protein sequence database using one of the sequence similarity searching methods called the Gapped BLAST (Altschul et al., (1997), supra), which is well known to those skilled in the art.

Preferred framework sequences for use in the antibodies of the disclosure are those that are structurally similar to the framework sequences used by antibodies of the disclosure. The $V_H$ CDR1, CDR2, and CDR3 sequences can be grafted onto framework regions that have the identical sequence as that found in the germline immunoglobulin gene from which the framework sequence derives, or the CDR sequences can be grafted onto framework regions that contain one or more mutations as compared to the germline sequences. For example, it has been found that in certain instances it is beneficial to mutate residues within the framework regions to maintain or enhance the antigen binding ability of the antibody (see e.g., U.S. Pat. Nos. 5,530,101; 5,585,089; 5,693,762 and 6,180,370).

Another type of variable region modification is to mutate amino acid residues within the $V_H$ and/or $V_L$ CDR1, CDR2 and/or CDR3 regions to thereby improve one or more binding properties (e.g., affinity) of the antibody of interest. Site-directed mutagenesis or PCR-mediated mutagenesis can be performed to introduce the mutation(s) and the effect on antibody binding, or other functional property of interest, can be evaluated in in vitro or in vivo assays as known in the art. Preferably conservative modifications (as known in the art) are introduced. The mutations can be amino acid substitutions, additions or deletions, but are preferably substitutions. Moreover, typically no more than one, two, three, four or five residues within a CDR region are altered.

Accordingly, in another embodiment, the disclosure provides isolated anti-CD40 monoclonal antibodies, or antigen binding portions thereof, comprising a heavy chain variable region comprising: (a) a $V_H$ CDR1 region comprising the sequence of the present disclosure, or an amino acid sequence having one, two, three, four or five amino acid substitutions, deletions or additions; (b) a $V_H$ CDR2 region comprising the sequence of the present disclosure, or an amino acid sequence having one, two, three, four or five amino acid substitutions, deletions or additions; (c) a $V_H$ CDR3 region comprising the sequence of the present disclosure, or an amino acid sequence having one, two, three, four or five amino acid substitutions, deletions or additions; (d) a $V_L$ CDR1 region comprising the sequence of the present disclosure, or an amino acid sequence having one, two, three, four or five amino acid substitutions, deletions or additions; (e) a $V_L$ CDR2 region comprising the sequence of the present disclosure, or an amino acid sequence having one, two, three, four or five amino acid substitutions, deletions or additions; and (f) a $V_L$ CDR3 region comprising the sequence of the present disclosure, or an amino acid sequence having one, two, three, four or five amino acid substitutions, deletions or additions.

Engineered antibodies of the disclosure include those in which modifications have been made to framework residues within $V_H$ and/or $V_L$, e.g. to improve the properties of the antibody. Typically, such framework modifications are made to decrease the immunogenicity of the antibody. For example, one approach is to "backmutate" one or more framework residues to the corresponding germline sequence. More specifically, an antibody that has undergone somatic mutation can contain framework residues that differ from the germline sequence from which the antibody is derived. Such residues can be identified by comparing the antibody framework sequences to the germline sequences from which the antibody is derived.

Another type of framework modification involves mutating one or more residues within the framework region, or even within one or more CDR regions, to remove T cell epitopes to thereby reduce the potential immunogenicity of the antibody. This approach is also referred to as "deimmunization" and is described in further detail in U.S. Patent Publication No. 20030153043.

In addition, or as an alternative to modifications made within the framework or CDR regions, antibodies of the disclosure can be engineered to include modifications within the Fc region, typically to alter one or more functional properties of the antibody, such as serum half-life, complement fixation, Fc receptor binding, and/or antigen-dependent cellular cytotoxicity. Furthermore, an antibody of the disclosure can be chemically modified (e.g., one or more chemical moieties can be attached to the antibody) or be modified to alter its glycosylation, again to alter one or more functional properties of the antibody.

In one embodiment, the hinge region between the CH1 and CH2 regions is modified in such that the number of cysteine residues in the hinge region is altered, e.g., increased or decreased. This approach is described further in U.S. Pat. No. 5,677,425. The number of cysteine residues in the hinge region is altered to, for example, facilitate assembly of the light and heavy chains or to increase or decrease the stability of the antibody.

In another embodiment, the Fc hinge region of an antibody is mutated to increase or decrease the biological half-life of the antibody. More specifically, one or more amino acid mutations are introduced into the $C_{H2}$-$C_{H3}$ domain interface region of the Fc-hinge fragment such that the antibody has impaired Staphylococcyl protein A (SpA) binding relative to native Fc-hinge domain SpA binding. This approach is described in further detail in U.S. Pat. No. 6,165,745.

In still another embodiment, the glycosylation of an antibody is modified. For example, a glycosylated antibody can be made (i.e., the antibody lacks glycosylation). Glycosylation can be altered to, for example, increase the affinity of the antibody for antigen. Such carbohydrate modifications can be accomplished by, for example, altering one or more sites of glycosylation within the antibody sequence. For example, one or more amino acid substitutions can be made that result in elimination of one or more variable region framework glycosylation sites to thereby eliminate glycosylation at that site. Such a glycosylation may increase the affinity of the antibody for antigen. See, e.g., U.S. Pat. Nos. 5,714,350 and 6,350,861.

Additionally or alternatively, an antibody can be made that has an altered type of glycosylation, such as a hypofucosylated antibody having reduced amounts of fucosyl residues or an antibody having increased bisecting GlcNac structures. Such altered glycosylation patterns have been demonstrated to increase the ADCC ability of antibodies. Such carbohydrate modifications can be accomplished by, for example, expressing the antibody in a host cell with altered glycosylation machinery. Cells with altered glycosylation machinery have been described in the art and can be used as host cells in which to express recombinant antibodies of the disclosure to thereby produce an antibody with altered glycosylation. For example, the cell lines Ms704, Ms705, and Ms709 lack the fucosyl transferase gene, FUT8 ($\alpha$ (1, 6)-fucosyl transferase), such that antibodies expressed in the Ms704, Ms705, and Ms709 cell lines lack fucose on their carbohydrates. The Ms704, Ms705, and Ms709 FUT8−/− cell lines were created by the targeted disruption of the FUT8 gene in CHO/DG44 cells using two replacement vectors (see U.S. Patent Publication No. 20040110704 and Yamane-Ohnuki et al., (2004) Biotechnol Bioeng 87:614-22). As another example, EP 1,176,195 describes a cell line with a functionally disrupted FUT8 gene, which encodes a fucosyl transferase, such that antibodies expressed in such a cell line exhibit hypofucosylation by reducing or eliminating the $\alpha$-1, 6 bond-related enzyme. EP 1,176,195 also describes cell lines which have a low enzyme activity for adding fucose to the N-acetylglucosamine that binds to the Fc region of the antibody or does not have the enzyme activity, for example the rat myeloma cell line YB2/0 (ATCC CRL 1662). PCT Publication WO 03/035835 describes a variant CHO cell line, Lec13 cells, with reduced ability to attach fucose to Asn(297)-linked carbohydrates, also resulting in hypofucosylation of antibodies expressed in that host cell (see also Shields et al., (2002) J. Biol. Chem. 277: 26733-26740). Antibodies with a modified glycosylation profile can also be produced in chicken eggs, as described in PCT Publication WO 06/089231. Alternatively, antibodies with a modified glycosylation profile can be produced in plant cells, such as Lemna. Methods for production of antibodies in a plant system are disclosed in the U.S. patent application 60/836,998, filed on Aug. 11, 2006. PCT Publication WO 99/54342 describes cell lines engineered to express glycoprotein-modifying glycosyl transferases (e.g., $\beta$(1,4)-N-acetylglucosaminyltransferase III (GnTIII)) such that antibodies expressed in the engineered cell lines exhibit increased bisecting GlcNac structures which results in increased ADCC activity of the antibodies (see also Umana et al., (1999) Nat. Biotech. 17:176-180). Alternatively, the fucose residues of the antibody can be cleaved off using a fucosidase enzyme; e.g., the fucosidase $\alpha$-L-fucosidase removes fucosyl residues from antibodies (Tarentino et al., (1975) Biochem. 14:5516-23).

Another modification of the antibodies herein that is contemplated by this disclosure is pegylation. An antibody can be pegylated to, for example, increase the biological (e.g., serum) half-life of the antibody. To pegylate an antibody, the antibody, or fragment thereof, typically is reacted with polyethylene glycol (PEG), such as a reactive ester or aldehyde derivative of PEG, under conditions in which one or more PEG groups become attached to the antibody or antibody fragment. Preferably, the pegylation is carried out via an acylation reaction or an alkylation reaction with a reactive PEG molecule (or an analogous reactive water-soluble polymer). As used herein, the term "polyethylene glycol" is intended to encompass any of the forms of PEG that have been used to derivatize other proteins, such as mono ($C_1$-$C_{10}$) alkoxy- or aryloxy-polyethylene glycol or polyethylene glycol-maleimide. In certain embodiments, the antibody to be pegylated is an aglycosylated antibody. Methods for pegylating proteins are known in the art and can be applied to the antibodies of the disclosure. See, e.g., EPO 154 316 and EP 0 401 384.

Antibodies of the disclosure can be characterized by their various physical properties, to detect and/or differentiate different classes thereof.

For example, antibodies can contain one or more glycosylation sites in either the light or heavy chain variable region. Such glycosylation sites may result in increased immunogenicity of the antibody or an alteration of the pK of the antibody due to altered antigen binding (Marshall et al (1972) Annu Rev Biochem 41:673-702; Gala and Morrison (2004) J Immunol 172:5489-94; Wallick et al (1988) J Exp Med 168:1099-109; Spiro (2002) Glycobiology 12:43R-56R; Parekh et al (1985) Nature 316:452-7; Mimura et al., (2000) Mol Immunol 37:697-706). Glycosylation has been known to occur at motifs containing an N-X-S/T sequence. In some instances, it is preferred to have an anti-CD40 antibody that does not contain variable region glycosylation. This can be achieved either by selecting antibodies that do not contain the glycosylation motif in the variable region or by mutating residues within the glycosylation region.

In a preferred embodiment, the antibodies do not contain asparagine isomerism sites. The deamidation of asparagine may occur on N-G or D-G sequences and result in the creation of an isoaspartic acid residue that introduces a link into the polypeptide chain and decreases its stability (isoaspartic acid effect).

Each antibody will have a unique isoelectric point (pI), which generally falls in the pH range between 6 and 9.5. The pI for an IgG1 antibody typically falls within the pH range of 7-9.5 and the pI for an IgG4 antibody typically falls within the pH range of 6-8. There is speculation that antibodies with a pI outside the normal range may have some unfolding and instability under in vivo conditions. Thus, it is preferred to have an anti-CD40 antibody that contains a pI value that falls in the normal range. This can be achieved either by selecting antibodies with a pI in the normal range or by mutating charged surface residues.

In another aspect, the disclosure provides nucleic acid molecules that encode heavy and/or light chain variable regions, or CDRs, of the antibodies of the disclosure. The nucleic acids can be present in whole cells, in a cell lysate, or in a partially purified or substantially pure form. A nucleic acid is "isolated" or "rendered substantially pure" when purified away from other cellular components or other contaminants, e.g., other cellular nucleic acids or proteins, by standard techniques. A nucleic acid of the disclosure can be, e.g., DNA or RNA and may or may not contain intronic sequences. In a preferred embodiment, the nucleic acid is a cDNA molecule.

Nucleic acids of the disclosure can be obtained using standard molecular biology techniques. For antibodies expressed by hybridomas (e.g., hybridomas prepared from transgenic mice carrying human immunoglobulin genes as described further below), cDNAs encoding the light and heavy chains of the antibody made by the hybridoma can be obtained by standard PCR amplification or cDNA cloning techniques. For antibodies obtained from an immunoglobulin gene library (e.g., using phage display techniques), a nucleic acid encoding such antibodies can be recovered from the gene library.

Preferred nucleic acids molecules of the disclosure include those encoding the $V_H$ and $V_L$ sequences of the CD40 monoclonal antibody or the CDRs. Once DNA fragments encoding $V_H$ and $V_L$ segments are obtained, these DNA fragments can be further manipulated by standard recombinant DNA techniques, for example to convert the variable region genes to full-length antibody chain genes, to Fab fragment genes or to a scFv gene. In these manipulations, a $V_L$- or $V_H$-encoding DNA fragment is operatively linked to another DNA fragment encoding another protein, such as an antibody constant region or a flexible linker. The term "operatively linked", as used in this context, is intended to mean that the two DNA fragments are joined such that the amino acid sequences encoded by the two DNA fragments remain in-frame.

The isolated DNA encoding the $V_H$ region can be converted to a full-length heavy chain gene by operatively linking the $V_H$-encoding DNA to another DNA molecule encoding heavy chain constant regions ($C_{H1}$, $C_{H2}$ and $C_{H3}$). The sequences of human heavy chain constant region genes are known in the art and DNA fragments encompassing these regions can be obtained by standard PCR amplification. The heavy chain constant region can be an IgG1, IgG2, IgG3, IgG4, IgA, IgE, IgM or IgD constant region, but most preferably is an IgG1 or IgG2 constant region. For a Fab fragment heavy chain gene, the $V_H$-encoding DNA can be operatively linked to another DNA molecule encoding only the heavy chain $C_{H1}$ constant region.

The isolated DNA encoding the $V_L$ region can be converted to a full-length light chain gene (as well as a Fab light chain gene) by operatively linking the $V_L$-encoding DNA to another DNA molecule encoding the light chain constant region, $C_L$. The sequences of human light chain constant region genes are known in the art and DNA fragments encompassing these regions can be obtained by standard PCR amplification. In preferred embodiments, the light chain constant region can be a kappa or lambda constant region.

To create a scFv gene, the $V_H$- and $V_L$-encoding DNA fragments are operatively linked to another fragment encoding a flexible linker, e.g., encoding the amino acid sequence (Gly4-Ser)3, such that the $V_H$ and $V_L$ sequences can be expressed as a contiguous single-chain protein, with the $V_L$ and $V_H$ regions joined by the flexible linker (see e.g., Bird et al., (1988) *Science* 242:423-426; Huston et al., (1988) *Proc. Natl. Acad. Sci. USA* 85:5879-5883; McCafferty et al., (1990) *Nature* 348:552-554).

Monoclonal antibodies (mAbs) of the present disclosure can be produced using the well-known somatic cell hybridization (hybridoma) technique of Kohler and Milstein (1975) *Nature* 256: 495. Other embodiments for producing monoclonal antibodies include viral or oncogenic transformation of B lymphocytes and phage display techniques. Chimeric or humanized antibodies are also well known in the art. See e.g., U.S. Pat. Nos. 4,816,567; 5,225,539; 5,530,101; 5,585,089; 5,693,762 and 6,180,370, the contents of which are specifically incorporated herein by reference in their entirety.

Antibodies of the disclosure also can be produced in a host cell transfectoma using, for example, a combination of recombinant DNA techniques and gene transfection methods as is well known in the art (e.g., Morrison, S. (1985) *Science* 229:1202). In one embodiment, DNA encoding partial or full-length light and heavy chains obtained by standard molecular biology techniques is inserted into one or more expression vectors such that the genes are operatively linked to transcriptional and translational regulatory sequences. In this context, the term "operatively linked" is intended to mean that an antibody gene is ligated into a vector such that transcriptional and translational control sequences within the vector serve their intended function of regulating the transcription and translation of the antibody gene.

The term "regulatory sequence" is intended to include promoters, enhancers and other expression control elements (e.g., polyadenylation signals) that control the transcription or translation of the antibody genes. Such regulatory sequences are described, e.g., in Goeddel (Gene Expression Technology. Methods in Enzymology 185, Academic Press, San Diego, Calif. (1990)). Preferred regulatory sequences for mammalian host cell expression include viral elements that direct high levels of protein expression in mammalian cells, such as promoters and/or enhancers derived from cytomegalovirus (CMV), Simian Virus 40 (SV40), adenovirus, e.g., the adenovirus major late promoter (AdMLP) and polyoma. Alternatively, non-viral regulatory sequences can be used, such as the ubiquitin promoter or β-globin promoter. Still further, regulatory elements composed of sequences from different sources, such as the SRa promoter system, which contains sequences from the SV40 early promoter and the long terminal repeat of human T cell leukemia virus type 1 (Takebe et al., (1988) Mol. Cell. Biol. 8:466-472). The expression vector and expression control sequences are chosen to be compatible with the expression host cell used.

The antibody light chain gene and the antibody heavy chain gene can be inserted into the same or separate expression vectors. In preferred embodiments, the variable regions are used to create full-length antibody genes of any antibody isotype by inserting them into expression vectors already encoding heavy chain constant and light chain constant regions of the desired isotype such that the $V_H$ segment is operatively linked to the $C_H$ segment(s) within the vector and the $V_L$ segment is operatively linked to the $C_L$ segment within the vector. Additionally or alternatively, the recombinant expression vector can encode a signal peptide that facilitates secretion of the antibody chain from a host cell. The antibody chain gene can be cloned into the vector such that the signal peptide is linked in-frame to the amino terminus of the antibody chain gene. The signal peptide can be an immunoglobulin signal peptide or a heterologous signal peptide (i.e., a signal peptide from a non-immunoglobulin protein).

In addition to the antibody chain genes and regulatory sequences, the recombinant expression vectors of the disclosure can carry additional sequences, such as sequences that regulate replication of the vector in host cells (e.g., origins of replication) and selectable marker genes. The selectable marker gene facilitates selection of host cells into which the vector has been introduced (see, e.g., U.S. Pat. Nos. 4,399,216; 4,634,665 and 5,179,017). For example, typically the selectable marker gene confers resistance to drugs, such as G418, hygromycin or methotrexate, on a host cell into which the vector has been introduced. Preferred selectable marker genes include the dihydrofolate reductase (DHFR) gene (for use in dhfr-host cells with methotrexate selection/amplification) and the neo gene (for G418 selection).

For expression of the light and heavy chains, the expression vector(s) encoding the heavy and light chains is transfected into a host cell by standard techniques. The various forms of the term "transfection" are intended to encompass a wide variety of techniques commonly used for the introduction of exogenous DNA into a prokaryotic or eukaryotic host cell, e.g., electroporation, calcium-phosphate precipitation, DEAE-dextran transfection and the like. Although it is theoretically possible to express the antibodies of the disclosure in either prokaryotic or eukaryotic host cells, expression of antibodies in eukaryotic cells, and most preferably mammalian host cells, is the most preferred because such eukaryotic cells, and in particular mammalian cells, are more likely than prokaryotic cells to assemble and secrete a properly folded and immunologically active antibody.

Preferred mammalian host cells for expressing the recombinant antibodies of the disclosure include Chinese Hamster Ovary (CHO cells) (including dhfr-CHO cells, described in Urlaub and Chasin, (1980) *Proc. Natl. Acad. Sci. USA* 77:4216-4220, used with a DHFR selectable marker, e.g., as described in R. J. Kaufman and P. A. Sharp (1982) *J. Mol. Biol.* 159:601-621), NSO myeloma cells, COS cells and SP2 cells. In particular for use with NSO myeloma cells, another preferred expression system is the GS gene expression system disclosed in WO 87/04462, WO 89/01036 and EP 338,841. When recombinant expression vectors encoding antibody genes are introduced into mammalian host cells, the antibodies are produced by culturing the host cells for a period of time sufficient to allow for expression of the antibody in the host cells or, more preferably, secretion of the antibody into the culture medium in which the host cells are grown. Antibodies can be recovered from the culture medium using standard protein purification methods.

Antibodies of the disclosure can be conjugated to a therapeutic agent to form an immunoconjugate such as an antibody-drug conjugate (ADC). Suitable therapeutic agents include cytotoxins, alkylating agents, DNA minor groove binders, DNA intercalators, DNA crosslinkers, histone deacetylase inhibitors, nuclear export inhibitors, proteasome inhibitors, topoisomerase I or II inhibitors, heat shock protein inhibitors, tyrosine kinase inhibitors, antibiotics, and anti-mitotic agents. In the ADC, the antibody and therapeutic agent preferably are conjugated via a linker cleavable such as a peptidyl, disulfide, or hydrazone linker. More preferably, the linker is a peptidyl linker such as Val-Cit, Ala-Val, Val-Ala-Val, Lys-Lys, Pro-Val-Gly-Val-Val, Ala-Asn-Val, Val-Leu-Lys, Ala-Ala-Asn, Cit-Cit, Val-Lys, Lys, Cit, Ser, or Glu. The ADCs can be prepared as described in U.S. Pat. Nos. 7,087,600; 6,989,452; and 7,129,261; PCT Publications WO 02/096910; WO 07/038,658; WO 07/051,081; WO 07/059,404; WO 08/083,312; and WO 08/103,693; U.S. Patent Publications 20060024317; 20060004081; and 20060247295; the disclosures of which are incorporated herein by reference.

In another aspect, the present disclosure features bispecific molecules comprising one or more antibodies of the disclosure linked to at least one other functional molecule, e.g., another peptide or protein (e.g., another antibody or ligand for a receptor) to generate a bispecific molecule that binds to at least two different binding sites or target molecules. Thus, as used herein, "bispecific molecule" includes molecules that have three or more specificities.

In an embodiment, a bispecific molecule has, in addition to an anti-Fc binding specificity and an anti-CD40 binding specificity, a third specificity. The third specificity can be for an anti-enhancement factor (EF), e.g., a molecule that binds to a surface protein involved in cytotoxic activity and thereby increases the immune response against the target cell. For example, the anti-enhancement factor can bind a cytotoxic T-cell (e.g. via CD2, CD3, CD8, CD28, CD4, CD40, or ICAM-1) or other immune cell, resulting in an increased immune response against the target cell.

Bispecific molecules may be in many different formats and sizes. At one end of the size spectrum, a bispecific molecule retains the traditional antibody format, except that, instead of having two binding arms of identical specificity, it has two binding arms each having a different specificity. At the other extreme are bispecific molecules consisting of two single-chain antibody fragments (scFv's) linked by a peptide chain, a so-called Bs(scFv) 2 construct. Intermediate-sized bispecific molecules include two different F(ab) fragments linked by a peptidyl linker. Bispecific molecules of these and other formats can be prepared by genetic engineering, somatic hybridization, or chemical methods. See, e.g., Kufer et al, cited supra; Cao and Suresh, *Bioconjugate Chemistry*, 9 (6), 635-644 (1998); and van Spriel et al., *Immunology Today*, 21 (8), 391-397 (2000), and the references cited therein.

Also provided herein is an oncolytic virus that preferentially infects and kills cancer cells. Antibodies of the present disclosure can be used in conjunction with oncolytic viruses. Alternatively, oncolytic viruses encoding antibodies of the present disclosure can be introduced into human body.

Also provided herein are a chimeric antigen receptor (CAR) containing an anti-CD40 scFv, the anti-CD40 scFv comprising CDRs and heavy/light chain variable regions described herein.

The anti-CD40 CAR may comprise (a) an extracellular antigen binding domain comprising an anti-CD40 scFv; (b) a transmembrane domain; and (c) an intracellular signaling domain.

The CAR may contain a signal peptide at the N-terminus of the extracellular antigen binding domain that directs the nascent receptor into the endoplasmic reticulum, and a hinge peptide at the N-terminus of the extracellular antigen binding domain that makes the receptor more available for binding. The CAR preferably comprises, at the intracellular signaling domain, a primary intracellular signaling domain and one or more co-stimulatory signaling domains. The mainly used and most effective primary intracellular signaling domain is CD3-zeta cytoplasmic domain which contains ITAMs, the phosphorylation of which results in T cell activation. The costimulatory signaling domain may be derived from the co-stimulatory proteins such as CD28, CD137 and OX40.

The CARs may further add factors that enhance T cell expansion, persistence, and anti-tumor activity, such as cytokines, and co-stimulatory ligands.

Also provided are engineered immune effector cells, comprising the CAR provided herein. In some embodiments, the immune effector cell is a T cell, an NK cell, a peripheral blood mononuclear cell (PBMC), a hematopoietic stem cell, a pluripotent stem cell, or an embryonic stem cell. In some embodiments, the immune effector cell is a T cell.

In another aspect, the present disclosure provides a pharmaceutical composition which may comprise one or more antibodies or antigen-binding portions thereof, the bispecifics, CAR-T cells, oncolytic viruses, immunoconjugates, nucleic acid molecules, expression vectors, or host cells of the present disclosure formulated together with a pharmaceutically acceptable carrier. The antibodies or antigen-binding portion thereof, the bispecifics, CAR-T cells, oncolytic viruses, immunoconjugates, nucleic acid molecules, expression vectors, or host cells can be dosed separately when the composition contains more than one antibody (or antigen-binding portion thereof, the bispecifics, CAR-T cells, oncolytic viruses, immunoconjugates, nucleic acid molecules, expression vectors, or host cells). The composition may optionally contain one or more additional pharmaceutically active ingredients, such as another antibody or a drug, such as an anti-tumor drug.

The pharmaceutical composition can comprise any number of excipients. Excipients that can be used include carriers, surface active agents, thickening or emulsifying agents, solid binders, dispersion or suspension aids, solubilizers, colorants, flavoring agents, coatings, disintegrating agents, lubricants, sweeteners, preservatives, isotonic agents, and combinations thereof. The selection and use of suitable excipients is taught in Gennaro, ed., Remington: *The Science and Practice of Pharmacy*, 20th Ed. (Lippincott Williams & Wilkins 2003), the disclosure of which is incorporated herein by reference.

Preferably, the pharmaceutical composition is suitable for intravenous, intramuscular, subcutaneous, parenteral, spinal or epidermal administration (e.g., by injection or infusion). Depending on the route of administration, the active ingredient can be coated in a material to protect it from the action of acids and other natural conditions that may inactivate it. The phrase "parenteral administration" as used herein means modes of administration other than enteral and topical administration, usually by injection, and includes, without limitation, intravenous, intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal, epidural and intrasternal injection and infusion. Alternatively, the pharmaceutical composition of the disclosure can be administered via a non-parenteral route, such as a topical, epidermal or mucosal route of administration, e.g., intranasally, orally, vaginally, rectally, sublingually or topically.

Pharmaceutical compositions can be in the form of sterile aqueous solutions or dispersions. They can also be formulated in a microemulsion, liposome, or other ordered structure suitable to high drug concentration.

The amount of active ingredient which can be combined with a carrier material to produce a single dosage form will vary depending upon the subject being treated and the particular mode of administration and will generally be that amount of the composition which produces a therapeutic effect. Generally, out of one hundred percent, this amount will range from about 0.01% to about 99% of active ingredient in combination with a pharmaceutically acceptable carrier.

Dosage regimens are adjusted to provide the optimum desired response (e.g., a therapeutic response). For example, a single bolus can be administered, several divided doses can be administered over time or the dose can be proportionally reduced or increased as indicated by the exigencies of the therapeutic situation. It is especially advantageous to formulate parenteral compositions in dosage unit form for ease of administration and uniformity of dosage. Dosage unit form as used herein refers to physically discrete units suited as unitary dosages for the subjects to be treated; each unit contains a predetermined quantity of active ingredient calculated to produce the desired therapeutic effect in association with the required pharmaceutical carrier. Alternatively, antibody can be administered as a sustained release formulation, in which case less frequent administration is required.

For administration of the antibody, the dosage may range from about 0.0001 to 100 mg/kg.

A "therapeutically effective dosage" of an anti-CD40 antibody or antigen-binding portion thereof of the disclosure preferably results in a decrease in severity of disease symptoms, an increase in frequency and duration of disease symptom-free periods, or a prevention of impairment or disability due to the disease affliction. For example, for the treatment of tumor-bearing subjects, a "therapeutically effective dosage" preferably inhibits tumor growth by at least about 20%, more preferably by at least about 40%, even more preferably by at least about 60%, and still more preferably by at least about 80% relative to untreated subjects. A therapeutically effective amount of a therapeutic antibody can decrease tumor size, or otherwise ameliorate symptoms in a subject, which is typically a human or can be another mammal.

The pharmaceutical composition can be a controlled release formulation, including implants, transdermal patches, and microencapsulated delivery systems. Biodegradable, biocompatible polymers can be used, such as ethylene vinyl acetate, polyanhydrides, polyglycolic acid, collagen, polyorthoesters, and polylactic acid. See, e.g., Sustained and Controlled Release Drug Delivery Systems, J. R. Robinson, ed., Marcel Dekker, Inc., New York, 1978.

Therapeutic compositions can be administered via medical devices such as (1) needleless hypodermic injection devices (e.g., U.S. Pat. Nos. 5,399,163; 5,383,851; 5,312,335; 5,064,413; 4,941,880; 4,790,824; and 4,596,556); (2) micro-infusion pumps (U.S. Pat. No. 4,487,603); (3) transdermal devices (U.S. Pat. No. 4,486,194); (4) infusion apparatuses (U.S. Pat. Nos. 4,447,233 and 4,447,224); and (5) osmotic devices (U.S. Pat. Nos. 4,439,196 and 4,475,196); the disclosures of which are incorporated herein by reference.

In certain embodiments, the monoclonal antibodies of the disclosure can be formulated to ensure proper distribution in vivo. For example, to ensure that the therapeutic antibody of the disclosure cross the blood-brain barrier, they can be formulated in liposomes, which may additionally comprise targeting moieties to enhance selective transport to specific cells or organs. See, e.g. U.S. Pat. Nos. 4,522,811; 5,374,548; 5,416,016; and 5,399,331; V. V. Ranade (1989) *J. Clin. Pharmacol.* 29:685; Umezawa et al., (1988) *Biochem. Biophys. Res. Commun.* 153:1038; Bloeman et al., (1995) *FEBS Lett.* 357:140; M. Owais et al., (1995) *Antimicrob. Agents Chemother.* 39:180; Briscoe et al., (1995) *Am. J. Physiol.* 1233:134; Schreier et al., (1994) *J. Biol. Chem.* 269:9090; Keinanen and Laukkanen (1994) *FEBS Lett.* 346:123; and Killion and Fidler (1994) *Immunomethods* 4:273.

The pharmaceutical compositions of the present disclosure have numerous in vitro and in vivo utilities, including, for example, treatment and/or prevention of cancers, or more generally immune response enhancement in patients with cancers. The pharmaceutical compositions can be administered to human subjects, e.g., in vivo, to inhibit tumor growth, or to treat or alleviate an infectious disease or an autoimmune disease.

Given the ability of the pharmaceutical compositions of the disclosure to inhibit proliferation and survival of cancer cells, the disclosure provides methods for inhibiting growth of tumor cells in a subject in need thereof comprising administering to the subject a pharmaceutical composition of the disclosure such that growth of the tumor is inhibited in the subject. Non-limiting examples of tumors that can be treated by the pharmaceutical compositions of the disclosure include, but not limited to, B cell lymphoma, chronic lymphocytic leukemia, multiple myeloma, melanoma, colon adenocarcinoma, pancreas cancer, colon cancer, gastric intestine cancer, prostate cancer, bladder cancer, kidney cancer, ovary cancer, cervix cancer, breast cancer, lung cancer, and nasopharynx cancer. Additionally, the pharmaceutical compositions of the disclosure may also apply to refractory or recurrent malignancies whose growth may be inhibited by the compositions of the disclosure.

These and other methods of the disclosure are discussed in further detail below.

In another aspect, the disclosure provides methods of combination therapy in which a pharmaceutical composition of the present disclosure is co-administered with one or more additional antibodies or non-antibody agents that are effective in inhibiting tumor growth in a subject. In one embodiment, the disclosure provides a method for inhibiting tumor growth in a subject comprising administering to the subject a pharmaceutical composition of the disclosure and one or more additional antibodies, such as an anti-TIM3 antibody, an anti- an anti-PD-L1 antibody, and anti-PD-1 antibody and/or an anti-CTLA-4 antibody. In certain embodiments, the subject is human. In certain embodiments, the pharmaceutical composition of the disclosure may be further combined with standard cancer treatments. For example, CD40 signaling activation by the pharmaceutical composition of the disclosure can be combined with CTLA-4 and/or PD-1 blockade and also chemotherapeutic regimes. For example, a chemotherapeutic agent can be administered with the pharmaceutical composition of the disclosure, which may be a cytotoxic agent. For example, epitubicin, oxaliplatin, and 5-FU are administered to patients receiving anti-CD40 therapy. Other therapies that may be combined with anti-CD40 therapy includes, but not limited to, interleukin-2 (IL-2) administration, radiation, surgery, or hormone deprivation.

The combination of therapeutic agents discussed herein can be administered concurrently as a single composition in a pharmaceutically acceptable carrier, or concurrently as separate compositions with each agent in a pharmaceutically acceptable carrier. In another embodiment, the combination of therapeutic agents can be administered sequentially.

Furthermore, if more than one dose of the combination therapy is administered sequentially, the order of the sequential administration can be reversed or kept in the same order at each time point of administration, sequential administrations can be combined with concurrent administrations, or any combination thereof.

The present disclosure is further illustrated by the following examples, which should not be construed as further limiting. The contents of all figures and all references, Genbank sequences, patents and published patent applications cited throughout this application are expressly incorporated herein by reference.

EXAMPLES

Example 1 Generation of Mouse Anti-CD40 Monoclonal Antibodies Using Hybridoma Technology Immunization Mice were immunized according to the method as described in E Harlow, D. Lane, Antibody: A Laboratory Manual, Cold Spring Harbor Laboratory Press, Cold Spring Harbor, N.Y., 1998. Recombinant human CD40 protein (AA region 21-193 of Uniprot Number #P25942, amino acid residue 21-193 of SEQ ID NO.: 30) with human IgG1 Fc tag (SEQ ID NO.: 27) at the C-terminus was used as the immunogen. Human CD40-his protein (Acro biosystems, Cat #CD0-H5228) was used for determining anti-sera titer and for screening hybridomas secreting antigen-specific antibodies. Immunizing dosages contained 25 µg human CD40-Fc protein/mouse/injection for both primary and boost immunizations. To increase immune response, the complete Freud's adjuvant and incomplete Freud's adjuvant (Sigma, St. Louis, Mo., USA) were used respectively for primary and boost immunizations. Briefly, adjuvant-antigen mixture was prepared by first gently mixing the adjuvant in a vial using a vortex. The desired amount of adjuvant was transferred to an autoclaved 1.5 mL micro-centrifuge tube. The antigen was prepared in PBS or saline with the concentration ranging from 0.5-1.0 mg/ml. The calculated amount of antigen was then added to the micro-centrifuge tube with the adjuvant, and the resulting mixture was mixed by gently vortexing for 2 minutes to generate water-in-oil emulsions. The adjuvant-antigen emulsion was then drawn into the proper syringe for animal injection. A total of 25 µg of antigen was injected in a volume of 50-100 µl. Each animal was immunized, and then boosted for 2 to 3 times depending on the anti-sera titer. Animals with good titers were given a final boost by intraperitoneal injection before fusion.

Hybridoma Fusion and Screening

Cells of murine myeloma cell line (SP2/0-Ag14, ATCC #CRL-1581) were cultured to reach the log phase stage right before fusion. Spleen cells from immunized mice were prepared sterilely and fused with myeloma cells according to the method as described in Kohler G, and Milstein C, "Continuous cultures of fused cells secreting antibody of predefined specificity," Nature, 256: 495-497(1975). Fused "hybrid cells" were subsequently dispensed into 96-well plates in DMEM/20% FCS/HAT media. Surviving hybridoma colonies were observed under the microscope seven to ten days post fusion. After two weeks, the supernatant from each well was subjected to ELISA-based screening using recombinant human CD40-his protein, and cell-based binding FACS using 293T-CD40 cells expressing human CD40 protein (uniprot #P25942-1, SEQ ID NO.: 30) on cell membrane. Hybridomas secreting antibodies that bound to human CD40-his protein and showed high specific binding to the 293T-CD40 cells, namely Clone 1A3, 1D1 and C1H1, were subcloned by limiting dilution to ensure the clonality of the cell line, and then monoclonal antibodies were purified. Briefly, Protein A sepharose column (from bestchrom (Shanghai) Biosciences, Cat #AA0273) was washed using PBS buffer in 5 to 10 column volumes. Cell supernatants were passed through the columns, and then the columns were washed using PBS buffer until the absorbance for protein reached the baseline. The columns were eluted with elution buffer (0.1 M Glycine-HCl, pH 2.7), and immediately collected into 1.5 ml tubes with neutralizing buffer (1 M Tris-HCl, pH 9.0). Fractions containing immunoglobulins were pooled and dialyzed in PBS overnight at 4° C. Subsequently, the in vitro functional activities of purified monoclonal antibodies were characterized as follows.

Example 2 Affinity Determination of Mouse Anti-CD40 Monoclonal Antibodies Using BIACORE Surface Plasmon Resonance Technology The purified anti-CD40 mouse monoclonal antibodies (mAbs) generated in Example 1 were characterized for affinity and binding kinetics by Biacore T200 system (GE healthcare, Pittsburgh, PA, USA).

Briefly, goat anti-mouse IgG (GE healthcare, Cat #BR100838, Mouse Antibody Capture Kit) was covalently linked to a CM5 chip (carboxy methyl dextran coated chip from GE healthcare #BR100530) via primary amines, using a standard amine coupling kit provided by Biacore (GE healthcare, Pittsburgh, PA, USA), and a Protein G chip (GE healthcare, Cat #29-1793-15) was used for the benchmark's affinity determination. Un-reacted moieties on the biosensor surface were blocked with ethanolamine. Then, purified anti-CD40 antibodies of the disclosure and two benchmark antibodies, BM1 (Dacetuzumab, Genentech Inc., also referred to as CD40-BM1, in house made with heavy chain and light chain amino acid sequences set forth in SEQ ID NOs: 40 and 41, respectively) and BM2 (Selicrelumab, Abgenix Inc., also referred to as CD40-BM2, in house made with heavy chain and light chain amino acid sequences set forth in SEQ ID NOs: 42 and 43, respectively), at the concentration of 66.7 nM were respectively flowed onto the chip at a flow rate of 10 µL/min. Then, serially diluted recombinant human CD40-his (Acro biosystems, Cat #CD0-H5228, starting at 80 nM with a 2-fold serial dilution) or cynomolgus monkey CD40-his protein (Acro biosystems, Cat #CD0-C52H6, starting at 80 nM with a 2-fold serial dilution) in HBS-EP+ buffer (provided by Biacore) was flowed onto the chip at a flow rate of 30 µL/min. The antigen-antibody association kinetics was followed for 2 minutes and the dissociation kinetics was followed for 10 minutes. The association and dissociation curves were fit to a 1:1 Langmuir binding model using BIAcore evaluation software. The $K_D$, $K_a$ and $K_d$ values were determined and summarized in Table 2 below.

TABLE 2

Binding affinity of mouse anti-CD40 antibodies

| | Kinetics on Biacore | | | | | |
|---|---|---|---|---|---|---|
| | Human CD40-his | | | Cynomolgus CD40-his | | |
| Mouse mAb | $K_a$ ($M^{-1}s^{-1}$) | $K_d$ ($s^{-1}$) | $K_D$ (M) | $K_a$ ($M^{-1}s^{-1}$) | $K_d$ ($s^{-1}$) | $K_D$ (M) |
| C1H1 | 2.10E+06 | 8.97E−04 | 4.28E−10 | 2.29E+06 | 8.63E−04 | 3.77E−10 |
| BM1 | 8.03E+05 | 7.562E−03 | 9.42E−09 | 7.64E+05 | 7.397E−03 | 9.68E−09 |
| BM2 | 2.06E+05 | 1.616E−03 | 7.84E−09 | 1.73E+05 | 1.508E−03 | 8.73E−09 |

The mouse antibody C1H1 of the disclosure specifically bound to human and monkey CD40s with a higher binding affinity than BM1 and BM2.

Example 3 Binding Activity of Mouse Anti-CD40 Monoclonal Antibodies

The binding activities of mouse anti-CD40 antibodies were determined by Capture ELISA and Flow Cytometry (FACS).

For the capture ELISA, 96-well micro plates were coated with 2 µg/ml AffiniPure_Goat Anti-Mouse IgG, F(ab')2 fragment specific (Jackson Immuno Research, Cat #115-005-072) in PBS, 100 µl/well, and incubated overnight at 4° C. Plates were washed once with wash buffer (PBS+0.05% v/v Tween-20, PBST) and then blocked with 200 µl/well blocking buffer (5% w/v non-fatty milk in PBST) for 2 hours at 37° C. Plates were washed 4 times and incubated with 100 µl/well serially diluted anti-CD40 antibodies of the disclosure, BM1, BM2 and negative control hIgG (human immunoglobulin (pH4) for intravenous injection, Hualan Biological Engineering Inc.) (5-fold serial dilution in 2.5% w/v non-fatty milk in PBST, starting at 66.7 nM) for 40 minutes at 37° C., and then washed 4 times again. Plates containing captured anti-CD40 antibodies were incubated with 100 µl biotin-labeled human CD40-Fc protein (amino acid residue 21-193 of SEQ ID NO: 30 linked to N-terminal amino acid residue 99-330 of SEQ ID NO.:28, 1.15 nM in 2.5% w/v non-fatty milk in PBST) for 40 minutes at 37° C., washed 4 times, and incubated with streptavidin conjugated HRP (1:10000 dilution in PBST, Jackson Immuno Research, Cat #016-030-084, 100 µl/well) for 40 minutes at 37° C. After a final wash, plates were incubated with 100 µl/well ELISA substrate TMB (Innoreagents, Cat #TMB-S-002) at room temperature. The reaction was stopped in 3-10 minutes with 50 µl/well 1M $H_2SO_4$, and the absorbance of each well was read on a microplate reader using dual wavelength mode with 450 nm for TMB and 630 nm as the reference wavelength, then the OD (450-630) values were plotted against antibody concentration. Data was analyzed using Graphpad Prism software and $EC_{50}$ values were reported.

For binding of anti-CD40 antibodies to 293T-CD40 cells tested by flow cytometry (FACS), Biosion in-house prepared 293T-CD40 cells stably expressing full length human CD40 (uniprot #P25942-1, SEQ ID NO.: 30) on cell membrane were used. The 293T-CD40 cells were prepared by transfecting 293T cells with pCMV-T-P plasmids inserted with CD40 coding sequence between EcoRI and XbaI sites, following the instruction of lipofectamine 3000 transfection reagent (Thermo Fisher). In specific, the 293T-CD40 cells were harvested from cell culture flasks, washed twice and resuspended in phosphate buffered saline (PBS) containing 2% v/v Fetal Bovine Serum (FACS buffer). 2×10⁵ cells were incubated in each well of 96 well-plates in 100 µl anti-CD40 antibodies of the disclosure or controls of various concentrations (starting at 80 nM with a 4-fold serial dilution) in FACS buffer for 40 minutes on ice. Cells were washed twice with FACS buffer, and 100 µL/well R-Phycoerythrin Affini Pure F(ab')2 Fragment Goat Anti-Mouse IgG (H+L) (1:1000 dilution in FACS buffer, Jackson Immuno Research, Cat #115-116-146) was added. Following an incubation of 40 minutes at 4° C. in dark, cells were washed three times and resuspended in FACS buffer. Fluorescence was measured using a Becton Dickinson FACS Canto II-HTS equipment and plotted against antibody concentration. Data was analyzed using Graphpad Prism software and $EC_{50}$ values were reported.

The results were shown in FIGS. 1A-1B and FIGS. 2A-2B.

The results indicated that the mouse antibodies of the disclosure bound to human CD40 specifically, with 1A3, 1D1, and C1H1 having lower $EC_{50}$ values than either BM1 or BM2, or both, suggesting that they more efficiently bound to human CD40 protein. Further, as can be seen from FIGS. 1A-1B and FIGS. 2A-2B, the maximum binding of the mouse antibodies 1A3/C1H1 was comparable to that of BM1 or BM2.

Example 4 Blocking Activity of Mouse Anti-CD40 Antibodies on CD40-CD40L or CD40-Benchmark Binding 4.1 Ligand Blocking ELISA The abilities of anti-CD40 antibodies to block CD40-CD40L binding were measured in a competitive ELISA assay. Briefly, 100 µl human CD40-Fc protein (amino acid residue 21-193 of SEQ ID NO: 30 linked to N-terminus of amino acid residue 99-330 of SEQ ID NO.:28) was coated on 96-well micro plates at 2 µg/mL in coating buffer (carbonate/bicarbonate buffer) and incubated overnight at 4° C. The next day, plates were washed once with wash buffer (PBS+0.05% v/v Tween-20, PBST), and blocked with 5% w/v non-fatty milk in PBST for 2 hours at 37° C. Plates were then washed 4 times using wash buffer.

Serially diluted anti-CD40 antibodies of the disclosure or controls (starting at 200 nM with a five-fold serial dilution) in PBST with 2.5% w/v non-fatty milk were added to the CD40-Fc bound plates, 100 µl per well, and incubated at 37° C. for 40 minutes. Plates were washed 4 times again using wash buffer, and then added and incubated for 40 minutes at 37° C. with 100 µl/well 95 ng/mL biotin-labeled human CD40L-his protein (Sino biological Inc., Cat #10239-H08E). Plates were washed again using wash buffer. Thereafter, the plates were added with 100 µl/well of streptavidin conjugated HRP (1:10000 dilution in PBST buffer, Jackson Immunoresearch, Cat #016-030-084) and incubated for 40 minutes at 37° C. Plates were washed again using wash buffer. Finally, TMB was added and the reaction was stopped using 1M $H_2SO_4$, and the absorbance of each well was read on a microplate reader using dual wavelength mode with 450 nm for TMB and 630 nm as the reference wavelength, then the OD (450-630) values were plotted against antibody concentration. Data was analyzed using Graphpad Prism software and $IC_{50}$ values were reported.

4.2 Benchmark Blocking ELISA

The abilities of the anti-CD40 antibodies of the disclosure to block Benchmark-human CD40 binding was measured in a competitive ELISA assay. Briefly, the BM2 antibody was coated on 96-well micro plates at 1 µg/mL in PBS, 100 µl per well, and incubated overnight at 4° C. The next day, plates were washed once with wash buffer, and blocked with blocking buffer (5% w/v non-fatty milk in PBST) for 2 hours at 37° C. While blocking, the anti-CD40 antibodies of the disclosure or controls were diluted with biotin labeled human CD40-Fc protein (amino acid residue 21-193 of SEQ ID NO: 30 linked to N-terminus of amino acid residue 99-330 of SEQ ID NO.:28, 0.23 nM in 2.5% v/v non-fatty milk in PBST), starting at 66.7 nM with a 5-fold serial dilution, and incubated at room temperature for 40 minutes. After plate washing 4 times, the antibody/human CD40-Fc-biotin mixtures were added to BM2 coated plates, 100 µl/well. After incubation at 37° C. for 40 minutes, plates were washed 4 times again using wash buffer. Then the plates were added and incubated with 100 µl/well streptavidin conjugated HRP for 40 minutes at 37° C. to detect biotin-labeled human CD40-Fc bound to plates. Plates were washed 4 times again using wash buffer. Finally, TMB was added and the reaction was stopped using 1M $H_2SO_4$, and the absorbance was read on a microplate reader using dual wavelength mode with 450 nm for TMB and 630 nm as the reference wavelength, then the OD (450-630) values were plotted against antibody concentration. Data was analyzed using Graphpad Prism software and $IC_{50}$ values were reported.

The results of the two assays were shown in FIGS. 3A-3B and 4A-4B.

Figure 3A:
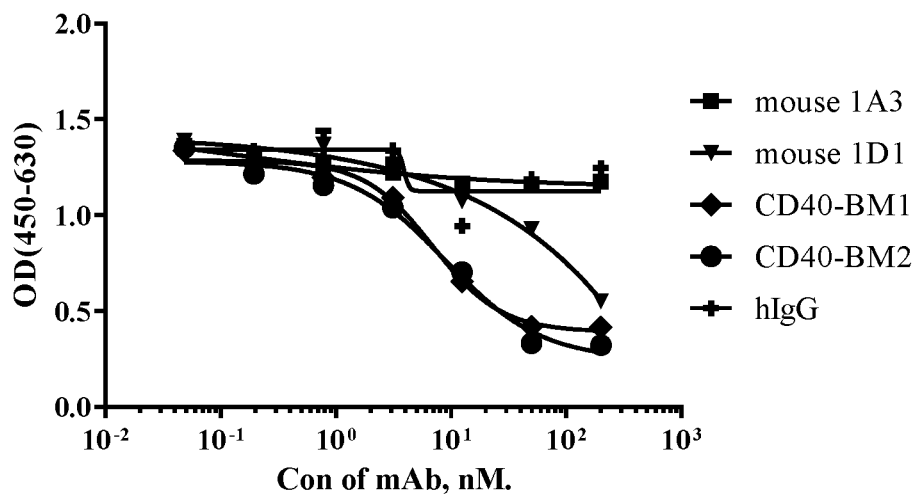
FIGS. 3A and 3B show the blocking abilities of mouse antibodies 1A3 and 1D1 (A), and C1H1 (B) on human CD40-CD40L binding in a competitive ELISA.
Figure 3B:
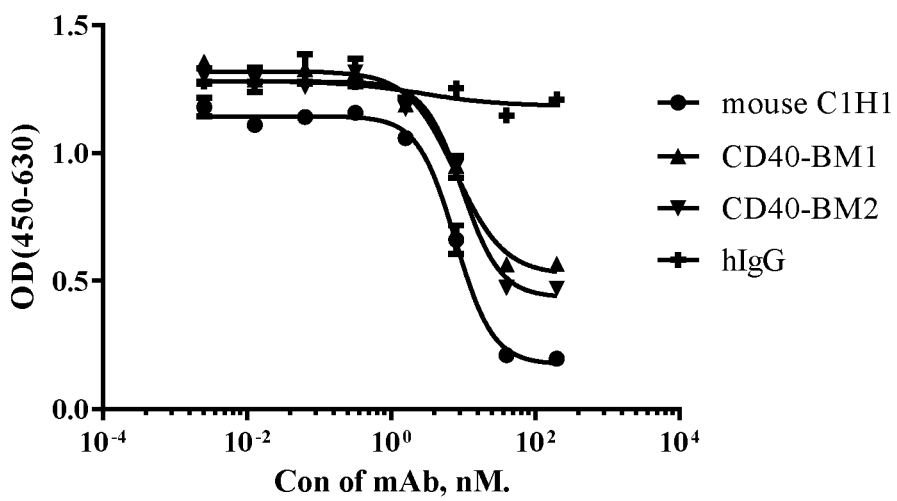

It can be seen from FIG. 3B that the mouse antibody C1H1 was capable of blocking human CD40-human CD40L binding at an $IC_{50}$ value similar or even lower as compared to BM1 and BM2. Further, as shown in FIG. 3B, the mouse antibody C1H1 showed higher maximum blocking than BM1 and BM2.

Figure 4A:
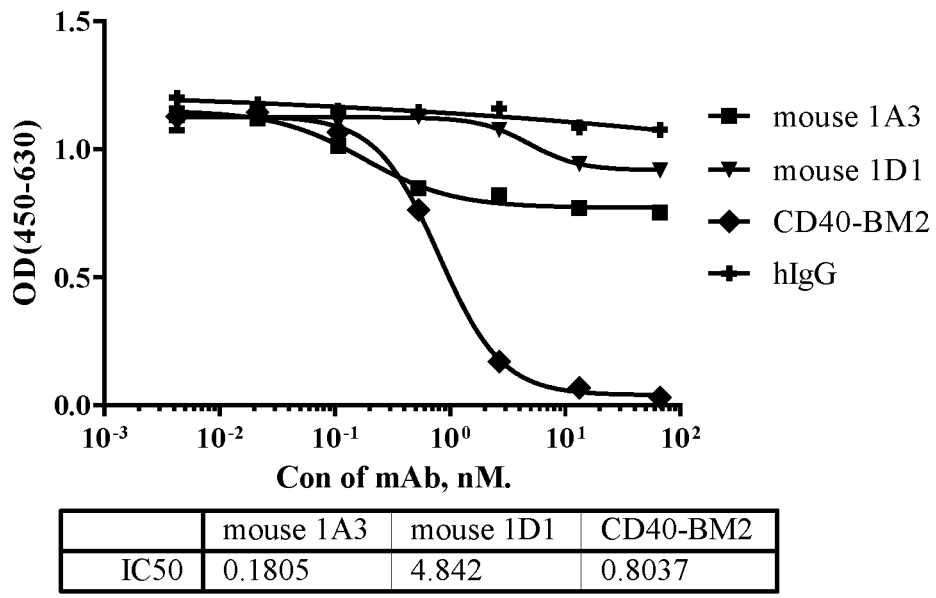
FIGS. 4A and 4B show the abilities of mouse antibodies 1A3 and 1D1 (A), and C1H1 (B) to block Benchmark-human CD40 binding in a competitive ELISA.
Figure 4B:
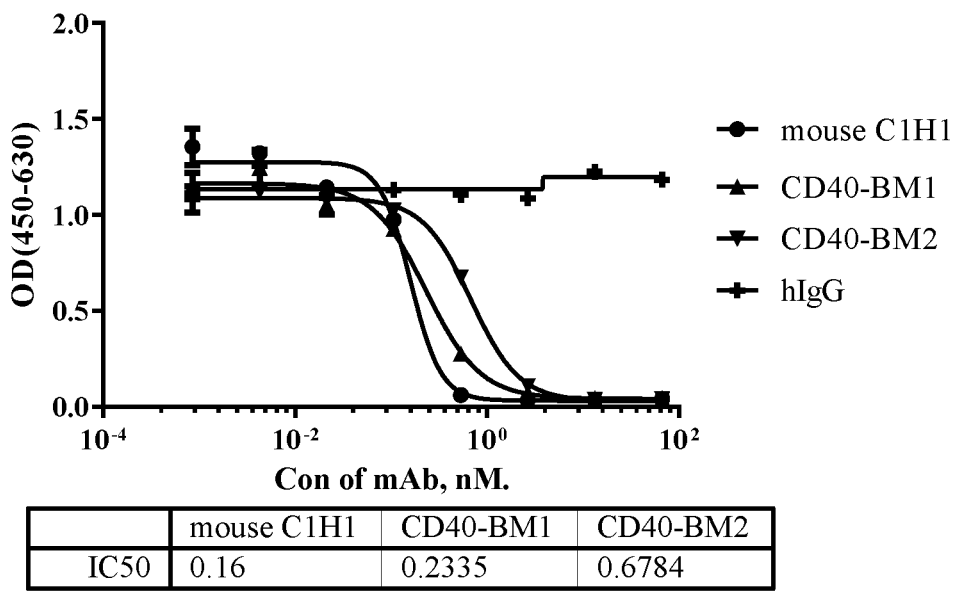

FIGS. 4A and 4B showed that the mouse antibody C1H1 was able to block human CD40-BM2 binding, suggesting that it bound to the same or similar epitope as BM2 did. The mouse antibodies 1A3 and 1D1 showing no blocking may bind to different epitopes.

Example 5 Cell Based Reporter Assay of Mouse Anti-CD40 Antibodies

The anti-CD40 antibodies of the disclosure were further tested for their agonistic activities using a CD40-expressing reporter cell line 293T-NF-κB-Luc-CD40 which stably expressed full length human CD40 (uniprot No. P25942-1, SEQ ID NO.: 30). The 293T-NF-κB-Luc-CD40 cells were prepared, following the instruction of lipofectamine 3000 transfection reagent (Thermo Fisher), by transfecting 293T cells with pGL4.32[luc2P NF-κB-RE Hygro] vectors (Promega, GenBank® Accession Number: EU581860) and later pCMV-T-P plasmids inserted with CD40 coding sequence between EcoRI and XbaI sites. When CD40 agonists were added to these cells, CD40 signaling was activated and luciferase expression was up-regulated which can be measured in a luminescence assay.

Briefly, $5 \times 10^3$ 293T-NF-κB-Luc-CD40 cells at the log phase stage in 20 µL DMEM medium (Gibco Inc., Cat #10566-016) supplemented with 10% FBS (Gibco, Cat #10099-141) were plated into 384-well cell culture plates (Corning, Cat #3707). Then, the plates were added with 20 µl/well serially diluted anti-CD40 antibodies of the disclosure or controls (including an in house made anti-CD22 antibody as a negative control) (starting from 200 nM, 3-fold serial dilution in the culture medium), and incubated at 37° C. for 6 hours. Then, the plates were added with the reagents of ONE-Glo™ Luciferase Assay System (Promega, Cat #E6120, 30 µl/well) and incubated for 5 minutes at room temperature. Chemiluminescence was measured using a Tecan Infinit® 200 Pro equipment. Data was analyzed using Graphpad Prism software and $EC_{50}$ values were reported.

Figure 5A:
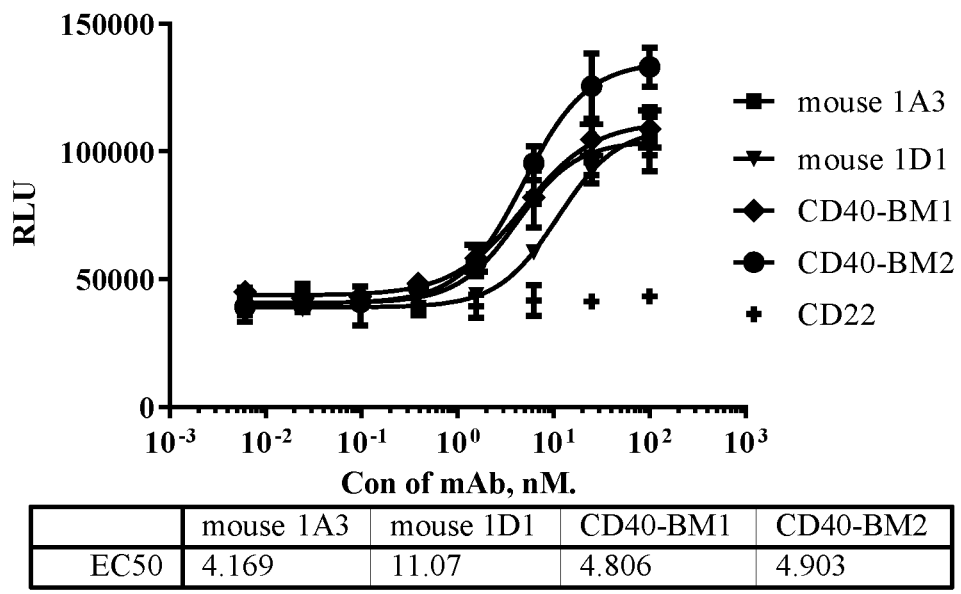
FIGS. 5A and 5B show the activities of mouse antibodies 1A3 and 1D1 (A), and C1H1 (B) to activate CD40 signaling in a cell based reporter assay.
Figure 5B:
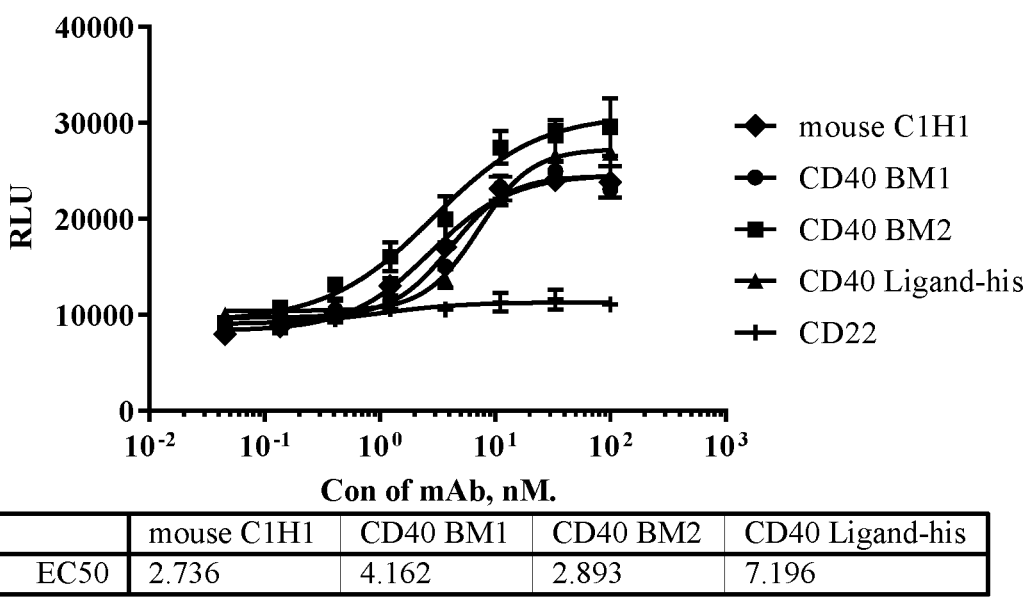
Figure 6A:
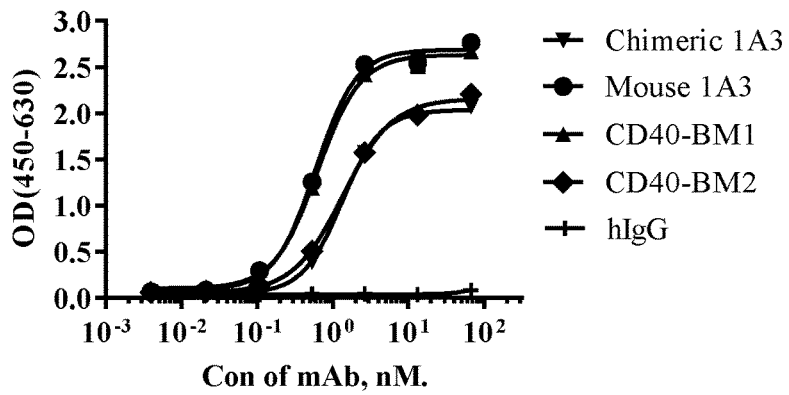
FIGS. 6A-6C show the binding capacities of chimeric antibodies 1A3 (A), 1D1 (B), and C1H1 (C) to human CD40 in a capture ELISA.
Figure 6B:
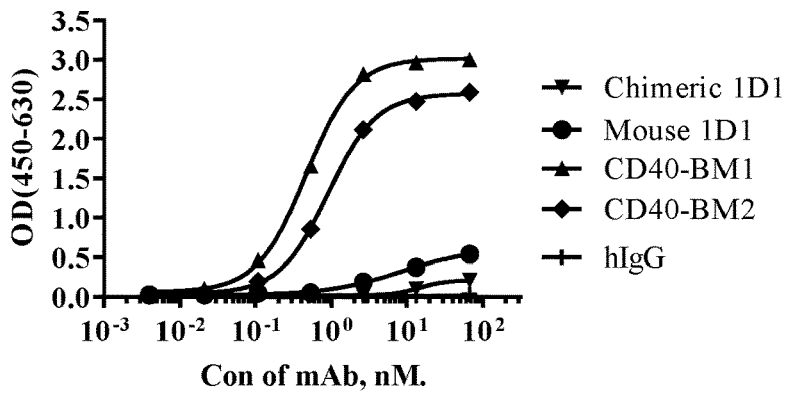
Figure 6C:
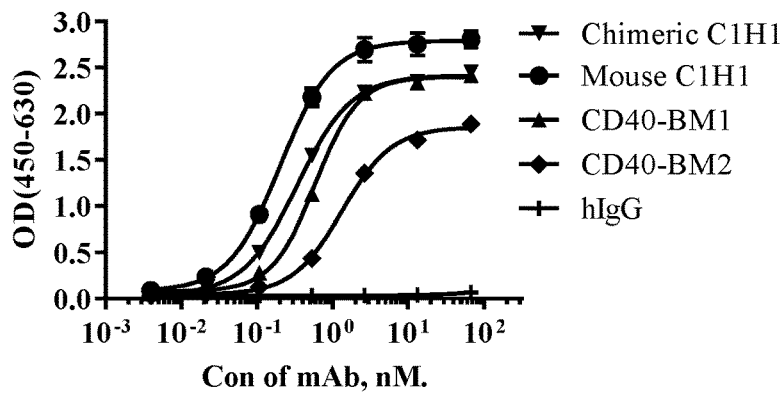
Figure 7A:
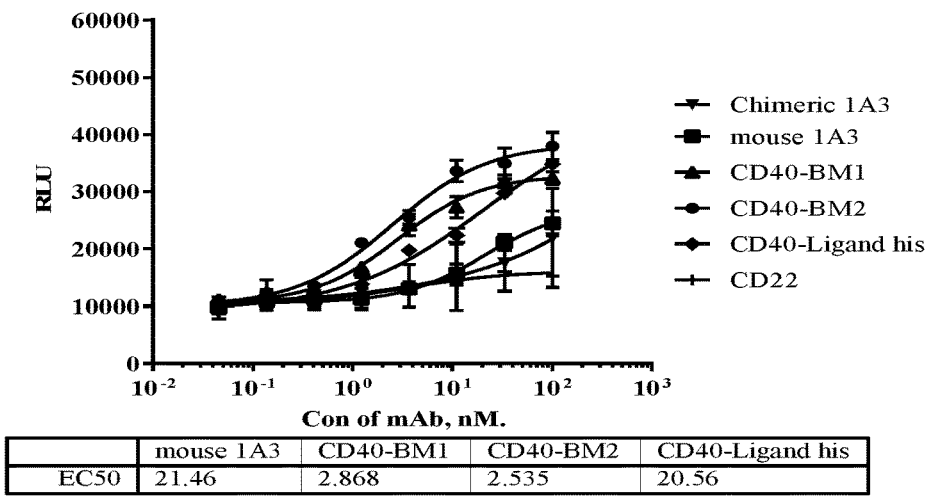
FIGS. 7A-7C show the activities of chimeric antibodies 1A3 (A), 1D1 (B), and C1H1 (C) to activate CD40 signaling in a cell based reporter assay.
Figure 7B:
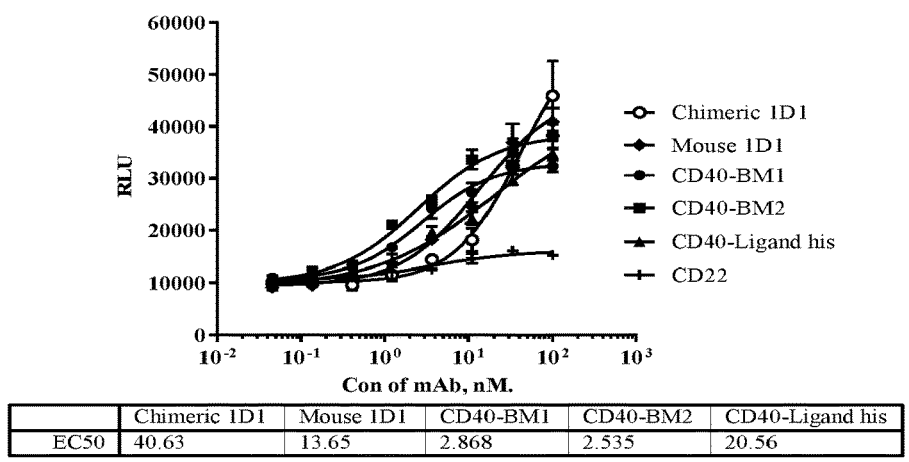
Figure 7C:
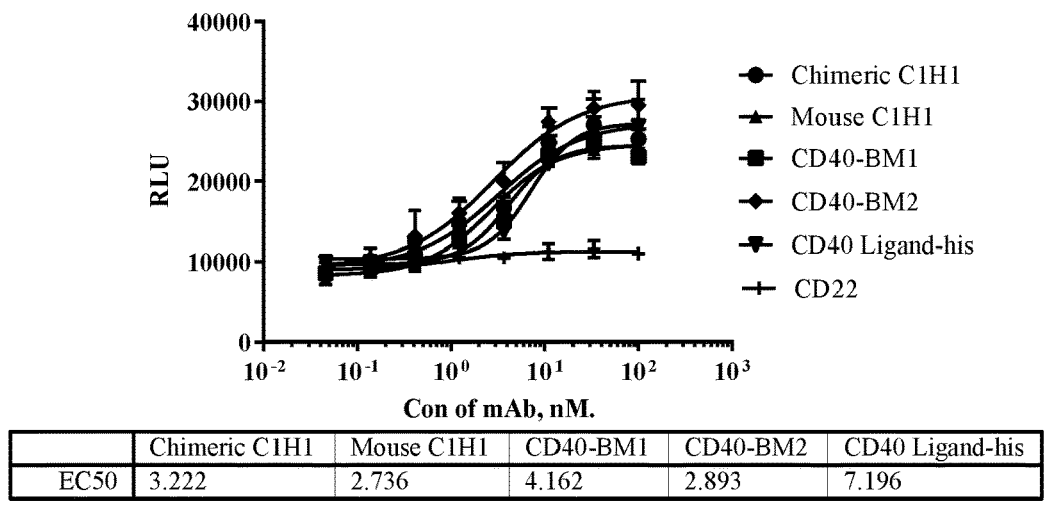
Figure 8:
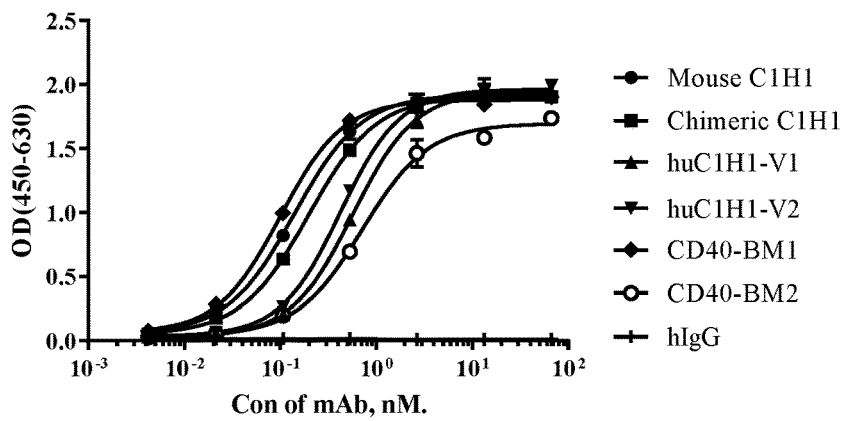
FIG. 8 shows the binding capacities of humanized antibodies huC1H1-V1 and huC1H1-V2 to human CD40 in a capture ELISA.
Figure 9:
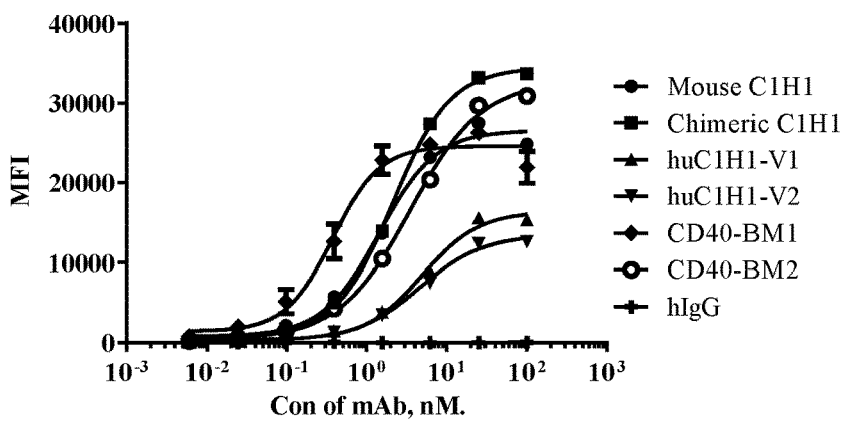
FIG. 9 shows the binding capacities of humanized antibodies huC1H1-V1 and huC1H1-V2 to 293T cells expressing human CD40 in a cell based binding FACS.

The results were shown in FIGS. 5A-5B.

It can be seen that the mouse antibodies 1A3, 1D1 and C1H1 had comparable agonistic activities compared to BM1 but not as good as that of BM2.

Example 6 Generation and Characterization of Chimeric Antibodies

The variable domains of the heavy and light chain of the anti-CD40 mouse mAbs were sequenced and summarized in Table 1.

The variable domains of the heavy and light chain of the anti-CD40 mouse mAbs C1H1, 1D1 and 1A3 were cloned in frame to human IgG1 heavy-chain (SEQ ID NO.: 27) and human kappa light-chain constant regions (SEQ ID NO.: 29), respectively, wherein the C terminus of the variable region was linked to the N terminus of respective constant region.

The vectors each containing a nucleotide encoding a heavy chain variable region linked to human IgG1 heavy-chain constant region, and the vectors each containing a nucleotide encoding a light chain variable region linked to human kappa light-chain constant region were transiently transfected into 50 ml of 293F suspension cell cultures in a ratio of 1.1:1 light to heavy chain construct, with 1 mg/mL PEI.

Cell supernatants were harvested after six days in shaking flasks, spun down to pellet cells, and then chimeric antibodies were purified from cell supernatants as described above.

The purified chimeric antibodies were tested in the capture ELISA, BIAcore affinity test and cell-based reporter assays, following the protocols in the foregoing Examples with or without modifications and protocols described below.

For the BIAcore, goat anti-human IgG (GE healthcare, Cat #BR100839, Human Antibody Capture Kit) was covalently linked to a CM5 chip instead of goat anti-mouse IgG, and a CM5 chip was used for BM1 and BM2 instead of a Protein G chip. The results were shown in Table 3.

For the capture ELISA, AffiniPure Goat Anti-Human IgG, F(ab')$_2$ fragment specific (Jackson Immuno Research, Cat #109-005-097) was used instead of AffiniPure Goat Anti-Mouse IgG, F(ab')$_2$ fragment specific, 100 μl/well.

The results were shown in Table 3, FIGS. 6A-6C and FIGS. 7A-7C.

The data showed that the chimeric antibodies had similar binding capacities and agonistic activities to their parent antibodies. In particular, the chimeric C1H1 antibody showed higher binding affinity and capacity to human CD40, and higher binding affinity to Cynomolgus CD40 than BM1.

shaking flasks and tested for binding affinity to human CD40 by Octect using the following protocol below, using Octet system (Fortebio, Octet RED 96). Briefly, AHC biosensors (anti-human IgG Fc capture, from ForteBio) were presoaked with 10 mM glycine (pH 1.5) for 3 seconds, and then dipped in a well with running buffer (0.5% w/v BSA in PBST) for 3 seconds, the soaking and dipping steps were repeated for three times. Then, the sensors were dipped in a well with cell supernatant containing humanized anti-CD40 antibodies, the chimeric C1H1 antibody in HBS-EP$^+$ at 5 μg/ml, or the benchmark in HBS-EP$^+$ at 5 μg/ml for 120 seconds, and then immersed in a well with running buffer for 5 minutes. A new baseline was run for 180 seconds in another well with running buffer. Then the sensors were dipped in a well with serially diluted human CD40-his protein (Acro biosystems, Cat #CD0-H5228, starting at 40 nM with a two-fold serial dilution) in running buffer for 120 seconds, and then immersed in a baseline well for 10 minutes. Finally, sensors were presoaked with 10 mM glycine (pH 1.5) for 3 seconds, and then dipped in a well with running buffer for 3 seconds,

TABLE 3

Binding affinity of chimeric antibodies

| | Kinetics on Biacore | | | | | |
|---|---|---|---|---|---|---|
| | Human CD40-his | | | Cyno CD40-his | | |
| Clone ID# | $K_a$ (M$^{-1}$s$^{-1}$) | $K_d$ (s$^{-1}$) | $K_D$ (M) | $K_a$ (M$^{-1}$s$^{-1}$) | $K_d$ (s$^{-1}$) | $K_D$ (M) |
| mouse C1H1 | 1.79E+06 | 0.001227 | 6.84E−10 | 1.39E+06 | 0.001184 | 8.52E−10 |
| chimeric C1H1 | 1.82E+06 | 0.001567 | 8.61E−10 | 1.39E+06 | 0.001478 | 1.06E−09 |
| BM1 | 7.39E+05 | 0.006556 | 8.87E−09 | 6.23E+05 | 0.006164 | 9.89E−09 |

Example 7 Humanization of Anti-CD40 Mouse Monoclonal Antibody C1H1

The mouse anti-CD40 antibody C1H1 was selected for humanization and further investigations. Humanization of this antibody was conducted using the well-established CDR-grafting method as described in detail below.

To select acceptor frameworks for humanization of mouse antibody C1H1, the light and heavy chain variable region sequences of mouse C1H1 were blasted against the human immunoglobulin gene database. The human germlines with the highest homology to mouse C1H1 were selected as the acceptor frameworks for humanization. The mouse antibody heavy/light chain variable region CDRs were inserted into the selected frameworks, and the residue(s) in the frameworks was/were further mutated to obtain more candidate heavy chain/light chain variable regions. A total of 4 humanized C1H1 antibodies, namely from huC1H1-V1 to huC1H1-V4 were obtained whose heavy/light chain variable region sequences were in Table 1.

The vectors each containing a nucleotide encoding a the heavy chain variable region linked to human IgG2 heavy-chain constant (SEQ ID NOs: 28), and the vectors each containing a nucleotide encoding a humanized light chain variable region linked to human kappa light-chain constant regions (SEQ ID NOs: 29) were transiently transfected into 50 ml 293F suspension cell cultures in a ratio of 60% to 40% light to heavy chain construct, with 1 mg/ml PEI.

Example 8 Characterization of Humanized Antibodies

Cell supernatants containing humanized antibodies huC1H1-V1 to huC1H1-V4 were harvested after six days in shaking flasks the soaking and dipping steps repeated for three times. The association and dissociation curves were fit to a 1:1 Langmuir binding model using ForteBio Data Analysis 8.1. The $K_a$, $K_d$ and $K_D$ values were determined and summarized in Table 4 below.

The results indicated that huC1H1-V1 and huC1H1-V2 as tested had similar human CD40 binding affinity, compared to the chimeric antibody C1H1, which was better than that of BM2.

TABLE 4

Affinity of Humanized C1H1 mAbs
Octet Kinetics of Humanized C1H1 mAbs Binding to Human CD40

| | Kinetics on Octet Human CD40-his | | |
|---|---|---|---|
| Clone ID# | $K_a$ (M$^{-1}$s$^{-1}$) | $K_d$ (s$^{-1}$) | $K_D$ (M) |
| chimeric C1H1 | 1.47E+06 | 9.29E−04 | 6.33E−10 |
| huC1H1-V1 | 1.41E+06 | 1.28E−03 | 9.04E−10 |
| huC1H1-V2 | 1.65E+06 | 9.81E−04 | 5.96E−10 |
| huC1H1-V3 | 5.23E+05 | 2.83E−03 | 5.41E−09 |
| huC1H1-V4 | 4.24E+05 | 3.67E−03 | 8.66E−09 |
| BM2 | 8.74E+05 | 9.79E−04 | 1.12E−09 |

The humanized antibodies huC1H1-V1 and huC1H1-V2 were purified as described above and tested in Biacore, Capture ELISA, Cell-based binding FACS, Competitive ELISA, Cell-based reporter assay and Protein thermal shift assay, following the protocols in the foregoing Examples with or without modifications and protocols described below.

For the capture ELISA, AffiniPure Goat Anti-Human IgG, F(ab')$_2$ fragment specific, (Jackson Immuno Research, Cat #109-005-097) was used instead of AffiniPure Goat Anti-Mouse IgG, F(ab')$_2$ fragment specific, 100 μl/well.

For the BIAcore, goat anti-human IgG (GE healthcare, Cat #BR100839, Human Antibody Capture Kit) was covalently linked to a CM5 chip instead of goat anti-mouse IgG, and a CM5 chip was used for BM1 and BM2 instead of a Protein G chip.

For the cell-based binding FACS, R-Phycoerythrin AffiniPure Goat Anti-human IgG Fcγ fragment specific (Jackson Immuno Research, Cat #109-115-098) was used instead of R-Phycoerythrin AffiniPure F(ab')$_2$ Fragment Goat Anti-Mouse IgG (H+L), 100 μl/well.

The humanized antibody huC1H1-V2 was also tested for the thermal stability assay. A protein thermal shift assay was used to determine Tm (melting temperature) using a GloMelt™ Thermal Shift Protein Stability Kit (Biotium, Cat #33022-T). Briefly, the GloMelt™ dye was allowed to thaw and reach room temperature. The vial containing the dye was vortexed and centrifuged. Then, 10× dye was prepared by adding 5 μL 200× dye to 95 μL PBS. 2 μL 10× dye and 10 μg humanized antibodies were added, and PBS was added to a total reaction volume of 20 μL. The tubes containing the dye and antibodies were briefly spun and placed in real-time PCR thermocycler (Roche, LightCycler 480 II) set up with a melt curve program having the parameters in Table 5.

TABLE 5

Parameters for Melt Curve Program

| Profile step | Temperature | Ramp rate | Holding Time |
|---|---|---|---|
| Initial hold | 25° C. | NA | 30 s |
| Melt curve | 25-99° C. | 0.1° C./s | NA |

The assay results were shown in Table 6 and FIGS. 8-12.

It can be seen from Table 6 that the humanized antibodies huC1H1-V1 and huC1H1-V2 showed comparable binding affinities to human and cynomolgus CD40 compared to the chimeric antibody C1H1. In other words, the huC1H1-V1 and huC1H1-V2's binding affinities to human and cynomolgus CD40 were higher than those of BM1 and BM2.

Figure 10:
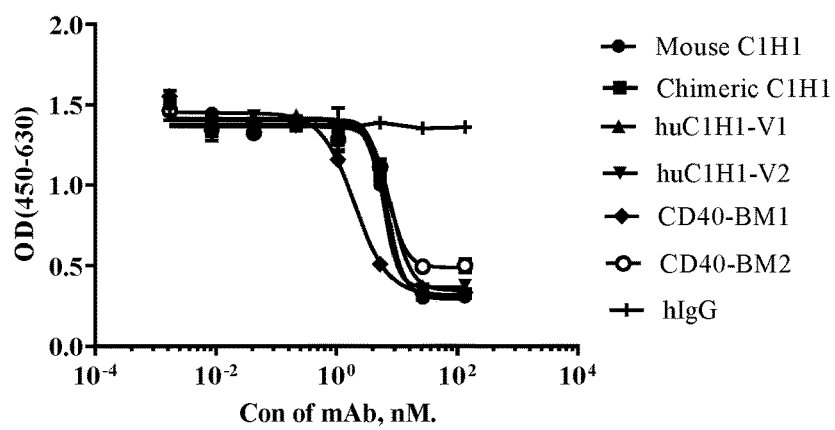
FIG. 10 shows the blocking abilities of humanized antibodies huC1H1-V1 and huC1H1-V2 on human CD40-CD40L binding in a competitive ELISA.

FIG. 10 showed that the humanized antibodies huC1H1-V1 and huC1H1-V2 of the disclosure were capable of blocking CD40-CD40L binding, and the blocking activities were comparable or a bit lower when compared to BM1 and BM2.

Figure 11:
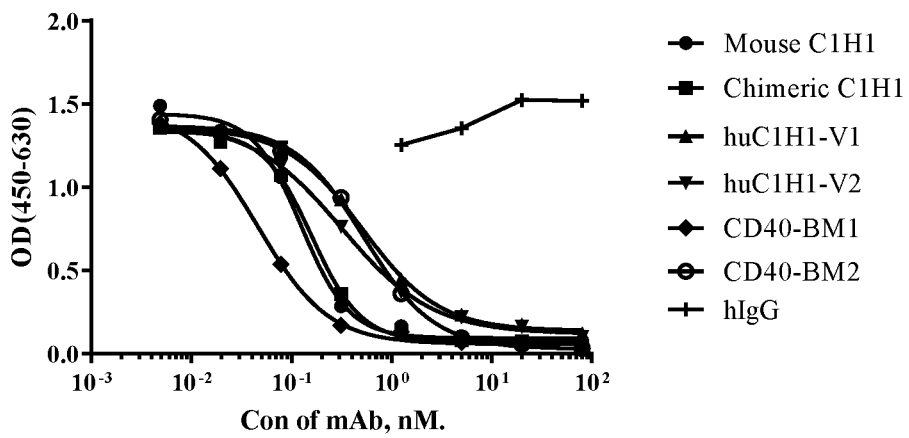
FIG. 11 shows the abilities of humanized antibodies huC1H1-V1 and huC1H1-V2 to block Benchmark-human CD40 binding in a competitive ELISA.

According to FIG. 11, the humanized antibodies huC1H1-V1 and huC1H1-V2 of the disclosure were able to block human CD40-BM2 binding, suggesting that the antibodies huC1H1-V1 and huC1H1-V2 of the disclosure might bind to a similar epitope as BM2 did.

Figure 12:
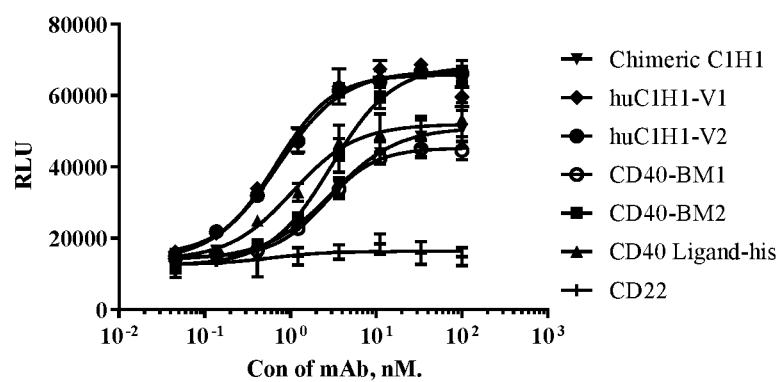
FIG. 12 shows the activities of humanized antibodies huC1H1-V1 and huC1H1-V2 to activate CD40 signaling in a cell based reporter assay.

As shown in FIG. 12, the humanized antibodies huC1H1-V1 and huC1H1-V2 of the disclosure had higher agonistic activities in the cell-based reporter assay when compared to the BM1 and BM2.

TABLE 6

Binding and Functional activities of Humanized C1H1 antibodies

| | Kinetics on Biacore | | | | | | Tm |
|---|---|---|---|---|---|---|---|
| | Human CD40-his | | | Cynomolgus CD40-his | | | (melting |
| Clone ID# | $K_a$ (M$^{-1}$s$^{-1}$) | $K_d$ (s$^{-1}$) | $K_D$ (M) | $K_a$ (M$^{-1}$s$^{-1}$) | $K_d$ (s$^{-1}$) | $K_D$ (M) | temperature) ° C. |
| mouse C1H1 | 2.10E+06 | 8.97E−04 | 4.28E−10 | 2.29E+06 | 8.63E−04 | 3.77E−10 | * |
| chimeric C1H1 | 2.51E+06 | 0.002221 | 8.84E−10 | 2.54E+06 | 0.002147 | 8.46E−10 | * |
| huC1H1-V1 | 2.25E+06 | 2.48E−03 | 1.10E−09 | 2.14E+06 | 0.002371 | 1.11E−09 | * |
| huC1H1-V2 | 2.31E+06 | 0.002704 | 1.17E−09 | 2.56E+06 | 0.002735 | 1.07E−09 | 70 |
| BM1 | 8.03E+05 | 0.007562 | 9.42E−09 | 7.64E+05 | 0.007397 | 9.68E−09 | * |
| BM2 | 2.06E+05 | 0.001616 | 7.84E−09 | 1.73E+05 | 0.001508 | 8.73E−09 | * |

* Not tested.

Example 9 In Vivo Anti-Tumor Efficacy of huC1H1-V2 Antibody in Human B-Cell Lymphoma Ramos Xenograft Model The in vivo anti-tumor activity of huC1H1-V2 antibody was tested in NOD-SCID mice. Briefly, NOD-SCID mice were subcutaneously injected with 3×10$^7$ Human B-cell Lymphoma Ramos cells (Chinese Academy of Sciences) at the right axilla. Tumor volumes were measured using electronic caliper and calculated as (length×width$^2$)/2. When tumors reached an average volume of about 100-150 mm$^3$, 40 tumor-bearing mice were selected and randomized into 4 groups (10 mice/group), and the day doing the animal grouping was designated as Day 0. The animals were intravenously injected at the tail vein with isotype control Ab (anti-HEL-Human IgG2 Isotype-control, also referred to as IgG2, Biointron Inc) or huC1H1-V2 antibody from Day 0 according to dosing regimen shown in Table 7.

TABLE 7

Study Design of Human B-cell Lymphoma Ramos Xenograft Model

| Group No. | N | Compound | Dose (mg/kg) | Dose Route | Dosing Volume (ml/kg) | Dosing Schedule |
|---|---|---|---|---|---|---|
| 1 | 10 | isotype control Ab (IgG2) | 15 | i.v. | 10 | Q2D × 8 times |
| 2 | 10 | huC1H1-V2 | 1.5 | i.v. | 10 | Q2D × 8 times |
| 3 | 10 | huC1H1-V2 | 5 | i.v. | 10 | Q2D × 8 times |
| 4 | 10 | huC1H1-V2 | 15 | i.v. | 10 | Q2D × 8 times |

Note:
N: animal number per group; Q2D: every 2 days.

The data was summarized in Table 8.

All treatments were well tolerated by the tumor-bearing animals and there was no significant weight loss or other symptoms. The huC1H1-V2 antibody treatment at 5 mg/kg exhibited strongest anti-tumor activity, resulting in mean tumor size of 230.2 mm$^3$ on Day 14 with tumor growth inhibition (TGI) of 96%. The mean tumor volume in Group 3 at Day 14 was statistically smaller than that of the control group. However, the huC1H1-V2 antibody treatment at 15 mg/kg did not show further enhanced efficacy, i.e., the tumor volume of Group 4 was not significantly different from that of Group 3.

TABLE 8

Anti-Tumor Efficacy of huC1H1-V2 antibody in Human B-cell Lymphoma Ramos Xenograft Model

| Treatment | Tumor Volume (mm$^3$) $^a$ on Day 0 of treatment | Tumor Volume (mm$^3$) $^{a,\ b}$ on Day 14 of treatment | T/C (%)$^c$ | TGI (%)$^d$ | P value |
|---|---|---|---|---|---|
| IgG2, 15 mg/kg, Q2D | 114.7 ± 1.4 | 2830.4 ± 235.7 | — | — | — |
| huC1H1-V2, 1.5 mg/kg, Q2D | 111.1 ± 2.0 | 431.9 ± 58.0** | 12 | 88 | <0.001 |
| huC1H1-V2, 5 mg/kg, Q2D | 114.5 ± 1.5 | 230.2 ± 36.3** | 4 | 96 | <0.001 |
| huC1H1-V2, 15 mg/kg, Q2D | 114.3 ± 1.3 | 242.5 ± 22.1** | 5 | 95 | <0.001 |

Note:
$^a$ Mean ± SEM; $^b$ Tumor volume at Day 14, compared with control group by student's t test, *P ≤ 0.05 and **P < 0.01; $^c$T/C(%) = (T − T$_0$)/(C − C$_0$) × 100%, where T and C referred to the mean tumor volume of the treated and control groups on Day 14, respectively, and T$_0$ and C$_0$ referred to the mean tumor volume of the treated and control groups on Day 0, respectively; $^d$TGI (%) = (1 − T/C) × 100%.

Example 10 In Vivo Anti-Tumor Efficacy of huC1H1-V2 Antibody in Mouse Colon Cancer MC38 Xenograft Model The in vivo anti-tumor activity of huC1H1-V2 antibody was further tested in CD40 humanized transgenic mice (also referred to as hCD40 mice). Briefly, hCD40 mice were subcutaneously injected with 1×10$^6$ mouse colon cancer MC38 cells (Shanghai Lanli Biological Technology Co., Ltd.) at the right flank. Tumor volumes were measured using electronic caliper and calculated as (length×width$^2$)/2. When tumors reached an average volume of about 100 mm$^3$, 18 tumor-bearing mice were selected and randomized into 3 groups, 6 mice per group, and the day doing the animal grouping was designated as Day 0. The animals were intravenously injected at the tail vein with vehicle (Phosphate-buffered saline, also referred to as PBS) or huC1H1-V2 antibody from Day 1 according to regimen shown in Table 9.

TABLE 9

Study Design of MC38 Xenograft Model

| Group No. | N | Compound | Dose (mg/kg) | Dose Route | Dosing Volume (ml/kg) | Dosing Schedule |
|---|---|---|---|---|---|---|
| 1 | 6 | Vehicle (PBS) | — | i.v. | 10 | Q2D × 7 times |
| 2 | 6 | huC1H1-V2 | 3 | i.v. | 10 | Q2D × 7 times |
| 3 | 6 | huC1H1-V2 | 10 | i.v. | 10 | Q2D × 7 times |

Note:
N: animal number per group; Q2D: every 2 days.

The data was summarized in Table 10.

All treatments were well tolerated by the tumor-bearing animals and there was no significant weight loss or symptoms. The huC1H1-V2 antibody treatment at 3 mg/kg exhibited strong anti-tumor activity, resulting in mean tumor size of 1169 mm$^3$ on day 14 with a TGI of 64%. The tumor size of Group 2 at Day 14 was statistically smaller than that of the vehicle group. The huC1H1-V2 antibody treatment at 10 mg/kg also exhibited strong anti-tumor activity, resulting in mean tumor size of 1446 mm$^3$ on Day 14 with TGI of 56%. The mean tumor size of Group 3 on Day 14 was statistically smaller than that of the vehicle group.

TABLE 10

Anti-Tumor Efficacy of huC1H1-V2 antibody in MC38 Xenograft Model

| Treatment | Tumor Volume (mm$^3$) $^a$ on Day 0 of treatment | Tumor Volume (mm$^3$) $^{a,\ b}$ on Day 14 of treatment | T/C (%)$^c$ | TGI (%)$^d$ | P value |
|---|---|---|---|---|---|
| Vehicle (DPBS), Q2D | 112 ± 9 | 3241 ± 383 | — | — | — |
| huC1H1-V2, 3 mg/kg, Q2D | 111 ± 5 | 1169 ± 217** | 36 | 64 | <0.01 |
| huC1H1-V2, 10 mg/kg, Q2D | 113 ± 8 | 1446 ± 467* | 44 | 56 | 0.014 |

Note:
$^a$ Mean ± SEM; $^b$ Tumor volume at Day 14, compared with vehicle control group by student's t test, *P ≤ 0.05 and **P < 0.01; $^c$T/C(%) = T$_{RTV}$/C$_{RTV}$ × 100%, where T$_{RTV}$ and C$_{RTV}$ referred to the mean RTVs of the treatment and control groups, respectively, RTV = V$_t$/V$_0$, where V$_t$ referred to the mean tumor volume on Day 14, and V$_0$ referred to the mean tumor volume on Day 0; $^d$TGI (%) = (1 − T/C) × 100%.

While the disclosure has been described above in connection with one or more embodiments, it should be understood that the disclosure is not limited to those embodiments, and the description is intended to cover all alternatives, modifications, and equivalents, as may be included within the spirit and scope of the appended claims. All referenced cited herein are further incorporated by reference in their entirety.

Sequences in the present application are summarized below.

```
Description/
Sequence/SEQ ID NO.

VH-CDR1 for mouse, chimeric and humanized C1H1 antibodies
NYGIS (SEQ ID NO: 1)

VH-CDR2 for mouse, chimeric and humanized C1H1 antibodies
SISSGGDNTYYPDNVKG (SEQ ID NO: 4)

VH-CDR3 for mouse, chimeric and humanized C1H1 antibodies
AGEKAMDY (SEQ ID NO: 7)

VL-CDR1 for mouse, chimeric and humanized C1H1 antibodies
RASQTINNNLH (SEQ ID NO: 10)

VL-CDR2 for mouse, chimeric and humanized C1H1 antibody
YASQSIS (SEQ ID NO: 13)

VL-CDR3 for mouse, chimeric and humanized C1H1 antibodies
QQFSSWPLT (SEQ ID NO: 16)

VH for mouse and chimeric C1H1 antibodies
EVKLVESGGGLVKPGASLKLSCAASGFTFSNYGISWVRQTSDKRLEWVASISSGGDNTYYPD
NVKGRFTISRENAKNTLYLQMSSLKSEDTALYYCARAGEKAMDYWGQGTSVTVSS (SEQ ID NO: 19)

VH for mouse C1H1
GAAGTGAAACTGGTGGAGTCTGGGGGAGGCTTAGTGAAGCCTGGAGCGTCTCTGAAACT
CTCCTGTGCAGCCTCTGGATTCACTTTCAGTAACTATGGCATATCTTGGGTTCGCCAGACT
TCAGACAAGAGGCTGGAGTGGGTCGCATCCATTAGTAGTGGTGGTGATAACACCTACTA
TCCAGACAATGTAAAGGGCCGATTCACCATCTCCAGAGAGAATGCCAAGAACACCCTAT
ACCTACAAATGAGTAGTCTGAAGTCTGAGGACACGGCCTTGTATTACTGTGCAAGAGCTG
GGGAGAAGGCTATGGACTACTGGGGTCAAGGAACCTCAGTCACCGTCTCCTCA (SEQ ID NO: 31)

VH for chimeric C1H1
GAGGTGAAGCTGGTGGAGTCCGGCGGCGGCCTGGTGAAGCCTGGAGCTAGCCTGAAGCT
GAGCTGCGCCGCCAGCGGCTTCACCTTTTCCAACTACGGCATCAGCTGGGTGAGGCAGAC
AAGCGATAAGAGGCTGGAGTGGGTGGCCAGCATCAGCAGCGGCGGCGATAACACATACT
ACCCTGACAACGTGAAGGGCAGATTCACCATCAGCAGGGAGAACGCCAAGAATACCCTG
TACCTGCAGATGAGCAGCCTGAAGAGCGAGGACACCGCCCTGTACTACTGTGCCAGGGC
CGGCGAGAAGGCCATGGACTACTGGGGCCAGGGCACCTCCGTGACCGTGAGCTCC (SEQ ID NO.: 32)

VH for huC1H1-V1 and huC1H1-V3
EVQLVESGGGLVKPGGSLRLSCAASGFTFSNYGISWVRQAPGKGLEWVXISISSGGDNTYYP
DNVKGRFTISRDNAKNSLYLQMNSLRAEDTAVYYCARAGEKAMDYWGQGTLVTVSS (SEQ ID NO: 20,
X1 = A)
EVQLVESGGGLVKPGGSLRLSCAASGFTFSNYGISWVRQAPGKGLEWVASISSGGDNTYYPD
NVKGRFTISRDNAKNSLYLQMNSLRAEDTAVYYCARAGEKAMDYWGQGTLVTVSS VH for huC1H1-V2 and huC1H1-V4
EVQLVESGGGLVKPGGSLRLSCAASGFTFSNYGISWVRQAPGKGLEWVX1SISSGGDNTYYP
DNVKGRFTISRDNAKNSLYLQMNSLRAEDTAVYYCARAGEKAMDYWGQGTLVTVSS (SEQ ID NO: 20,
X1 = S)
EVQLVESGGGLVKPGGSLRLSCAASGFTFSNYGISWVRQAPGKGLEWVSSISSGGDNTYYPD
NVKGRFTISRDNAKNSLYLQMNSLRAEDTAVYYCARAGEKAMDYWGQGTLVTVSS
GAGGTGCAGCTGGTGGAGAGCGGCGGCGGACTGGTGAAGCCTGGCGGAAGCCTGAGAC
TGAGCTGCGCCGCCTCCGGCTTCACCTTCTCCAACTACGGCATCAGCTGGGTGAGGCAGG
CCCCCGGAAAGGGCCTGGAGTGGGTGAGCAGCATCAGCAGCGGCGGCGACAATACCTAC
TACCCTGACAACGTGAAGGGCAGGTTCACCATCAGCAGAGACAATGCCAAGAATTCCCT
GTACCTGCAGATGAACAGCCTGAGAGCCGAGGATACAGCCGTGTACTACTGTGCCAGAG
CCGGCGAGAAGGCCATGGATTACTGGGGCCAGGGCACCCTGGTGACCGTGTCCTCC (SEQ ID NO: 33)

VL for mouse and chimeric C1H1 antibodies
DIVLTQSPVTLSVTPGDSVSLSCRASQTINNNLHWYQQKSHESPRLLIKYASQSISGIPSRFSGS
GSGTDFTLSINSVETEDFGIYFCQQFSSWPLTFGAGTKLELK (SEQ ID NO: 23)
VL for mouse C1H1
GATATTGTACTAACTCAGTCTCCAGTCACCCTGTCTGTGACTCCAGGAGATAGCGTCAGT
CTTTCCTGCAGGGCCAGCCAAACTATTAACAACAACCTACACTGGTATCAACAAAAATCA
CATGAGTCTCCAAGGCTTCTCATCAAGTATGCTTCCCAGTCCATCTCTGGGATCCCCTCCA
GGTTCAGTGGCAGTGGATCAGGGACAGATTTCACTCTCAGTATCAACAGTGTGGAGACT
GAAGATTTTGGAATATATTTCTGTCAACAGTTTAGCAGCTGGCCTCTTACGTTCGGTGCTG
GGACTAAGCTGGAGCTGAAA (SEQ ID NO: 34)
```

| Description/Sequence/SEQ ID NO. |
| --- |
| VL for chimeric C1H1<br>GATATCGTGCTGACCCAGAGCCCCGTGACCCTGAGCGTGACACCCGGCGACAGCGTGAG<br>CCTGTCCTGCAGAGCCAGCCAGACCATCAACAACAATCTGCACTGGTATCAACAGAAGA<br>GCCACGAGAGCCCCAGGCTGCTGATCAAGTACGCCAGCCAGAGCATCTCCGGCATCCCT<br>AGCAGATTCAGCGGCTCCGGCTCCGGCACAGACTTTACCCTGAGCATCAACAGCGTGGA<br>GACCGAGGATTTCGGCATCTACTTTTGCCAGCAGTTTTCCTCCTGGCCTCTGACATTCGGC<br>GCCGGCACAAAGCTGGAGCTGAAG (SEQ ID NO: 35)<br><br>VL for huC1H1-V1 and huC1H1-V2<br>EIVLTQSPATLSLSPGERATLSCRASQTINNNLHWYQQKPGQAPRLLIX1YASQSISGIPARFSG<br>SGSGTDFTLTISSLEPEDFAVYX2CQQFSSWPLTFGGGTKVEIK (SEQ ID NO: 24, X1 = K, X2 = F)<br>EIVLTQSPATLSLSPGERATLSCRASQTINNNLHWYQQKPGQAPRLLIKYASQSISGIPARFSGS<br>GSGTDFTLTISSLEPEDFAVYFCQQFSSWPLTFGGGTKVEIK<br>GAGATCGTGCTGACCCAGAGCCCCGCCACCCTGAGCCTGAGCCCTGGAGAGAGGGCCAC<br>CCTGTCCTGCAGGGCCTCCCAGACAATCAATAATAATCTGCACTGGTATCAACAGAAGCC<br>CGGCCAGGCCCCCAGGCTGCTGATCAAGTACGCCAGCCAGTCCATCAGCGGCATCCCTG<br>CCAGGTTCTCCGGCAGCGGCAGCGGAACAGACTTCACCCTGACCATCTCCTCCCTGGAGC<br>CTGAGGACTTTGCCGTGTACTTTTGCCAGCAGTTCTCCAGCTGGCCTCTGACCTTTGGCGG<br>CGGCACCAAGGTGGAGATCAAG (SEQ ID NO: 36)<br><br>VL for huC1H1-V3 and huC1H1-V4<br>EIVLTQSPATLSLSPGERATLSCRASQTINNNLHWYQQKPGQAPRLLIX1YASQSISGIPARFSG<br>SGSGTDFTLTISSLEPEDFA VYX2CQQFSSWPLTFGGGTKVEIK (SEQ ID NO: 24, X1 = Y, X2 = Y)<br>EIVLTQSPATLSLSPGERATLSCRASQTINNNLHWYQQKPGQAPRLLIYYASQSISGIPARFSGS<br>GSGTDFTLTISSLEPEDFAVYYCQQFSSWPLTFGGGTKVEIK<br><br>VH-CDR1 for mouse and chimeric 1A3 antibodies<br>GYYLH (SEQ ID NO: 2)<br><br>VH-CDR2 for mouse and chimeric 1A3 antibodies<br>YISCHDGTIIYNQKFKG (SEQ ID NO: 5)<br><br>VH-CDR3 for mouse and chimeric 1A3 antibodies<br>FLNYYGSNYAMDY (SEQ ID NO: 8)<br><br>VL-CDR1 for mouse and chimeric 1A3 antibodies<br>KASQDVGPAVA (SEQ ID NO: 11)<br><br>VL-CDR2 for mouse and chimeric 1A3 antibodies<br>WASTRHT (SEQ ID NO: 14)<br><br>VL-CDR3 for mouse and chimeric 1A3 antibodies<br>QQYFTYPLT (SEQ ID NO: 17)<br><br>VH for mouse and chimeric 1A3 antibodies<br>EVQLQQSGPELVKTGASVKISCKASGYSFIGYYLHWVKQSLGKGLEWIGYISCHDGTIIYNQK<br>FKGKATFTLDTSSSTAYMQFSSLTSEDSAVYFCARFLNYYGSNYAMDYWGQGTSVTVSS<br>(SEQ ID NO: 21)<br><br>VL for mouse and chimeric 1A3 antibodies<br>DIVMTQSHKFMSTSVGDRVSITCKASQDVGPAVAWYQQKPGQSPKLLIYWASTRHTGVPDR<br>FTGSGYGTDFTLTINNVQSEDLADYFCQQYFTYPLTFGGGTKLEIK (SEQ ID NO: 25)<br><br>VH-CDR1 for mouse and chimeric 1D1 antibodies<br>DYVMH (SEQ ID NO: 3)<br><br>VH-CDR2 for mouse and chimeric 1D1 antibodies<br>YINPYNDGTTYNEKFKG (SEQ ID NO: 6)<br><br>VH-CDR3 for mouse and chimeric 1D1 antibodies<br>GFLRESWFGY (SEQ ID NO: 9)<br><br>VL-CDR1 for mouse and chimeric 1D1 antibodies<br>RSSQNIVHSNGNTYLD (SEQ ID NO: 12)<br><br>VL-CDR2 for mouse and chimeric 1D1 antibodies<br>KVSNRFS (SEQ ID NO: 15)<br><br>VL-CDR3 for mouse and chimeric 1D1 antibodies<br>FQGSHVPPT (SEQ ID NO: 18) |

| Description/<br>Sequence/SEQ ID NO. |
| --- |
| VH for mouse and chimeric 1D1 antibodies<br>EVQLQQSGPELVKPGASVKMSCKASGYTFTDYVMHWVKQKPGQGLECIGYINPYNDGTTY<br>NEKFKGKATLTSDKSSNAAYLELSSLTSEDSAVYYCARGFLRESWFGYWGQGTLVTVSA<br>(SEQ ID NO: 22) |
| VL for mouse and chimeric 1D1 antibodies<br>DVLLTQTPLSLPVSLGDQASISCRSSQNIVHSNGNTYLDWYLQKPGQSPKLLIYKVSNRFSGV<br>PDRFSGSGSGTDFTLKISRVEAEDLGVYYCFQGSHVPPTFGGGTKLELK (SEQ ID NO:26) |
| Heavy chain constant region (for chimeric antibodies)<br>ASTKGPSVFPLAPSSKSTSGGTAALGCLVKDYFPEPVTVSWNSGALTSGVHTFPAVLQSSGLY<br>SLSSVVTVPSSSLGTQTYICNVNHKPSNTKVDKKVEPKSCDKTHTCPPCPAPELLGGPSVFLFP<br>PKPKDTLMISRTPEVTCVVVDVSHEDPEVKFNWYVDGVEVHNAKTKPREEQYNSTYRVVSV<br>LTVLHQDWLNGKEYKCKVSNKALPAPIEKTISKAKGQPREPQVYTLPPSREEMTKNQVSLTC<br>LVKGFYPSDIAVEWESNGQPENNYKTTPPVLDSDGSFFLYSKLTVDKSRWQQGNVFSCSVM<br>HEALHNHYTQKSLSLSPGK (SEQ ID NO.: 27)<br>GCTAGCACCAAGGGCCCATCGGTCTTCCCCCTGGCACCCTCCTCCAAGAGCACCTCTGGG<br>GGCACAGCGGCCCTGGGCTGCCTGGTCAAGGACTACTTCCCCGAACCGGTGACGGTGTC<br>GTGGAACTCAGGCGCCCTGACCAGCGGCGTGCACACCTTCCCGGCTGTCCTACAGTCCTC<br>AGGACTCTACTCCCTCAGCAGCGTGGTGACCGTGCCCTCCAGCAGCTTGGGCACCCAGAC<br>CTACATCTGCAACGTGAATCACAAGCCCAGCAACACCAAGGTGGACAAGAAAGTTGAGC<br>CCAAATCTTGTGACAAAACTCACACATGCCCACCGTGCCCAGCACCTGAACTCCTGGGGG<br>GACCGTCAGTCTTCCTCTTCCCCCCAAAACCCAAGGACACCCTCATGATCTCCCGGACCC<br>CTGAGGTCACATGCGTGGTGGTGGACGTGAGCCACGAAGACCCTGAGGTCAAGTTCAAC<br>TGGTACGTGGACGGCGTGGAGGTGCATAATGCCAAGACAAAGCCGCGGGAGGAGCAGT<br>ACAACAGCACGTACCGTGTGGTCAGCGTCCTCACCGTCCTGCACCAGGACTGGCTGAATG<br>GCAAGGAGTACAAGTGCAAGGTCTCCAACAAAGCCCTCCCAGCCCCATCGAGAAAACC<br>ATCTCCAAAGCCAAAGGGCAGCCCCGAGAACCACAGGTGTACACCCTGCCCCCATCCCG<br>GGAGGAGATGACCAAGAACCAGGTCAGCCTGACCTGCCTGGTCAAAGGCTTCTATCCCA<br>GCGACATCGCCGTGGAGTGGGAGAGCAATGGGCAGCCGGAGAACAACTACAAGACCAC<br>GCCTCCCGTGCTGGACTCCGACGGCTCCTTCTTCCTCTACAGCAAGCTCACCGTGGACAA<br>GAGCAGGTGGCAGCAGGGGAACGTCTTCTCATGCTCCGTGATGCATGAGGCTCTGCACA<br>ACCACTACACGCAGAAGAGCCTCTCCCTGTCTCCGGGTAAATGA (SEQ ID NO: 37) |
| Heavy chain constant region (for humanized antibodies)<br>ASTKGPSVFPLAPCSRSTSESTAALGCLVKDYFPEPVTVSWNSGALTSGVHTFPAVLQSSGLY<br>SLSSVVTVPSSNFGTQTYTCNVDHKPSNTKVDKTVERKCCVECPPCPAPPVAGPSVFLFPPKP<br>KDTLMISRTPEVTCVVVDVSHEDPEVQFNWYVDGVEVHNAKTKPREEQFNSTFRVVSVLTV<br>VHQDWLNGKEYKCKVSNKGLPAPIEKTISKTKGQPREPQVYTLPPSREEMTKNQVSLTCLVK<br>GFYPSDIAVEWESNGQPENNYKTTPPMLDSDGSFFLYSKLTVDKSRWQQGNVFSCSVMHEA<br>LHNHYTQKSLSLSPGK(SEQ ID NO.: 28)<br>GCCTCCACCAAGGGCCCATCGGTCTTCCCCCTGGCGCCCTGCTCCAGGAGCACCTCTGAG<br>AGCACAGCGGCCCTGGGCTGCCTGGTCAAGGACTACTTCCCCGAACCGGTGACGGTGTC<br>GTGGAACTCAGGCGCTCTGACCAGCGGCGTGCACACCTTCCCAGCTGTCCTACAGTCCTC<br>AGGACTCTACTCCCTCAGCAGCGTGGTGACCGTGCCCTCCAGCAACTTCGGCACCCAGAC<br>CTACACCTGCAACGTAGATCACAAGCCCAGCAACACCAAGGTGGACAAGACAGTTGAGC<br>GCAAATGTTGTGTCGAGTGCCCACCGTGCCCAGCACCACCTGTGGCAGGACCGTCAGTCT<br>TCCTCTTCCCCCCAAAACCCAAGGACACCCTCATGATCTCCCGGACCCCTGAGGTCACGT<br>GCGTGGTGGTGGACGTGAGCCACGAAGACCCCGAGGTCCAGTTCAACTGGTACGTGGAC<br>GGCGTGGAGGTGCATAATGCCAAGACAAAGCCACGGGAGGAGCAGTTCAACAGCACGTT<br>CCGTGTGGTCAGCGTCCTCACCGTTGTGCACCAGGACTGGCTGAACGGCAAGGAGTACA<br>AGTGCAAGGTCTCCAACAAAGGCCTCCCAGCCCCCATCGAGAAAATCATCTCCAAAACC<br>AAAGGGCAGCCCCGAGAACCACAGGTGTACACCCTGCCCCCATCCCGGGAGGAGATGAC<br>CAAGAACCAGGTCAGCCTGACCTGCCTGGTCAAAGGCTTCTACCCCAGCGACATCGCCGT<br>GGAGTGGGAGAGCAATGGGCAGCCGGAGAACAACTACAAGACCACACCTCCCATGCTG<br>GACTCCGACGGCTCCTTCTTCCTCTACAGCAAGCTCACCGTGGACAAGAGCAGGTGGCAG<br>CAGGGGAACGTCTTCTCATGCTCCGTGATGCATGAGGCTCTGCACAACCACTACACGCAG<br>AAGAGCCTCTCCCTGTCTCCGGGTAAATGA (SEQ ID NO: 38) |
| Light chain constant region for chimeric and humanized antibodies<br>RTVAAPSVFIFPPSDEQLKSGTASVVCLLNNFYPREAKVQWKVDNALQSGNSQESVTEQDSK<br>DSTYSLSSTLTLSKADYEKHKVYACEVTHQGLSSPVTKSFNRGEC (SEQ ID NO.: 29)<br>CGTACGGTGGCGGCGCCATCTGTCTTCATCTTCCCGCCATCTGATGAGCAGTTGAAATCT<br>GGAACTGCCTCTGTTGTGTGCCTGCTGAATAACTTCTATCCCAGAGAGGCCAAAGTACAG<br>TGGAAGGTGGATAACGCCCTCCAATCGGGTAACTCCCAGGAGAGTGTCACAGAGCAGGA<br>CAGCAAGGACAGCACCTACAGCCTCAGCAGCACCCTGACGCTGAGCAAAGCAGACTACG<br>AGAAACACAAAGTCTACGCCTGCGAAGTCACCCATCAGGGCCTGAGCTCGCCCGTCACA<br>AAGAGCTTCAACAGGGGAGAGTGTTGA (SEQ ID NO: 39) |
| Human CD40, uniprot #P25942-1<br>MVRLPLQCVLWGCLLTAVHPEPPTACREKQYLINSQCCSLCQPGQKLVSDCTEFTETECLPC<br>GESEFLDTWNRETHCHQHKYCDPNLGLRVQQKGTSETDTICTCEEGWHCTSEACESCVLHRS<br>CSPGFGVKQIATGVSDTICEPCPVGFFSNVSSAFEKCHPWTSCETKDLVVQQAGTNKTDVVC<br>GPQDRLRALVVIPIIFGILFAILLVLVFIKKVAKKPTNKAPHPKQEPQEINFPDDLPGSNTAAPV<br>QETLHGCQPVTQEDGKESRISVQERQ (SEQ ID NO: 30) |

| Description/ Sequence/SEQ ID NO. |
|---|
| Heavy chain of Dacetuzumab<br>EVQLVESGGGLVQPGGSLRLSCAASGYSFTGYYIHWVRQAPGKGLEWVARVIPNAGGTSYN<br>QKFKGRFTLSVDNSKNTAYLQMNSLRAEDTAVYYCAREGIYWWGQGTLVTVSSASTKGPS<br>VFPLAPSSKSTSGGTAALGCLVKDYFPEPVTVSWNSGALTSGVHTFPAVLQSSGLYSLSSVVT<br>VPSSSLGTQTYICNVNHKPSNTKVDKKVEPKSCDKTHTCPPCPAPELLGGPSVFLFPPKPKDTL<br>MISRTPEVTCVVVDVSHEDPEVKFNWYVDGVEVHNAKTKPREEQYNSTYRVVSVLTVLHQ<br>DWLNGKEYKCKVSNKALPAPIEKTISKAKGQPREPQVYTLPPSREEMTKNQVSLTCLVKGFY<br>PSDIAVEWESNGQPENNYKTTPPVLDSDGSFFLYSKLTVDKSRWQQGNVFSCSVMHEALHN<br>HYTQKSLSLSPGK (SEQ ID NO: 40) |
| Light chain of Dacetuzumab<br>DIQMTQSPSSLSASVGDRVTITCRSSQSLVHSNGNTFLHWYQQKPGKAPKLLIYTVSNRFSGV<br>PSRFSGSGSGTDFTLTISSLQPEDFATYFCSQTTHVPWTFGQGTKVEIKRTVAAPSVFIFPPSDE<br>QLKSGTASVVCLLNNFYPREAKVQWKVDNALQSGNSQESVTEQDSKDSTYSLSSTLTLSKA<br>DYEKHKVYACEVTHQGLSSPVTKSFNRGEC (SEQ ID NO: 41) |
| Heavy chain of Selicrelumab<br>QVQLVQSGAEVKKPGASVKVSCKASGYTFTGYYMHWVRQAPGQGLEWMGWINPDSGGTN<br>YAQKFQGRVTMTRDTSISTAYMELNRLRSDDTAVYYCARDQPLGYCTNGVCSYFDYWGQG<br>TLVTVSSASTKGPSVFPLAPCSRSTSESTAALGCLVKDYFPEPVTVSWNSGALTSGVHTFPAV<br>LQSSGLYSLSSVVTVPSSNFGTQTYTCNVDHKPSNTKVDKTVERKCCVECPPCPAPPVAGPSV<br>FLFPPKPKDTLMISRTPEVTCVVVDVSHEDPEVQFNWYVDGVEVHNAKTKPREEQFNSTFRV<br>VSVLTVVHQDWLNGKEYKCKVSNKGLPAPIEKTISKTKGQPREPQVYTLPPSREEMTKNQVS<br>LTCLVKGFYPSDIAVEWESNGQPENNYKTTPPMLDSDGSFFLYSKLTVDKSRWQQGNVFSCS<br>VMHEALHNHYTQKSLSLSPGK (SEQ ID NO: 42) |
| Light chain of Selicrelumab<br>DIQMTQSPSSVSASVGDRVTITCRASQGIYSWLAWYQQKPGKAPNLLIYTASTLQSGVPSRFS<br>GSGSGTDFTLTISSLQPEDFATYYCQQANIFPLTFGGGTKVEIKRTVAAPSVFIFPPSDEQLKSG<br>TASVVCLLNNFYPREAKVQWKVDNALQSGNSQESVTEQDSKDSTYSLSSTLTLSKADYEKH<br>KVYACEVTHQGLSSPVTKSFNRGEC (SEQ ID NO: 43) |

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

We claim:

1. An isolated monoclonal antibody or an antigen-binding portion thereof, capable of binding to CD40, comprising (i) a heavy chain variable region comprising a VH CDR1 region, a VH CDR2 region and a VH CDR3 region, and (ii) a light chain variable region comprising a VL CDR1 region, a VL CDR2 region and a VL CDR3 region, wherein the VH CDR1 region, the VH CDR2 region, the VH CDR3 region, the VL CDR1 region, the VL CDR2 region and the VL CDR3 region comprise amino acid sequences set forth in (1) SEQ ID NOs: 1, 4, 7, 10, 13 and 16, respectively; (2) SEQ ID NOs: 2, 5, 8, 11, 14 and 17, respectively; or (3) SEQ ID NOs: 3, 6, 9, 12, 15 and 18, respectively.

2. The isolated monoclonal antibody or the antigen-binding portion thereof of claim 1, wherein the heavy chain variable region comprises an amino acid sequence having at least 85%, 86%, 87%, 88%, 89%, 90%, 91%, 92%, 93%, 94%, 95%, 96%, 97%, 98%, 99% or 100% identity to SEQ ID NOs: 19, 20, 21 or 22, wherein $49^{th}$ amino acid residue in SEQ ID NO: 20 is A or S.

3. The isolated monoclonal antibody or the antigen-binding portion thereof of claim 1, wherein the light chain variable region comprises an amino acid sequence having at least 85%, 86%, 87%, 88%, 89%, 90%, 91%, 92%, 93%, 94%, 95%, 96%, 97%, 98%, 99% or 100% identity to SEQ ID NO: 23, 24, 25 or 26, wherein $49^{th}$ and $87^{th}$ amino acid residues in SEQ ID NO: 24 are K and F respectively, or Y and Y respectively.

4. The isolated monoclonal antibody or the antigen-binding portion thereof of claim 1, wherein the heavy chain variable region and the light chain variable region comprise amino acid sequences having at least 85%, 86%, 87%, 88%, 89%, 90%, 91%, 92%, 93%, 94%, 95%, 96%, 97%, 98%, 99% or 100% identity to (1) SEQ ID NOs: 19 and 23, respectively; (2) SEQ ID NOs: 20 and 24, respectively, wherein $49^{th}$ amino acid residue in SEQ ID NO: 20 is A, wherein $49^{th}$ and $87^{th}$ amino acid residues in SEQ ID NO: 24 are K and F respectively; (3) SEQ ID NOs: 20 and 24, respectively, wherein $49^{th}$ amino acid residue in SEQ ID NO: 20 is S, wherein $49^{th}$ and $87^{th}$ amino acid residues in SEQ ID NO: 24 are K and F respectively; (4) SEQ ID NOs: 20 and 24, respectively, wherein $49^{th}$ amino acid residue in SEQ ID NO: 20 is A, wherein $49^{th}$ and $87^{th}$ amino acid residues in SEQ ID NO: 24 are Y and Y respectively; (5) SEQ ID NOs: 20 and 24, respectively, wherein $49^{th}$ amino acid residue in SEQ ID NO: 20 is S, wherein $49^{th}$ and $87^{th}$ amino acid residues in SEQ ID NO: 24 are Y and Y respectively; (6) SEQ ID NOs: 21 and 25, respectively; or (7) SEQ ID NOs: 22 and 26, respectively.

5. The isolated monoclonal antibody or the antigen-binding portion thereof of claim 1, comprising a heavy chain constant region having an amino acid sequence of SEQ ID NOs: 27 or 28, linked to the heavy chain variable region, and a light chain constant region having an amino acid sequence of SEQ ID NO: 29, linked to the light chain variable region.

6. The isolated monoclonal antibody or the antigen-binding portion thereof of claim 1, which is able to (a) bind human CD40; (b) bind monkey CD40; (c) block CD40-CD40L interaction; and/or (d) activate CD40 signaling.

7. The isolated monoclonal antibody or the antigen-binding portion thereof of claim 1, which is a mouse, chimeric or humanized antibody or antigen-binding portion thereof.

8. The isolated monoclonal antibody or the antigen-binding portion thereof of claim 1, which is an IgG1, IgG2 or IgG4 isotype.

9. A nucleotide encoding the isolated monoclonal antibody or the antigen-binding portion thereof of claim 1.

10. An expression vector containing the nucleotide of claim 9.

11. A host cell containing the expression vector of claim 10.

12. A host cell containing the nucleotide of claim 9.

13. A pharmaceutical composition comprising the antibody or the antigen-binding portion thereof of claim 1, and a pharmaceutically acceptable carrier.

14. The pharmaceutical composition of claim 13, further comprising an anti-tumor agent and/or a cytokine.

15. A method for treating a cancer in a subject in need thereof, comprising administering to the subject a therapeutically effective amount of the pharmaceutical composition of claim 13.

16. The method of claim 15, wherein the cancer is a solid or non-solid tumor.

17. The method of claim 16, wherein the cancer is selected from the group consisting of B cell lymphoma, chronic lymphocytic leukemia, multiple myeloma, melanoma, colon adenocarcinoma, pancreas cancer, colon cancer, gastric intestine cancer, prostate cancer, bladder cancer, kidney cancer, ovary cancer, cervix cancer, breast cancer, lung cancer, and nasopharynx cancer.

18. A method for treating an infectious disease in a subject in need thereof, comprising administering to the subject a therapeutically effective amount of the pharmaceutical composition of claim 13.

19. A method for treating an autoimmune disease in a subject in need thereof, comprising administering to the subject a therapeutically effective amount of the pharmaceutical composition of claim 13.

* * * * *

SEQUENCE LISTING

```
<160> NUMBER OF SEQ ID NOS: 43

<210> SEQ ID NO 1
<211> LENGTH: 5
<212> TYPE: PRT
<213> ORGANISM: Artificial Sequence
<220> FEATURE:
<223> OTHER INFORMATION: VH-CDR1 for mouse, chimeric and humanized C1H1
      antibodies

<400> SEQUENCE: 1

Asn Tyr Gly Ile Ser
1               5

<210> SEQ ID NO 2
<211> LENGTH: 5
<212> TYPE: PRT
<213> ORGANISM: Artificial Sequence
<220> FEATURE:
<223> OTHER INFORMATION: VH-CDR1 for mouse and chimeric 1A3 antibodies

<400> SEQUENCE: 2

Gly Tyr Tyr Leu His
1               5

<210> SEQ ID NO 3
<211> LENGTH: 5
<212> TYPE: PRT
<213> ORGANISM: Artificial Sequence
<220> FEATURE:
```

```
<223> OTHER INFORMATION: VH-CDR1 for mouse and chimeric 1D1 antibodies

<400> SEQUENCE: 3

Asp Tyr Val Met His
1               5

<210> SEQ ID NO 4
<211> LENGTH: 17
<212> TYPE: PRT
<213> ORGANISM: Artificial Sequence
<220> FEATURE:
<223> OTHER INFORMATION: VH-CDR2 for mouse, chimeric and humanized C1H1
      antibodies

<400> SEQUENCE: 4

Ser Ile Ser Ser Gly Gly Asp Asn Thr Tyr Tyr Pro Asp Asn Val Lys
1               5                   10                  15

Gly

<210> SEQ ID NO 5
<211> LENGTH: 17
<212> TYPE: PRT
<213> ORGANISM: Artificial Sequence
<220> FEATURE:
<223> OTHER INFORMATION: VH-CDR2 for mouse and chimeric 1A3 antibodies

<400> SEQUENCE: 5

Tyr Ile Ser Cys His Asp Gly Thr Ile Ile Tyr Asn Gln Lys Phe Lys
1               5                   10                  15

Gly

<210> SEQ ID NO 6
<211> LENGTH: 17
<212> TYPE: PRT
<213> ORGANISM: Artificial Sequence
<220> FEATURE:
<223> OTHER INFORMATION: VH-CDR2 for mouse and chimeric 1D1 antibodies

<400> SEQUENCE: 6

Tyr Ile Asn Pro Tyr Asn Asp Gly Thr Thr Tyr Asn Glu Lys Phe Lys
1               5                   10                  15

Gly

<210> SEQ ID NO 7
<211> LENGTH: 8
<212> TYPE: PRT
<213> ORGANISM: Artificial Sequence
<220> FEATURE:
<223> OTHER INFORMATION: VH-CDR3 for mouse, chimeric and humanized C1H1
      antibodies

<400> SEQUENCE: 7

Ala Gly Glu Lys Ala Met Asp Tyr
1               5

<210> SEQ ID NO 8
<211> LENGTH: 13
<212> TYPE: PRT
<213> ORGANISM: Artificial Sequence
<220> FEATURE:
<223> OTHER INFORMATION: VH-CDR3 for mouse and chimeric 1A3 antibodies

<400> SEQUENCE: 8

Phe Leu Asn Tyr Tyr Gly Ser Asn Tyr Ala Met Asp Tyr
1               5                   10
```

<210> SEQ ID NO 9
<211> LENGTH: 10
<212> TYPE: PRT
<213> ORGANISM: Artificial Sequence
<220> FEATURE:
<223> OTHER INFORMATION: VH-CDR3 for mouse and chimeric 1D1 antibodies

<400> SEQUENCE: 9

Gly Phe Leu Arg Glu Ser Trp Phe Gly Tyr
1               5                   10

<210> SEQ ID NO 10
<211> LENGTH: 11
<212> TYPE: PRT
<213> ORGANISM: Artificial Sequence
<220> FEATURE:
<223> OTHER INFORMATION: VL-CDR1 for mouse, chimeric and humanized C1H1
      antibodies

<400> SEQUENCE: 10

Arg Ala Ser Gln Thr Ile Asn Asn Asn Leu His
1               5                   10

<210> SEQ ID NO 11
<211> LENGTH: 11
<212> TYPE: PRT
<213> ORGANISM: Artificial Sequence
<220> FEATURE:
<223> OTHER INFORMATION: VL-CDR1 for mouse and chimeric 1A3 antibodies

<400> SEQUENCE: 11

Lys Ala Ser Gln Asp Val Gly Pro Ala Val Ala
1               5                   10

<210> SEQ ID NO 12
<211> LENGTH: 16
<212> TYPE: PRT
<213> ORGANISM: Artificial Sequence
<220> FEATURE:
<223> OTHER INFORMATION: VL-CDR1 for mouse and chimeric 1D1 antibodies

<400> SEQUENCE: 12

Arg Ser Ser Gln Asn Ile Val His Ser Asn Gly Asn Thr Tyr Leu Asp
1               5                   10                  15

<210> SEQ ID NO 13
<211> LENGTH: 7
<212> TYPE: PRT
<213> ORGANISM: Artificial Sequence
<220> FEATURE:
<223> OTHER INFORMATION: VL-CDR2 for mouse, chimeric and humanized C1H1
      antibody

<400> SEQUENCE: 13

Tyr Ala Ser Gln Ser Ile Ser
1               5

<210> SEQ ID NO 14
<211> LENGTH: 7
<212> TYPE: PRT
<213> ORGANISM: Artificial Sequence
<220> FEATURE:
<223> OTHER INFORMATION: VL-CDR2 for mouse and chimeric 1A3 antibodies

<400> SEQUENCE: 14

Trp Ala Ser Thr Arg His Thr

```
<210> SEQ ID NO 15
<211> LENGTH: 7
<212> TYPE: PRT
<213> ORGANISM: Artificial Sequence
<220> FEATURE:
<223> OTHER INFORMATION: VL-CDR2 for mouse and chimeric 1D1 antibodies

<400> SEQUENCE: 15

Lys Val Ser Asn Arg Phe Ser
1               5

<210> SEQ ID NO 16
<211> LENGTH: 9
<212> TYPE: PRT
<213> ORGANISM: Artificial Sequence
<220> FEATURE:
<223> OTHER INFORMATION: VL-CDR3 for mouse, chimeric and humanized C1H1
      antibodies

<400> SEQUENCE: 16

Gln Gln Phe Ser Ser Trp Pro Leu Thr
1               5

<210> SEQ ID NO 17
<211> LENGTH: 9
<212> TYPE: PRT
<213> ORGANISM: Artificial Sequence
<220> FEATURE:
<223> OTHER INFORMATION: VL-CDR3 for mouse and chimeric 1A3 antibodies

<400> SEQUENCE: 17

Gln Gln Tyr Phe Thr Tyr Pro Leu Thr
1               5

<210> SEQ ID NO 18
<211> LENGTH: 9
<212> TYPE: PRT
<213> ORGANISM: Artificial Sequence
<220> FEATURE:
<223> OTHER INFORMATION: VL-CDR3 for mouse and chimeric 1D1 antibodies

<400> SEQUENCE: 18

Phe Gln Gly Ser His Val Pro Pro Thr
1               5

<210> SEQ ID NO 19
<211> LENGTH: 117
<212> TYPE: PRT
<213> ORGANISM: Artificial Sequence
<220> FEATURE:
<223> OTHER INFORMATION: VH for mouse and chimeric C1H1 antibodies

<400> SEQUENCE: 19

Glu Val Lys Leu Val Glu Ser Gly Gly Leu Val Lys Pro Gly Ala
1               5                   10                  15

Ser Leu Lys Leu Ser Cys Ala Ala Ser Gly Phe Thr Phe Ser Asn Tyr
            20                  25                  30

Gly Ile Ser Trp Val Arg Gln Thr Ser Asp Lys Arg Leu Glu Trp Val
        35                  40                  45

Ala Ser Ile Ser Ser Gly Gly Asp Asn Thr Tyr Tyr Pro Asp Asn Val
    50                  55                  60

Lys Gly Arg Phe Thr Ile Ser Arg Glu Asn Ala Lys Asn Thr Leu Tyr
65                  70                  75                  80
```

-continued

Leu Gln Met Ser Ser Leu Lys Ser Glu Asp Thr Ala Leu Tyr Tyr Cys
                85                  90                  95

Ala Arg Ala Gly Glu Lys Ala Met Asp Tyr Trp Gly Gln Gly Thr Ser
            100                 105                 110

Val Thr Val Ser Ser
        115

<210> SEQ ID NO 20
<211> LENGTH: 117
<212> TYPE: PRT
<213> ORGANISM: Artificial Sequence
<220> FEATURE:
<223> OTHER INFORMATION: VH for huC1H1-V1 to huC1H1-V4
<220> FEATURE:
<221> NAME/KEY: misc_feature
<222> LOCATION: (49)..(49)
<223> OTHER INFORMATION: Xaa can be Ala or Ser

<400> SEQUENCE: 20

Glu Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Ser Asn Tyr
            20                  25                  30

Gly Ile Ser Trp Val Arg Gln Ala Pro Gly Lys Gly Leu Glu Trp Val
        35                  40                  45

Xaa Ser Ile Ser Ser Gly Gly Asp Asn Thr Tyr Tyr Pro Asp Asn Val
50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Ala Gly Glu Lys Ala Met Asp Tyr Trp Gly Gln Gly Thr Leu
            100                 105                 110

Val Thr Val Ser Ser
        115

<210> SEQ ID NO 21
<211> LENGTH: 122
<212> TYPE: PRT
<213> ORGANISM: Artificial Sequence
<220> FEATURE:
<223> OTHER INFORMATION: VH for mouse and chimeric 1A3 antibodies

<400> SEQUENCE: 21

Glu Val Gln Leu Gln Gln Ser Gly Pro Glu Leu Val Lys Thr Gly Ala
1               5                   10                  15

Ser Val Lys Ile Ser Cys Lys Ala Ser Gly Tyr Ser Phe Ile Gly Tyr
            20                  25                  30

Tyr Leu His Trp Val Lys Gln Ser Leu Gly Lys Gly Leu Glu Trp Ile
        35                  40                  45

Gly Tyr Ile Ser Cys His Asp Gly Thr Ile Ile Tyr Asn Gln Lys Phe
    50                  55                  60

Lys Gly Lys Ala Thr Phe Thr Leu Asp Thr Ser Ser Ser Thr Ala Tyr
65                  70                  75                  80

Met Gln Phe Ser Ser Leu Thr Ser Glu Asp Ser Ala Val Tyr Phe Cys
                85                  90                  95

Ala Arg Phe Leu Asn Tyr Tyr Gly Ser Asn Tyr Ala Met Asp Tyr Trp
            100                 105                 110

```
Gly Gln Gly Thr Ser Val Thr Val Ser Ser
        115                 120

<210> SEQ ID NO 22
<211> LENGTH: 119
<212> TYPE: PRT
<213> ORGANISM: Artificial Sequence
<220> FEATURE:
<223> OTHER INFORMATION: VH for mouse and chimeric 1D1 antibodies

<400> SEQUENCE: 22

Glu Val Gln Leu Gln Gln Ser Gly Pro Glu Leu Val Lys Pro Gly Ala
1               5                   10                  15

Ser Val Lys Met Ser Cys Lys Ala Ser Gly Tyr Thr Phe Thr Asp Tyr
            20                  25                  30

Val Met His Trp Val Lys Gln Lys Pro Gly Gln Gly Leu Glu Cys Ile
        35                  40                  45

Gly Tyr Ile Asn Pro Tyr Asn Asp Gly Thr Thr Tyr Asn Glu Lys Phe
    50                  55                  60

Lys Gly Lys Ala Thr Leu Thr Ser Asp Lys Ser Ser Asn Ala Ala Tyr
65                  70                  75                  80

Leu Glu Leu Ser Ser Leu Thr Ser Glu Asp Ser Ala Val Tyr Tyr Cys
                85                  90                  95

Ala Arg Gly Phe Leu Arg Glu Ser Trp Phe Gly Tyr Trp Gly Gln Gly
            100                 105                 110

Thr Leu Val Thr Val Ser Ala
        115

<210> SEQ ID NO 23
<211> LENGTH: 107
<212> TYPE: PRT
<213> ORGANISM: Artificial Sequence
<220> FEATURE:
<223> OTHER INFORMATION: VL for mouse and chimeric C1H1 antibodies

<400> SEQUENCE: 23

Asp Ile Val Leu Thr Gln Ser Pro Val Thr Leu Ser Val Thr Pro Gly
1               5                   10                  15

Asp Ser Val Ser Leu Ser Cys Arg Ala Ser Gln Thr Ile Asn Asn Asn
            20                  25                  30

Leu His Trp Tyr Gln Gln Lys Ser His Glu Ser Pro Arg Leu Leu Ile
        35                  40                  45

Lys Tyr Ala Ser Gln Ser Ile Ser Gly Ile Pro Ser Arg Phe Ser Gly
    50                  55                  60

Ser Gly Ser Gly Thr Asp Phe Thr Leu Ser Ile Asn Ser Val Glu Thr
65                  70                  75                  80

Glu Asp Phe Gly Ile Tyr Phe Cys Gln Gln Phe Ser Ser Trp Pro Leu
                85                  90                  95

Thr Phe Gly Ala Gly Thr Lys Leu Glu Leu Lys
            100                 105

<210> SEQ ID NO 24
<211> LENGTH: 107
<212> TYPE: PRT
<213> ORGANISM: Artificial Sequence
<220> FEATURE:
<223> OTHER INFORMATION: VL for huC1H1-V1 to huC1H1-V4
<220> FEATURE:
<221> NAME/KEY: misc_feature
<222> LOCATION: (49)..(49)
<223> OTHER INFORMATION: Xaa can be Lys or Tyr
```

```
<220> FEATURE:
<221> NAME/KEY: misc_feature
<222> LOCATION: (87)..(87)
<223> OTHER INFORMATION: Xaa can be Phe or Tyr

<400> SEQUENCE: 24

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Thr Ile Asn Asn Asn
            20                  25                  30

Leu His Trp Tyr Gln Gln Lys Pro Gly Gln Ala Pro Arg Leu Leu Ile
        35                  40                  45

Xaa Tyr Ala Ser Gln Ser Ile Ser Gly Ile Pro Ala Arg Phe Ser Gly
50                  55                  60

Ser Gly Ser Gly Thr Asp Phe Thr Leu Thr Ile Ser Ser Leu Glu Pro
65                  70                  75                  80

Glu Asp Phe Ala Val Tyr Xaa Cys Gln Gln Phe Ser Ser Trp Pro Leu
                85                  90                  95

Thr Phe Gly Gly Gly Thr Lys Val Glu Ile Lys
            100                 105

<210> SEQ ID NO 25
<211> LENGTH: 107
<212> TYPE: PRT
<213> ORGANISM: Artificial Sequence
<220> FEATURE:
<223> OTHER INFORMATION: VL for mouse and chimeric 1A3 antibodies

<400> SEQUENCE: 25

Asp Ile Val Met Thr Gln Ser His Lys Phe Met Ser Thr Ser Val Gly
1               5                   10                  15

Asp Arg Val Ser Ile Thr Cys Lys Ala Ser Gln Asp Val Gly Pro Ala
            20                  25                  30

Val Ala Trp Tyr Gln Gln Lys Pro Gly Gln Ser Pro Lys Leu Leu Ile
        35                  40                  45

Tyr Trp Ala Ser Thr Arg His Thr Gly Val Pro Asp Arg Phe Thr Gly
50                  55                  60

Ser Gly Tyr Gly Thr Asp Phe Thr Leu Thr Ile Asn Asn Val Gln Ser
65                  70                  75                  80

Glu Asp Leu Ala Asp Tyr Phe Cys Gln Gln Tyr Phe Thr Tyr Pro Leu
                85                  90                  95

Thr Phe Gly Gly Gly Thr Lys Leu Glu Ile Lys
            100                 105

<210> SEQ ID NO 26
<211> LENGTH: 112
<212> TYPE: PRT
<213> ORGANISM: Artificial Sequence
<220> FEATURE:
<223> OTHER INFORMATION: VL for mouse and chimeric 1D1 antibodies

<400> SEQUENCE: 26

Asp Val Leu Leu Thr Gln Thr Pro Leu Ser Leu Pro Val Ser Leu Gly
1               5                   10                  15

Asp Gln Ala Ser Ile Ser Cys Arg Ser Ser Gln Asn Ile Val His Ser
            20                  25                  30

Asn Gly Asn Thr Tyr Leu Asp Trp Tyr Leu Gln Lys Pro Gly Gln Ser
        35                  40                  45

Pro Lys Leu Leu Ile Tyr Lys Val Ser Asn Arg Phe Ser Gly Val Pro
```

```
                    50                  55                  60
Asp Arg Phe Ser Gly Ser Gly Ser Gly Thr Asp Phe Thr Leu Lys Ile
 65                  70                  75                  80

Ser Arg Val Glu Ala Glu Asp Leu Gly Val Tyr Tyr Cys Phe Gln Gly
                     85                  90                  95

Ser His Val Pro Pro Thr Phe Gly Gly Gly Thr Lys Leu Glu Leu Lys
                100                 105                 110

<210> SEQ ID NO 27
<211> LENGTH: 330
<212> TYPE: PRT
<213> ORGANISM: Artificial Sequence
<220> FEATURE:
<223> OTHER INFORMATION: Heavy chain constant region

<400> SEQUENCE: 27

Ala Ser Thr Lys Gly Pro Ser Val Phe Pro Leu Ala Pro Ser Ser Lys
 1               5                  10                  15

Ser Thr Ser Gly Gly Thr Ala Ala Leu Gly Cys Leu Val Lys Asp Tyr
                 20                  25                  30

Phe Pro Glu Pro Val Thr Val Ser Trp Asn Ser Gly Ala Leu Thr Ser
             35                  40                  45

Gly Val His Thr Phe Pro Ala Val Leu Gln Ser Ser Gly Leu Tyr Ser
         50                  55                  60

Leu Ser Ser Val Val Thr Val Pro Ser Ser Ser Leu Gly Thr Gln Thr
 65                  70                  75                  80

Tyr Ile Cys Asn Val Asn His Lys Pro Ser Asn Thr Lys Val Asp Lys
                     85                  90                  95

Lys Val Glu Pro Lys Ser Cys Asp Lys Thr His Thr Cys Pro Pro Cys
                100                 105                 110

Pro Ala Pro Glu Leu Leu Gly Gly Pro Ser Val Phe Leu Phe Pro Pro
            115                 120                 125

Lys Pro Lys Asp Thr Leu Met Ile Ser Arg Thr Pro Glu Val Thr Cys
        130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
```

Gln Lys Ser Leu Ser Leu Ser Pro Gly Lys
            325                 330

<210> SEQ ID NO 28
<211> LENGTH: 326
<212> TYPE: PRT
<213> ORGANISM: Artificial Sequence
<220> FEATURE:
<223> OTHER INFORMATION: Heavy chain constant region

<400> SEQUENCE: 28

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Asn Phe Gly Thr Gln Thr
65                  70                  75                  80

Tyr Thr Cys Asn Val Asp His Lys Pro Ser Asn Thr Lys Val Asp Lys
                85                  90                  95

Thr Val Glu Arg Lys Cys Cys Val Glu Cys Pro Pro Cys Pro Ala Pro
            100                 105                 110

Pro Val Ala Gly Pro Ser Val Phe Leu Phe Pro Pro Lys Pro Lys Asp
        115                 120                 125

Thr Leu Met Ile Ser Arg Thr Pro Glu Val Thr Cys Val Val Val Asp
130                 135                 140

Val Ser His Glu Asp Pro Glu Val Gln Phe Asn Trp Tyr Val Asp Gly
145                 150                 155                 160

Val Glu Val His Asn Ala Lys Thr Lys Pro Arg Glu Glu Gln Phe Asn
                165                 170                 175

Ser Thr Phe Arg Val Val Ser Val Leu Thr Val Val His Gln Asp Trp
            180                 185                 190

Leu Asn Gly Lys Glu Tyr Lys Cys Lys Val Ser Asn Lys Gly Leu Pro
        195                 200                 205

Ala Pro Ile Glu Lys Thr Ile Ser Lys Thr Lys Gly Gln Pro Arg Glu
    210                 215                 220

Pro Gln Val Tyr Thr Leu Pro Pro Ser Arg Glu Glu Met Thr Lys Asn
225                 230                 235                 240

Gln Val Ser Leu Thr Cys Leu Val Lys Gly Phe Tyr Pro Ser Asp Ile
                245                 250                 255

Ala Val Glu Trp Glu Ser Asn Gly Gln Pro Glu Asn Asn Tyr Lys Thr
            260                 265                 270

Thr Pro Pro Met Leu Asp Ser Asp Gly Ser Phe Phe Leu Tyr Ser Lys
        275                 280                 285

Leu Thr Val Asp Lys Ser Arg Trp Gln Gln Gly Asn Val Phe Ser Cys
    290                 295                 300

Ser Val Met His Glu Ala Leu His Asn His Tyr Thr Gln Lys Ser Leu
305                 310                 315                 320

Ser Leu Ser Pro Gly Lys
            325

```
-continued

<210> SEQ ID NO 29
<211> LENGTH: 107
<212> TYPE: PRT
<213> ORGANISM: Artificial Sequence
<220> FEATURE:
<223> OTHER INFORMATION: Light chain constant region

<400> SEQUENCE: 29

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 30
<211> LENGTH: 277
<212> TYPE: PRT
<213> ORGANISM: Homo sapiens

<400> SEQUENCE: 30

Met Val Arg Leu Pro Leu Gln Cys Val Leu Trp Gly Cys Leu Leu Thr
1               5                   10                  15

Ala Val His Pro Glu Pro Pro Thr Ala Cys Arg Glu Lys Gln Tyr Leu
            20                  25                  30

Ile Asn Ser Gln Cys Cys Ser Leu Cys Gln Pro Gly Gln Lys Leu Val
        35                  40                  45

Ser Asp Cys Thr Glu Phe Thr Glu Thr Glu Cys Leu Pro Cys Gly Glu
    50                  55                  60

Ser Glu Phe Leu Asp Thr Trp Asn Arg Glu Thr His Cys His Gln His
65                  70                  75                  80

Lys Tyr Cys Asp Pro Asn Leu Gly Leu Arg Val Gln Gln Lys Gly Thr
                85                  90                  95

Ser Glu Thr Asp Thr Ile Cys Thr Cys Glu Glu Gly Trp His Cys Thr
            100                 105                 110

Ser Glu Ala Cys Glu Ser Cys Val Leu His Arg Ser Cys Ser Pro Gly
        115                 120                 125

Phe Gly Val Lys Gln Ile Ala Thr Gly Val Ser Asp Thr Ile Cys Glu
    130                 135                 140

Pro Cys Pro Val Gly Phe Phe Ser Asn Val Ser Ser Ala Phe Glu Lys
145                 150                 155                 160

Cys His Pro Trp Thr Ser Cys Glu Thr Lys Asp Leu Val Val Gln Gln
                165                 170                 175

Ala Gly Thr Asn Lys Thr Asp Val Val Cys Gly Pro Gln Asp Arg Leu
            180                 185                 190

Arg Ala Leu Val Val Ile Pro Ile Ile Phe Gly Ile Leu Phe Ala Ile
        195                 200                 205

Leu Leu Val Leu Val Phe Ile Lys Lys Val Ala Lys Lys Pro Thr Asn
    210                 215                 220
```

Lys Ala Pro His Pro Lys Gln Glu Pro Gln Glu Ile Asn Phe Pro Asp
225                 230                 235                 240

Asp Leu Pro Gly Ser Asn Thr Ala Ala Pro Val Gln Glu Thr Leu His
            245                 250                 255

Gly Cys Gln Pro Val Thr Gln Glu Asp Gly Lys Glu Ser Arg Ile Ser
        260                 265                 270

Val Gln Glu Arg Gln
        275

<210> SEQ ID NO 31
<211> LENGTH: 351
<212> TYPE: DNA
<213> ORGANISM: Artificial Sequence
<220> FEATURE:
<223> OTHER INFORMATION: VH for mouse C1H1

<400> SEQUENCE: 31
gaagtgaaac tggtggagtc tgggggaggc ttagtgaagc ctggagcgtc tctgaaactc      60
tcctgtgcag cctctggatt cactttcagt aactatggca tatcttgggt tcgccagact     120
tcagacaaga ggctggagtg ggtcgcatcc attagtagtg gtggtgataa cacctactat     180
ccagacaatg taaagggccg attcaccatc tccagagaga atgccaagaa caccctatac     240
ctacaaatga gtagtctgaa gtctgaggac acggccttgt attactgtgc aagagctggg     300
gagaaggcta tggactactg gggtcaagga acctcagtca ccgtctcctc a              351

<210> SEQ ID NO 32
<211> LENGTH: 351
<212> TYPE: DNA
<213> ORGANISM: Artificial Sequence
<220> FEATURE:
<223> OTHER INFORMATION: VH for chimeric C1H1

<400> SEQUENCE: 32
gaggtgaagc tggtggagtc cggcggcggc ctggtgaagc tggagctagc ctgaagctg       60 agctgcgccg ccagcggctt cacctttttcc aactacggca tcagctgggt gaggcagaca    120
agcgataaga ggctggagtg ggtggccagc atcagcagcg gcggcgataa cacatactac     180
cctgacaacg tgaagggcag attcaccatc agcagggaga cgccaagaa tacctgtac      240 ctgcagatga gcagcctgaa gagcgaggac accgccctgt actactgtgc cagggccggc     300
gagaaggcca tggactactg gggccagggc acctccgtga ccgtgagctc c              351

<210> SEQ ID NO 33
<211> LENGTH: 351
<212> TYPE: DNA
<213> ORGANISM: Artificial Sequence
<220> FEATURE:
<223> OTHER INFORMATION: VH for huC1H1-V2 and huC1H1-V4

<400> SEQUENCE: 33
gaggtgcagc tggtggagag cggcggcgga ctggtgaagc tggcggaag cctgagactg       60 agctgcgccg cctccggctt caccttctcc aactacggca tcagctgggt gaggcaggcc     120
cccggaaagg gcctggagtg ggtgagcagc atcagcagcg gcggcgacaa tacctactac     180
cctgacaacg tgaagggcag gttcaccatc agcagagaca atgccaagaa ttccctgtac     240
ctgcagatga acagcctgag agccgaggat acagccgtgt actactgtgc cagagccggc     300
gagaaggcca tggattactg gggccagggc accctggtga ccgtgtcctc c              351

<210> SEQ ID NO 34
<211> LENGTH: 321
<212> TYPE: DNA
<213> ORGANISM: Artificial Sequence
<220> FEATURE:
<223> OTHER INFORMATION: VL for mouse C1H1

<400> SEQUENCE: 34

```
gatattgtac taactcagtc tccagtcacc ctgtctgtga ctccaggaga tagcgtcagt      60
ctttcctgca gggccagcca aactattaac aacaacctac actggtatca acaaaaatca     120
catgagtctc caaggcttct catcaagtat gcttcccagt ccatctctgg gatcccctcc     180
aggttcagtg gcagtggatc aggacagat ttcactctca gtatcaacag tgtggagact      240
gaagattttg gaatatattt ctgtcaacag tttagcagct ggcctcttac gttcggtgct     300
gggactaagc tggagctgaa a                                                321
```

<210> SEQ ID NO 35
<211> LENGTH: 321
<212> TYPE: DNA
<213> ORGANISM: Artificial Sequence
<220> FEATURE:
<223> OTHER INFORMATION: VL for chimeric C1H1

<400> SEQUENCE: 35

```
gatatcgtgc tgacccagag ccccgtgacc ctgagcgtga cacccggcga cagcgtgagc      60
ctgtcctgca gagccagcca gaccatcaac aacaatctgc actggtatca acagaagagc     120
cacgagagcc ccaggctgct gatcaagtac gccagccaga gcatctccgg catccctagc     180
agattcagcg gctccggctc cggcacagac tttaccctga gcatcaacag cgtggagacc     240
gaggatttcg gcatctactt ttgccagcag tttttcctcct ggcctctgac attcggcgcc    300
ggcacaaagc tggagctgaa g                                                321
```

<210> SEQ ID NO 36
<211> LENGTH: 321
<212> TYPE: DNA
<213> ORGANISM: Artificial Sequence
<220> FEATURE:
<223> OTHER INFORMATION: VL for huC1H1-V1 and huC1H1-V2

<400> SEQUENCE: 36

```
gagatcgtgc tgacccagag ccccgccacc ctgagcctga gccctggaga gagggccacc      60
ctgtcctgca gggcctccca gacaatcaat aataatctgc actggtatca acagaagccc     120
ggccaggccc ccaggctgct gatcaagtac gccagccagt ccatcagcgg catccctgcc     180
aggttctccg gcagcggcag cggaacagac ttcaccctga ccatctcctc cctggagcct     240
gaggactttg ccgtgtactt ttgccagcag ttctccagct ggcctctgac ctttggcggc     300
ggcaccaagg tggagatcaa g                                                321
```

<210> SEQ ID NO 37
<211> LENGTH: 993
<212> TYPE: DNA
<213> ORGANISM: Artificial Sequence
<220> FEATURE:
<223> OTHER INFORMATION: Heavy chain constant region

<400> SEQUENCE: 37

```
gctagcacca agggcccatc ggtcttcccc ctggcaccct cctccaagag cacctctggg      60
ggcacagcgg ccctgggctg cctggtcaag gactacttcc ccgaaccggt gacggtgtcg     120
```

```
tggaactcag gcgccctgac cagcggcgtg cacaccttcc cggctgtcct acagtcctca      180
ggactctact ccctcagcag cgtggtgacc gtgccctcca gcagcttggg cacccagacc      240
tacatctgca acgtgaatca caagcccagc aacaccaagg tggacaagaa agttgagccc      300
aaatcttgtg acaaaactca cacatgccca ccgtgcccag cacctgaact cctgggggga      360
ccgtcagtct tcctcttccc cccaaaaccc aaggacaccc tcatgatctc ccggacccct      420
gaggtcacat gcgtggtggt ggacgtgagc cacgaagacc ctgaggtcaa gttcaactgg      480
tacgtggacg gcgtggaggt gcataatgcc aagacaaagc cgcgggagga gcagtacaac      540
agcacgtacc gtgtggtcag cgtcctcacc gtcctgcacc aggactggct gaatggcaag      600
gagtacaagt gcaaggtctc caacaaagcc ctcccagccc ccatcgagaa aaccatctcc      660
aaagccaaag ggcagccccg agaaccacag gtgtacaccc tgcccccatc ccgggaggag      720
atgaccaaga accaggtcag cctgacctgc ctggtcaaag gcttctatcc cagcgacatc      780
gccgtggagt gggagagcaa tgggcagccg gagaacaact acaagaccac gcctcccgtg      840
ctggactccg acggctcctt cttcctctac agcaagctca ccgtggacaa gagcaggtgg      900
cagcagggga acgtcttctc atgctccgtg atgcatgagg ctctgcacaa ccactacacg      960
cagaagagcc tctccctgtc tccgggtaaa tga                                   993
```

<210> SEQ ID NO 38
<211> LENGTH: 981
<212> TYPE: DNA
<213> ORGANISM: Artificial Sequence
<220> FEATURE:
<223> OTHER INFORMATION: Heavy chain constant region

<400> SEQUENCE: 38

```
gcctccacca agggcccatc ggtcttcccc ctggcgccct gctccaggag cacctctgag       60
agcacagcgg ccctgggctg cctggtcaag gactacttcc ccgaaccggt gacggtgtcg      120
tggaactcag gcgctctgac cagcggcgtg cacaccttcc cagctgtcct acagtcctca      180
ggactctact ccctcagcag cgtggtgacc gtgccctcca gcaacttcgg cacccagacc      240
tacacctgca acgtagatca caagcccagc aacaccaagg tggacaagac agttgagcgc      300
aaatgttgtg tcgagtgccc accgtgccca gcaccacctg tggcaggacc gtcagtcttc      360
ctcttccccc caaaacccaa ggacaccctc atgatctccc ggacccctga ggtcacgtgc      420
gtggtggtgg acgtgagcca cgaagacccc gaggtccagt tcaactggta cgtggacggc      480
gtggaggtgc ataatgccaa gacaaagcca cgggaggagc agttcaacag cacgttccgt      540
gtggtcagcg tcctcaccgt tgtgcaccag gactggctga acggcaagga gtacaagtgc      600
aaggtctcca acaaaggcct cccagccccc atcgagaaaa ccatctccaa aaccaaaggg      660
cagccccgag aaccacaggt gtacaccctg cccccatccc gggaggagat gaccaagaac      720
caggtcagcc tgacctgcct ggtcaaaggc ttctacccca gcgacatcgc cgtggagtgg      780
gagagcaatg ggcagccgga gaacaactac aagaccacac tcccatgctg gactccgac      840 ggctccttct cctctacag caagctcacc gtgacaaga gcaggtggca gcagggggaac       900 gtcttctcat gctccgtgat gcatgaggct ctgcacaacc actacacgca gaagagcctc      960
tccctgtctc cgggtaaatg a                                               981
```

<210> SEQ ID NO 39
<211> LENGTH: 324
<212> TYPE: DNA

-continued

<213> ORGANISM: Artificial Sequence
<220> FEATURE:
<223> OTHER INFORMATION: Light chain constant region

<400> SEQUENCE: 39

```
cgtacggtgg cggcgccatc tgtcttcatc ttcccgccat ctgatgagca gttgaaatct      60
ggaactgcct ctgttgtgtg cctgctgaat aacttctatc ccagagaggc caaagtacag     120
tggaaggtgg ataacgccct caatcgggt aactcccagg agagtgtcac agagcaggac      180
agcaaggaca gcacctacag cctcagcagc accctgacgc tgagcaaagc agactacgag     240
aaacacaaag tctacgcctg cgaagtcacc catcagggcc tgagctcgcc cgtcacaaag     300
agcttcaaca ggggagagtg ttga                                            324
```

<210> SEQ ID NO 40
<211> LENGTH: 444
<212> TYPE: PRT
<213> ORGANISM: Artificial Sequence
<220> FEATURE:
<223> OTHER INFORMATION: Heavy chain of Dacetuzumab

<400> SEQUENCE: 40

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Tyr Ser Phe Thr Gly Tyr
            20                  25                  30

Tyr Ile His Trp Val Arg Gln Ala Pro Gly Lys Gly Leu Glu Trp Val
        35                  40                  45

Ala Arg Val Ile Pro Asn Ala Gly Gly Thr Ser Tyr Asn Gln Lys Phe
    50                  55                  60

Lys Gly Arg Phe Thr Leu Ser Val Asp Asn Ser Lys Asn Thr Ala Tyr
65                  70                  75                  80

Leu Gln Met Asn Ser Leu Arg Ala Glu Asp Thr Ala Val Tyr Tyr Cys
                85                  90                  95

Ala Arg Glu Gly Ile Tyr Trp Trp Gly Gln Gly Thr Leu Val Thr Val
            100                 105                 110

Ser Ser Ala Ser Thr Lys Gly Pro Ser Val Phe Pro Leu Ala Pro Ser
        115                 120                 125

Ser Lys Ser Thr Ser Gly Gly Thr Ala Ala Leu Gly Cys Leu Val Lys
    130                 135                 140

Asp Tyr Phe Pro Glu Pro Val Thr Val Ser Trp Asn Ser Gly Ala Leu
145                 150                 155                 160

Thr Ser Gly Val His Thr Phe Pro Ala Val Leu Gln Ser Ser Gly Leu
                165                 170                 175

Tyr Ser Leu Ser Ser Val Val Thr Val Pro Ser Ser Ser Leu Gly Thr
            180                 185                 190

Gln Thr Tyr Ile Cys Asn Val Asn His Lys Pro Ser Asn Thr Lys Val
        195                 200                 205

Asp Lys Lys Val Glu Pro Lys Ser Cys Asp Lys Thr His Thr Cys Pro
    210                 215                 220

Pro Cys Pro Ala Pro Glu Leu Leu Gly Gly Pro Ser Val Phe Leu Phe
225                 230                 235                 240

Pro Pro Lys Pro Lys Asp Thr Leu Met Ile Ser Arg Thr Pro Glu Val
                245                 250                 255

Thr Cys Val Val Val Asp Val Ser His Glu Asp Pro Glu Val Lys Phe
            260                 265                 270
```

```
Asn Trp Tyr Val Asp Gly Val Glu Val His Asn Ala Lys Thr Lys Pro
            275                 280                 285
Arg Glu Glu Gln Tyr Asn Ser Thr Tyr Arg Val Val Ser Val Leu Thr
    290                 295                 300
Val Leu His Gln Asp Trp Leu Asn Gly Lys Glu Tyr Lys Cys Lys Val
305                 310                 315                 320
Ser Asn Lys Ala Leu Pro Ala Pro Ile Glu Lys Thr Ile Ser Lys Ala
                325                 330                 335
Lys Gly Gln Pro Arg Glu Pro Gln Val Tyr Thr Leu Pro Pro Ser Arg
            340                 345                 350
Glu Glu Met Thr Lys Asn Gln Val Ser Leu Thr Cys Leu Val Lys Gly
        355                 360                 365
Phe Tyr Pro Ser Asp Ile Ala Val Glu Trp Glu Ser Asn Gly Gln Pro
    370                 375                 380
Glu Asn Asn Tyr Lys Thr Thr Pro Pro Val Leu Asp Ser Asp Gly Ser
385                 390                 395                 400
Phe Phe Leu Tyr Ser Lys Leu Thr Val Asp Lys Ser Arg Trp Gln Gln
                405                 410                 415
Gly Asn Val Phe Ser Cys Ser Val Met His Glu Ala Leu His Asn His
            420                 425                 430
Tyr Thr Gln Lys Ser Leu Ser Leu Ser Pro Gly Lys
        435                 440

<210> SEQ ID NO 41
<211> LENGTH: 219
<212> TYPE: PRT
<213> ORGANISM: Artificial Sequence
<220> FEATURE:
<223> OTHER INFORMATION: Light chain of Dacetuzumab

<400> SEQUENCE: 41

Asp Ile Gln Met Thr Gln Ser Pro Ser Ser Leu Ser Ala Ser Val Gly
1               5                   10                  15
Asp Arg Val Thr Ile Thr Cys Arg Ser Ser Gln Ser Leu Val His Ser
            20                  25                  30
Asn Gly Asn Thr Phe Leu His Trp Tyr Gln Gln Lys Pro Gly Lys Ala
        35                  40                  45
Pro Lys Leu Leu Ile Tyr Thr Val Ser Asn Arg Phe Ser Gly Val Pro
    50                  55                  60
Ser Arg Phe Ser Gly Ser Gly Ser Gly Thr Asp Phe Thr Leu Thr Ile
65                  70                  75                  80
Ser Ser Leu Gln Pro Glu Asp Phe Ala Thr Tyr Phe Cys Ser Gln Thr
                85                  90                  95
Thr His Val Pro Trp Thr Phe Gly Gln Gly Thr Lys Val Glu Ile Lys
            100                 105                 110
Arg Thr Val Ala Ala Pro Ser Val Phe Ile Phe Pro Pro Ser Asp Glu
        115                 120                 125
Gln Leu Lys Ser Gly Thr Ala Ser Val Val Cys Leu Leu Asn Asn Phe
    130                 135                 140
Tyr Pro Arg Glu Ala Lys Val Gln Trp Lys Val Asp Asn Ala Leu Gln
145                 150                 155                 160
Ser Gly Asn Ser Gln Glu Ser Val Thr Glu Gln Asp Ser Lys Asp Ser
                165                 170                 175
Thr Tyr Ser Leu Ser Ser Thr Leu Thr Leu Ser Lys Ala Asp Tyr Glu
            180                 185                 190
```

```
Lys His Lys Val Tyr Ala Cys Glu Val Thr His Gln Gly Leu Ser Ser
            195                 200                 205

Pro Val Thr Lys Ser Phe Asn Arg Gly Glu Cys
        210                 215

<210> SEQ ID NO 42
<211> LENGTH: 452
<212> TYPE: PRT
<213> ORGANISM: Artificial Sequence
<220> FEATURE:
<223> OTHER INFORMATION: Heavy chain of Selicrelumab

<400> SEQUENCE: 42

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Gly Tyr
            20                  25                  30

Tyr Met His Trp Val Arg Gln Ala Pro Gly Gln Gly Leu Glu Trp Met
        35                  40                  45

Gly Trp Ile Asn Pro Asp Ser Gly Gly Thr Asn Tyr Ala Gln Lys Phe
    50                  55                  60

Gln Gly Arg Val Thr Met Thr Arg Asp Thr Ser Ile Ser Thr Ala Tyr
65                  70                  75                  80

Met Glu Leu Asn Arg Leu Arg Ser Asp Asp Thr Ala Val Tyr Tyr Cys
                85                  90                  95

Ala Arg Asp Gln Pro Leu Gly Tyr Cys Thr Asn Gly Val Cys Ser Tyr
            100                 105                 110

Phe Asp Tyr Trp Gly Gln Gly Thr Leu Val Thr Val Ser Ser Ala Ser
        115                 120                 125

Thr Lys Gly Pro Ser Val Phe Pro Leu Ala Pro Cys Ser Arg Ser Thr
    130                 135                 140

Ser Glu Ser Thr Ala Ala Leu Gly Cys Leu Val Lys Asp Tyr Phe Pro
145                 150                 155                 160

Glu Pro Val Thr Val Ser Trp Asn Ser Gly Ala Leu Thr Ser Gly Val
                165                 170                 175

His Thr Phe Pro Ala Val Leu Gln Ser Ser Gly Leu Tyr Ser Leu Ser
            180                 185                 190

Ser Val Val Thr Val Pro Ser Ser Asn Phe Gly Thr Gln Thr Tyr Thr
        195                 200                 205

Cys Asn Val Asp His Lys Pro Ser Asn Thr Lys Val Asp Lys Thr Val
    210                 215                 220

Glu Arg Lys Cys Cys Val Glu Cys Pro Pro Cys Pro Ala Pro Pro Val
225                 230                 235                 240

Ala Gly Pro Ser Val Phe Leu Phe Pro Pro Lys Pro Lys Asp Thr Leu
                245                 250                 255

Met Ile Ser Arg Thr Pro Glu Val Thr Cys Val Val Val Asp Val Ser
            260                 265                 270

His Glu Asp Pro Glu Val Gln Phe Asn Trp Tyr Val Asp Gly Val Glu
        275                 280                 285

Val His Asn Ala Lys Thr Lys Pro Arg Glu Glu Gln Phe Asn Ser Thr
    290                 295                 300

Phe Arg Val Val Ser Val Leu Thr Val Val His Gln Asp Trp Leu Asn
305                 310                 315                 320

Gly Lys Glu Tyr Lys Cys Lys Val Ser Asn Lys Gly Leu Pro Ala Pro
                325                 330                 335
```

```
Ile Glu Lys Thr Ile Ser Lys Thr Lys Gly Gln Pro Arg Glu Pro Gln
            340                 345                 350

Val Tyr Thr Leu Pro Pro Ser Arg Glu Glu Met Thr Lys Asn Gln Val
        355                 360                 365

Ser Leu Thr Cys Leu Val Lys Gly Phe Tyr Pro Ser Asp Ile Ala Val
    370                 375                 380

Glu Trp Glu Ser Asn Gly Gln Pro Glu Asn Asn Tyr Lys Thr Thr Pro
385                 390                 395                 400

Pro Met Leu Asp Ser Asp Gly Ser Phe Phe Leu Tyr Ser Lys Leu Thr
                405                 410                 415

Val Asp Lys Ser Arg Trp Gln Gln Gly Asn Val Phe Ser Cys Ser Val
            420                 425                 430

Met His Glu Ala Leu His Asn His Tyr Thr Gln Lys Ser Leu Ser Leu
        435                 440                 445

Ser Pro Gly Lys
        450

<210> SEQ ID NO 43
<211> LENGTH: 214
<212> TYPE: PRT
<213> ORGANISM: Artificial Sequence
<220> FEATURE:
<223> OTHER INFORMATION: Light chain of Selicrelumab

<400> SEQUENCE: 43

Asp Ile Gln Met Thr Gln Ser Pro Ser Ser Val Ser Ala Ser Val Gly
1               5                   10                  15

Asp Arg Val Thr Ile Thr Cys Arg Ala Ser Gln Gly Ile Tyr Ser Trp
            20                  25                  30

Leu Ala Trp Tyr Gln Gln Lys Pro Gly Lys Ala Pro Asn Leu Leu Ile
        35                  40                  45

Tyr Thr Ala Ser Thr Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ala Asn Ile Phe Pro Leu
                85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
        210
```